United States Patent
Majumdar

(10) Patent No.: US 10,452,989 B2
(45) Date of Patent: Oct. 22, 2019

(54) QUANTON REPRESENTATION FOR EMULATING QUANTUM-LIKE COMPUTATION ON CLASSICAL PROCESSORS

(71) Applicant: KYNDI, INC., San Mateo, CA (US)

(72) Inventor: Arun Majumdar, Alexandria, VA (US)

(73) Assignee: KYNDI, INC., San Mateo, CA (US)

( * ) Notice: Subject to any disclaimer, the term of this patent is extended or adjusted under 35 U.S.C. 154(b) by 0 days.

(21) Appl. No.: 15/147,751

(22) Filed: May 5, 2016

(65) Prior Publication Data

US 2016/0328253 A1 Nov. 10, 2016

Related U.S. Application Data

(60) Provisional application No. 62/156,955, filed on May 5, 2015.

(51) Int. Cl.
  *G06N 99/00* (2019.01)
  *G06N 10/00* (2019.01)
  (Continued)

(52) U.S. Cl.
  CPC ......... *G06N 10/00* (2019.01); *G06F 9/45504* (2013.01); *G06N 3/126* (2013.01); *G06N 7/005* (2013.01); *G06N 99/00* (2013.01)

(58) Field of Classification Search
  None
  See application file for complete search history.

(56) References Cited

U.S. PATENT DOCUMENTS

2006/0209062 A1 9/2006 Drucker et al.
2012/0303574 A1 11/2012 Ignacio

FOREIGN PATENT DOCUMENTS

WO WO 2004/012139 A2 2/2004

OTHER PUBLICATIONS

Shen, A Stochastic-Variational Model for Soft Mumford-Shah Segmentation, Int J Biomed Imaging, Article ID 92329, 2006, pp. 1-14.*

(Continued)

*Primary Examiner* — Wilbert L Starks
(74) *Attorney, Agent, or Firm* — Oblon, McClelland, Maier & Neustadt, L.L.P.

(57) ABSTRACT

The Quanton virtual machine approximates solutions to NP-Hard problems in factorial spaces in polynomial time. The data representation and methods emulate quantum computing on classical hardware but also implement quantum computing if run on quantum hardware. The Quanton uses permutations indexed by Lehmer codes and permutation-operators to represent quantum gates and operations. A generating function embeds the indexes into a geometric object for efficient compressed representation. A nonlinear directional probability distribution is embedded to the manifold and at the tangent space to each index point is also a linear probability distribution. Simple vector operations on the distributions correspond to quantum gate operations. The Quanton provides features of quantum computing: superpositioning, quantization and entanglement surrogates. Populations of Quantons are evolved as local evolving gate operations solving problems or as solution candidates in an Estimation of Distribution algorithm. The Quanton representation and methods are fully parallel on any hardware.

56 Claims, 47 Drawing Sheets

(51) Int. Cl.
    *G06F 9/455*     (2018.01)
    *G06N 3/12*     (2006.01)
    *G06N 7/00*     (2006.01)

(56) References Cited

OTHER PUBLICATIONS

Stepney, et al., Searching for Quantum Programs and Quantum Protocols, Journal of Computational and Theoretical Nanoscience, 5, 2008, pp. 1-65. (Year: 2008).*
International Search Report and Written Opinion dated Aug. 11, 2016 in PCT/US16/31034 filed May 5, 2016.
I.M. Georgescu et al., "Quantum simulation", Reviews of Modern Physics, vol. 86., No. 1, Jan.-Mar. 2014, pp. 153-185.
European Search Report dated Dec. 3, 2018 in corresponding European Patent Application No. 16 790 101.6.
Gexiang Zhang. "Quantum-inspired evolutionary algorithms: a survey and empirical study", Journal of Heuristics, Kluwer Academic Publishers, vol. 17, Jun. 29, 2010, pp. 303-351.
Nicholas J. Daras. "Research Directions and Foundations in Topological Quantum Computation Methods", Journal of Applied Mathematics and Bioinformatics, vol. 3, Oct. 1, 2013, pp. 1-90.
R. Marques, et al. "Spherical Fibonacci Point Sets for Illumination Integrals: Spherical Fibonacci Point Sets for Illumination Integrals", Computer Graphics Forum, vol. 32, Jul. 24, 2013, pp. 134-143.
Examination Report dated Nov. 2, 2018 in corresponding Australian Patent Application No. 2016258029 (in English).

* cited by examiner

Figure 1: Quanton Overview

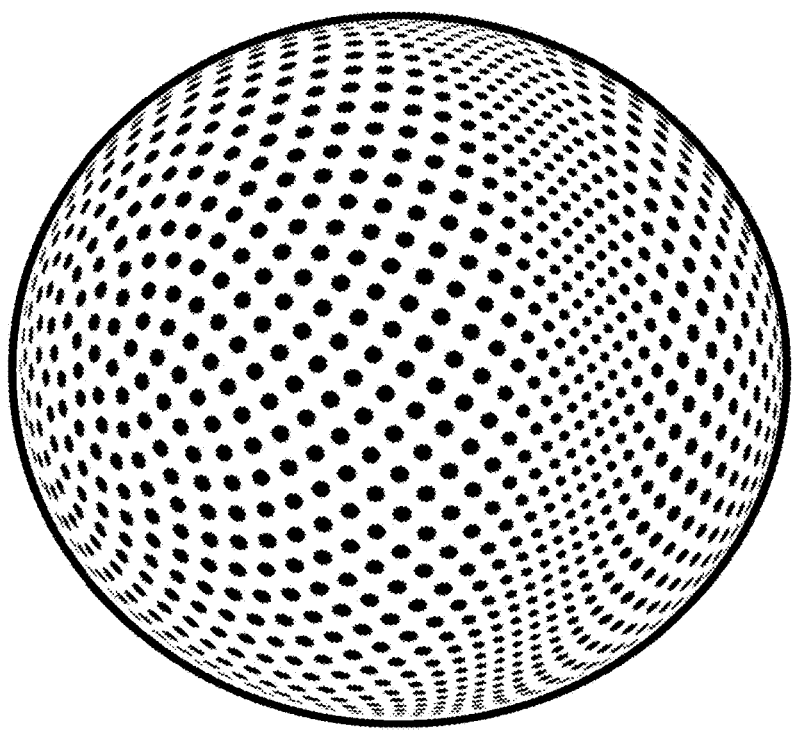
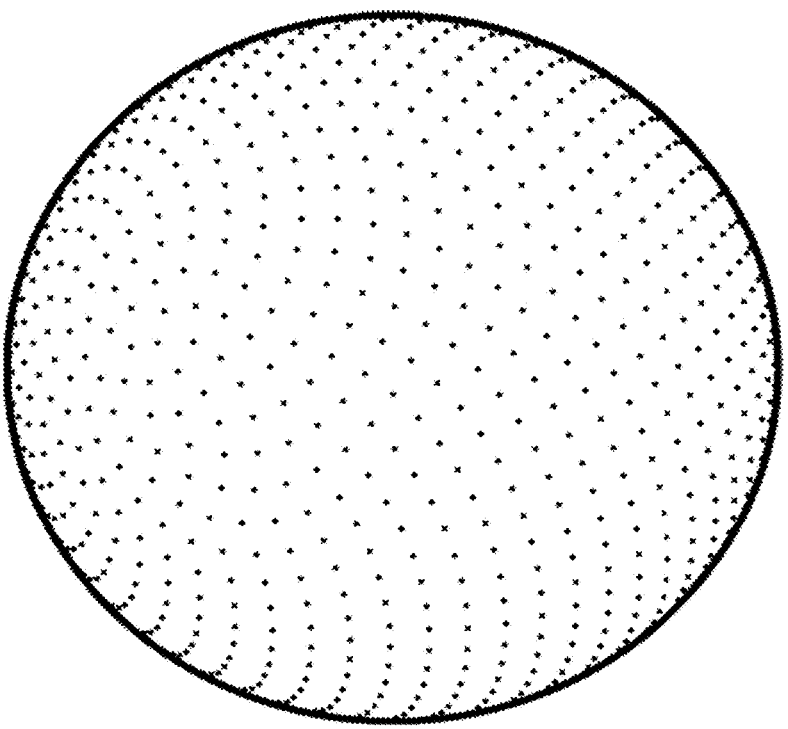
Figure 3

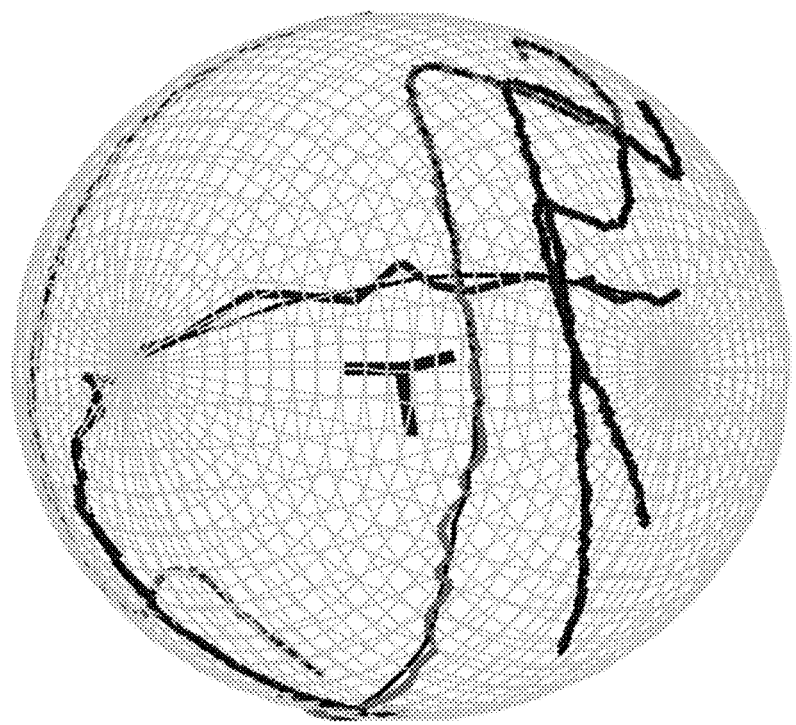
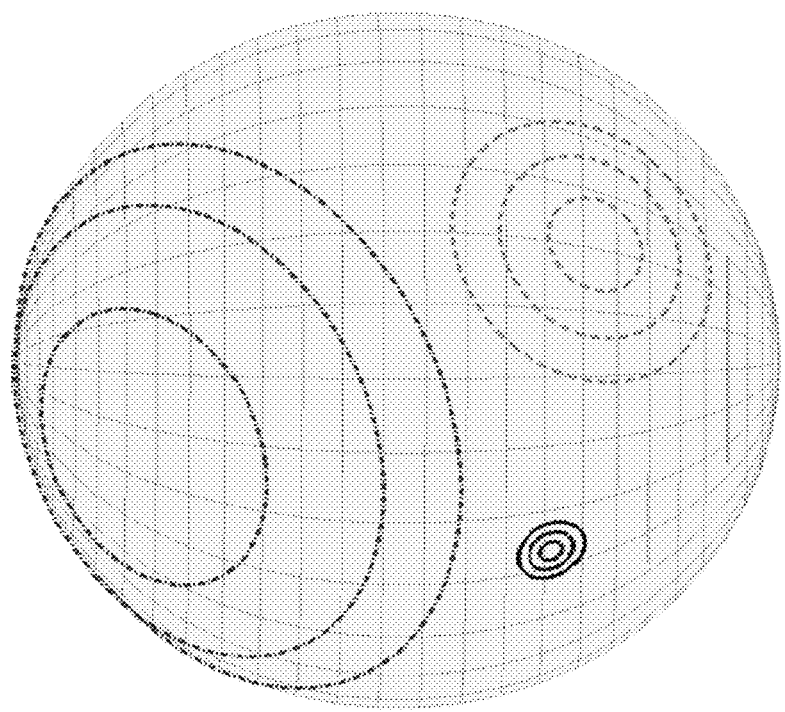
Figure 4

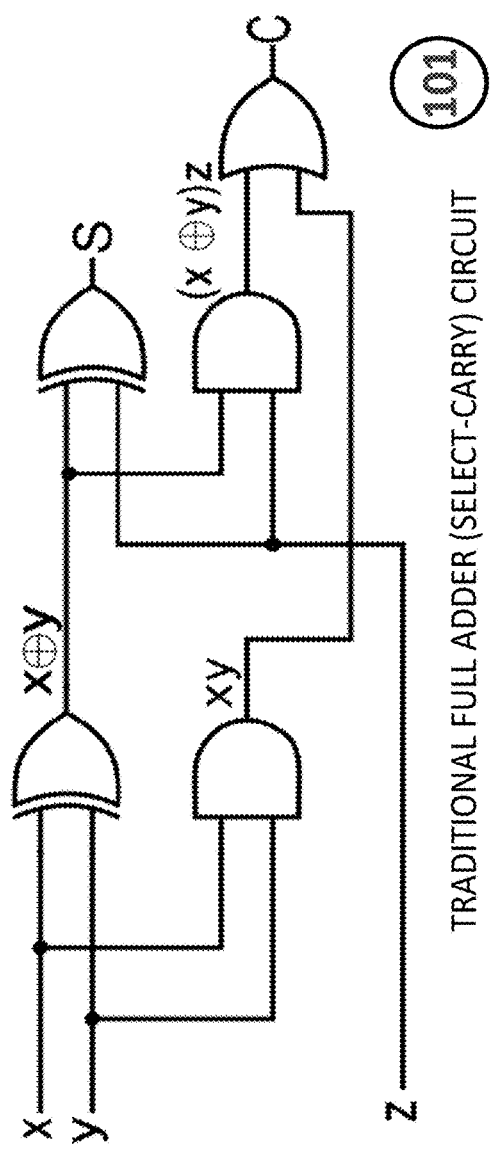
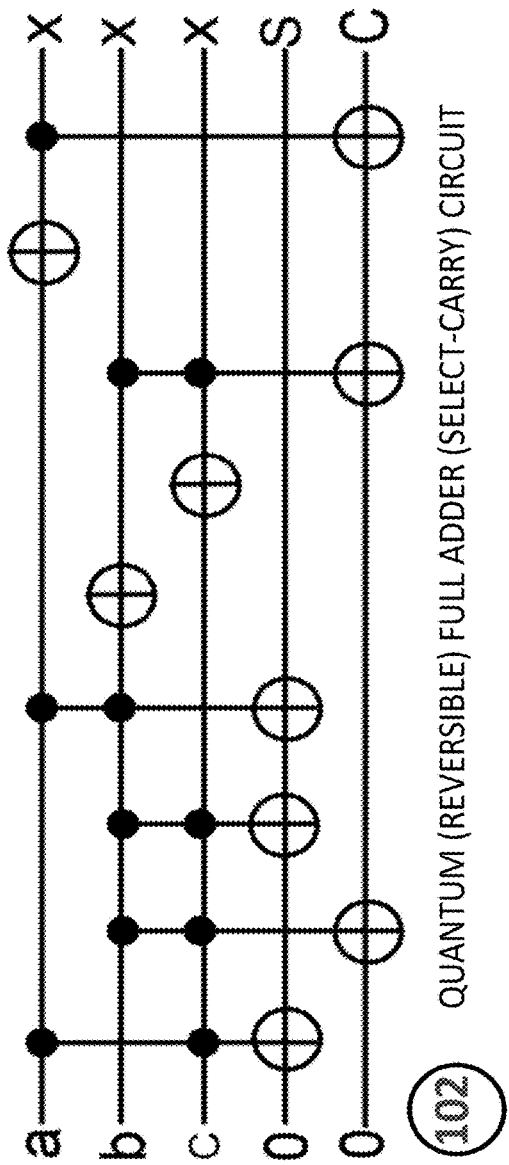
Figure 19

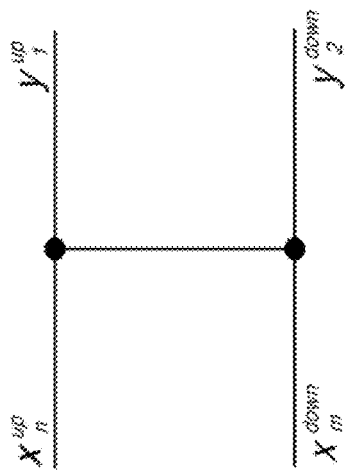
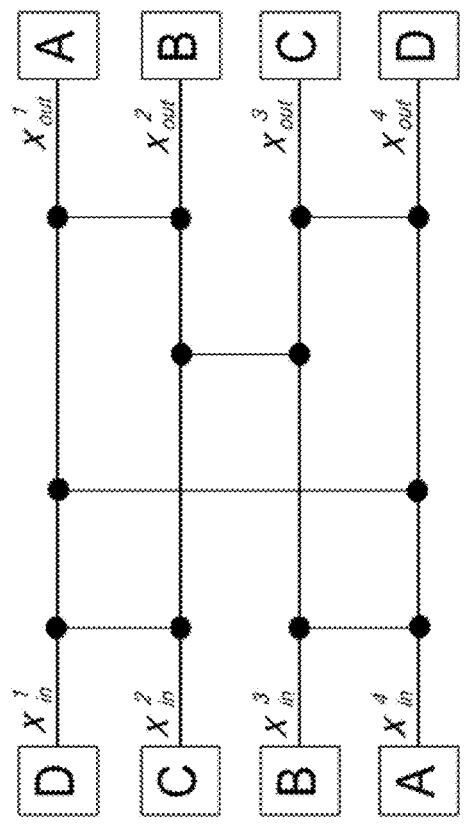
Figure 21

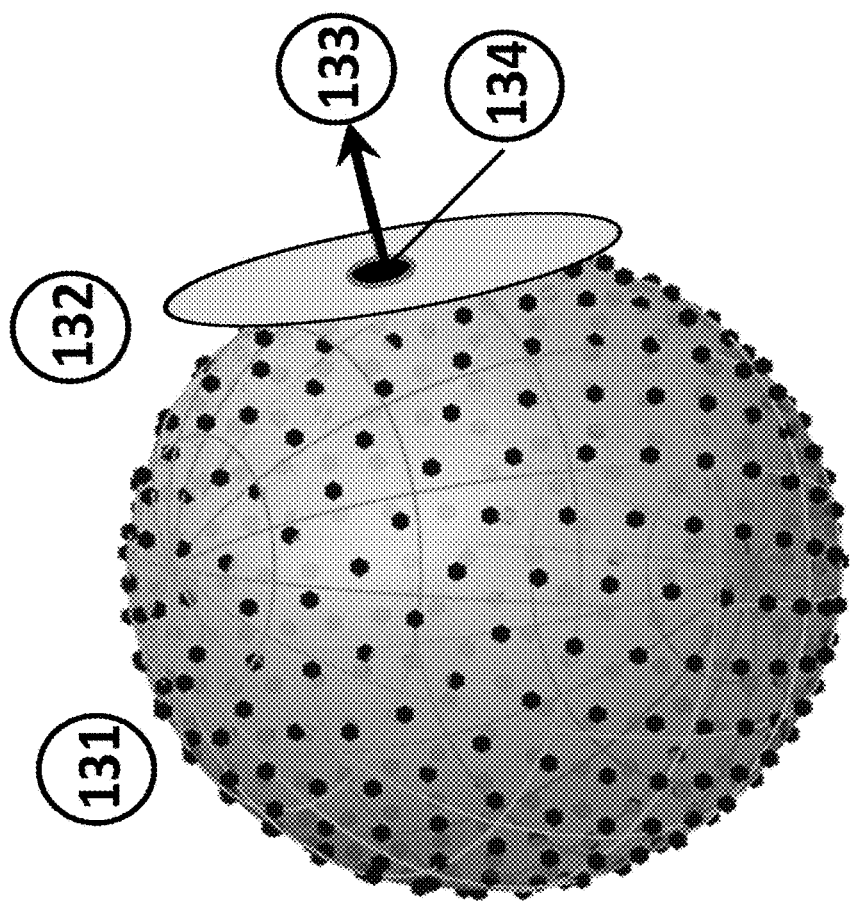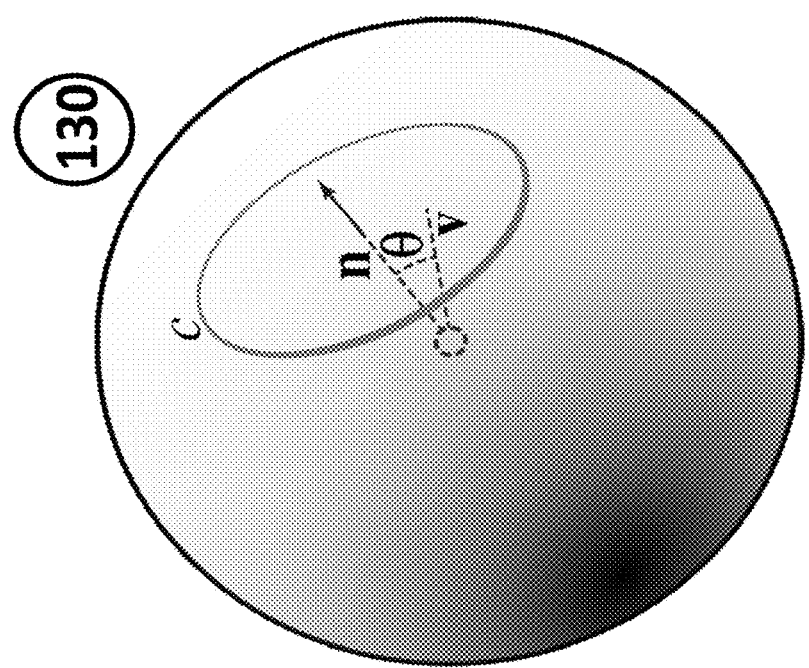
Figure 27

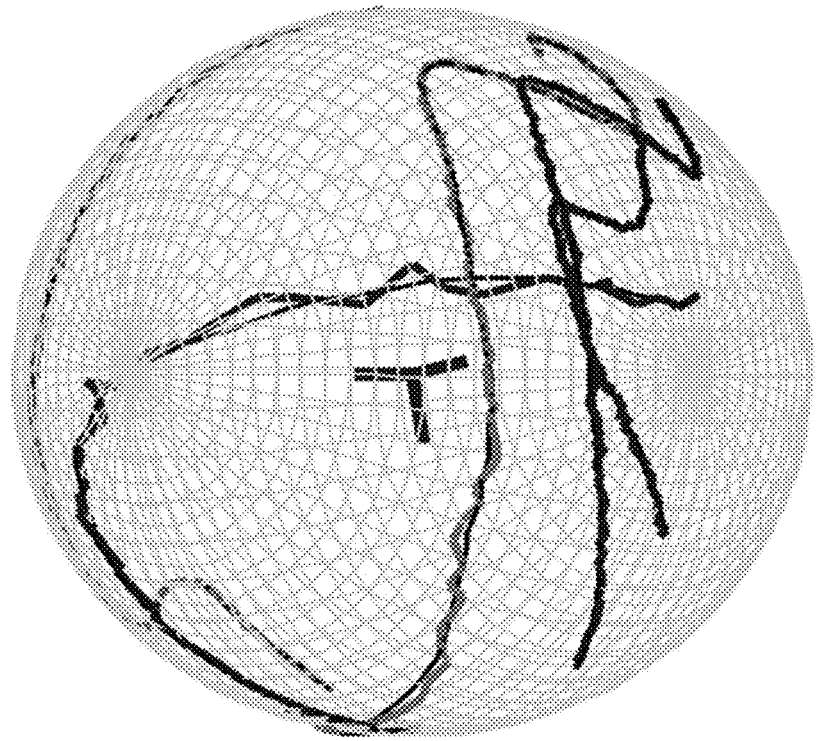
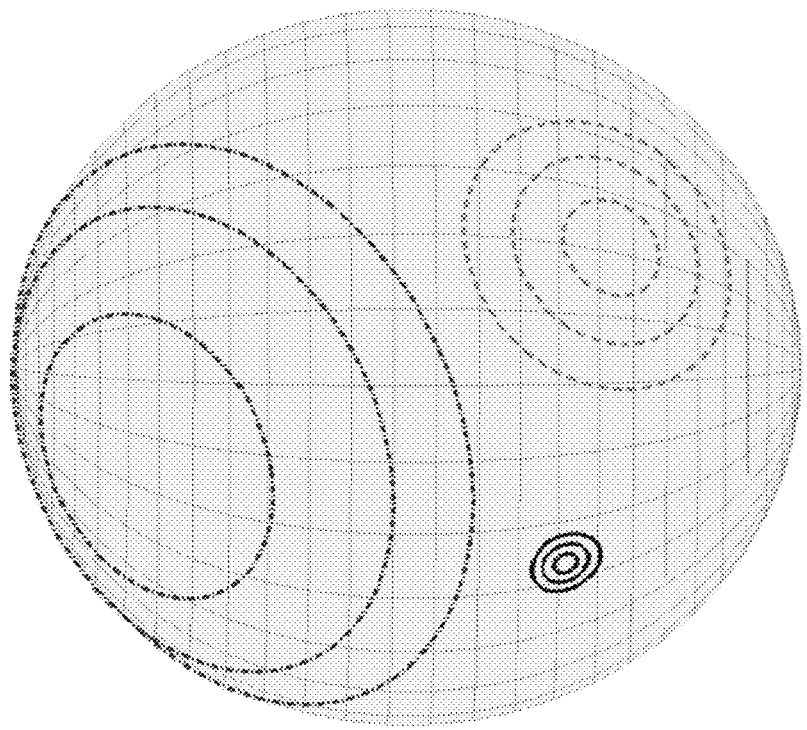
Figure 28

Figure 38: Hierarchichal Structure of the Quanton with Nested Quantons

Figure 39: Estimation Distribution Algorithms Based on Quantons for Quantum-Like Computing

Figure 40: Hardware Design for Quantons for A System On A Chip (SOC)

Figure 41: Overall Master Flow Chart for Quanton PMBGA Consensus Output

QUANTON REPRESENTATION FOR EMULATING QUANTUM-LIKE COMPUTATION ON CLASSICAL PROCESSORS

CROSS-REFERENCE TO RELATED APPLICATIONS

This application is based upon and claims the benefit of priority to provisional U.S. Application No. 62/156,955, filed May 5, 2015, the entire contents of which are incorporated herein by reference.

BACKGROUND

Field of the Disclosure

The present disclosure relates to a probabilistic polynomial Turing Machine computing model that emulates quantum-like computing and performs several practical data processing functions, and, more particularly, to a system of representation and computing method in both classical probabilistic and quantum computing or quantum emulation on classical computers by reformulating the computation of functions by permutations and embeds these into a probability space, and incorporating methods of topological quantum computing.

Description of the Related Art

The universal model of computing can be referred to as a virtual machine that is traditionally called the Turing Machine, and in accordance with the Church-Turing thesis, the virtual machine is built on the foundation of computation as function evaluation whose archetype is the lambda-calculus. There are many other ways in which to design a Turing Machine, such as, for example, using pi-calculus as a foundation, or using probability theoretic models to build a probabilistic Turing machine or quantum theory to build a quantum Turing machine.

Many classes of artificial intelligence techniques often draw inspiration from philosophy, mathematical, physical, biological and economic sciences: however, it is in the novelty of combining parts of these different disciplines that while may have been common knowledge to those skilled in these arts, are non-obvious when integrated together. Therefore, the study of how to make a good choice when confronted with conflicting requirements, and which selections of which disciplines (e.g. biologically inspired or economically inspired models etc.) is the fundamental problem in all data analysis: this is where our techniques apply.

Choosing good data underlies the problem of how to make good decisions: in addition, there are the issues of handling conflicting data, weak-signals or very high combinatorial complexity. Conflicting data simply means that the data indicate inconsistent logical inference results. Weak signals are those that are hard to distinguish from noise or deceptively strong signals that mask the weak signals. Classical approaches, such as frequentist statistical analyses, work with strong signals or simple complexity classes so that when a result is found, then it is guaranteed to be a best solution. In the case of weak-signals, or high complexity classes, however, there is usually a balance of tradeoffs that must be achieved because some kind of approximation will be used in place of an exact answer. In these cases, the data characteristic is not that it is weak or strong but that it is very complex. Complexity arises due to fundamental algorithmic structure that defines a computational complexity class, or data volume or size of the description of the data, its high-dimensionality, dynamics or intertwined relationships with other data. Altogether, these issues make it very complicated to separate data into distinct classes and analyze.

Training data samples are assumed to exist when many times there are no training data for synthesizing new solutions to creative problems (such as synthesis of new drugs or materials design). The same underlying distribution in classical approaches draws training samples from the same sets as the problem solution data: however, due to the sparsity and noise in data collection and sometimes-large variations of the inputs, the assumptions about the congruence between training and solution data cannot be made or when a new model that did not exist before has to be created.

In settings where decisions, based on stratified data, need to be made (such as data in ontologies, and taxonomies or, other strata) we can expect an effect on the response due to the stratum to which data belongs. In a model framework, a shift due to stratum membership can significantly influence the estimate of distribution of some outcome given a particular set of covariates and data. Membership within a particular stratum can impact the value of the distribution of interest. However, in many cases one does not wish to explicitly estimate these stratum-level effects: rather, one seeks to estimate other parameters of interest—such as linear coefficients associated with other features that are observed across strata and account for any non-linearity in the estimates. For a concrete example, consider the case of a classical conditional likelihood model approach, wherein one conditions on the histogram of the observations in the stratum. This conditional likelihood is invariant to any stratum-level linear effects, thus removing them as a contributing factor (in the likelihood) in the model described herein. One may then proceed to use the model with maximum likelihood estimation to recover the remaining parameters of interest. For example, conditioning on the histogram of the responses in a case-control study, such as in analyses of clinical psychological trials, a stratum amounts to considering all permutations of the response vector. This results in a summation over a combinatorially, and thus factorially, growing number of terms. Computation becomes infeasible in this classical approach.

Patterns that are hard to find in data, however, must have some related features else one would be dealing with pure noise. These patterns are hard to identify because they are often confounded with other patterns; they can appear distorted by noise but once recognized could be restored and classified despite of the noise. Patterns sometimes need to be learned where no pattern models had existed before by speculatively hypothesizing a pattern model structure and then testing for the existence of patterns in data against this structure.

In the late nineteen-nineties, the "Estimation of Distribution Algorithms" (EDA) was introduced and goes by several other terms in the literature, such as "Probabilistic Model-Building Genetic Algorithms", or "Iterated Density Estimation Algorithms". Due to its novel functionality, it has become a major tool in evolutionary algorithms based on probabilistic model learning by evolution, biologically inspired computing in spirit similar to genetic algorithms.

EDAs estimate a joint probability distribution associated with the set of training examples expressing the interrelations between the different variables of the problem via their probability distributions. Therefore, EDA's are ideally suited to iterative probabilistic machine learning techniques. Sampling the probabilistic model learned in a previous generation in an EDA estimation cycle breeds a new population of solutions. The algorithm stops iterating and returns the best solution found across the generations when a certain stopping criterion is met, such as a maximum number of generations/evaluations, homogeneous population, or lack of improvement in the solutions.

Most of the approaches to NP-Hard problems such as inference in factorially large data spaces, ranking objects in complex data sets, and data registration rely on convex optimization, integer programming, relaxation and related classical approximation techniques to reach a solution that is inexact but closely representative of the decision solution. In addition, the standard approach to solving such a problem assumes a linear objective function. However, often this is just an approximation of the real problem, which may be non-linear and allowing for non-linear functions results in a much broader expressive power. However, the methods for combining both linear and non-linear structure in the same model have largely been ad-hoc.

Probabilistic inference becomes unwieldy and complex as correlations between data need to be taken into account as opposed to the assumption of data independence that is usually used, for example, in Bayesian reasoning. Methods to reason within complex associated networks often rely on simulated annealing and various approximations while enforcing the need to process data sequentially and under the null hypothesis. Methods such as Markov Random Fields, Markov Logic, Bayesian Belief Networks and other similar structures fall into the models of processing just presented.

Machine learning applications often involve learning deep patterns from data that are inherently directional in nature or that the data are correlated, or stratified or latently seriated and, most often in real world cases, the data is both seriated, stratified, directional and correlated without any a-priori knowledge of the cluster size. Spectral clustering techniques have been used traditionally to generate embeddings that constitute a prototype for directional data analysis, but can result in different shapes on a hypersphere (depending on the original structure) leading to interpretation difficulties. Examples of such directional data include text, medical informatics, insurance claims analysis, and some domains of most sciences that include directional vector fields (winds, weather, physical phenomena). Various probability densities for directional data exist with advantages and disadvantages based on either Expectation Maximization (EM) strategies or Maximum a Posteriori (MAP) inference, for example, as in graph models. The main difficulty is learning the posterior, which is usually not directly accessible due to incomplete knowledge (or missing data) or the complexity of the problem and hence, approximations have to be used. The output of learning is some sort of prototype.

Learning prototypes from a set of given or observed objects is a core problem in machine learning with a large number of applications in image understanding, cognitive vision, pattern recognition, data mining, and bioinformatics. The usual approach is to have some data, often sparse input from relatively few well understood real world examples, and learn a pattern, which is called the prototype. The prototype minimizes the total difference (when differences are present) between input objects that are recognized. Such computed prototypes can be used to reason about, classify or index very large-size structural data so that queries can be efficiently answered by only considering properties of those prototypes. The other important application is that a prototype can be used in reconstructing objects from only a few partial observations as a form of compressed knowledge or sensing. Prototypes can be used to identify general, though hidden, patterns in a set of disparate data items, thus relating the data items in non-obvious ways. A software data structure for prototype learning and representation can be used for structure matching, for example, a set of points whose pair wise distances remain invariant under rigid transformation.

Many of the prototype learning algorithms use an embedding of data into a low dimensional manifold, that produces a low granularity representation, that is often, but not always, locally linear, and that, hopefully, captures the salient properties in a way that is likely to be computationally useful to the problem at hand, without generating false negatives and positives. Missing data or inferring that data is missing is a major problem with many of the manifold embedding techniques because the structural composition of data is lost during the embedding process—hence, the manifold has no way to take missing structure or put back missing structure, as part of its operations.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

SUMMARY

The Quanton virtual machine approximates solutions to NP-Hard problems in factorial spaces in polynomial time. The data representation and methods emulate quantum computing on classical hardware but also implement quantum computing if run on quantum hardware. The Quanton uses permutations indexed by Lehmer codes and permutation-operators to represent quantum gates and operations. A generating function embeds the indexes into a geometric object for efficient compressed representation. A nonlinear directional probability distribution is embedded to the manifold and at the tangent space to each index point is also a linear probability distribution. Simple vector operations on the distributions correspond to quantum gate operations. The Quanton provides features of quantum computing: superpositioning, quantization and entanglement surrogates. Populations of Quantons are evolved as local evolving gate operations solving problems or as solution candidates in an Estimation of Distribution algorithm. The Quanton uses modulo arithmetics for permutations, therefore, fully parallel on any hardware.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 illustrates an exemplary Fibonacci lattice used to generate vertices on the polytope;

FIG. 4 illustrates an exemplary geometry of a specific probability density distributions on a surface of a Hypersphere;

FIG. 19 illustrates an example of a classical irreversible full adder circuit and reversible (Quantum) full adder circuit;

FIG. 21 illustrates an example of Bitonic sorting network polynomial constraints and corresponding implementation;

FIG. 25 illustrates an example of a permutation matrix and permutation sign inversion matrix;

FIG. 26 illustrates an example of a permutations matrix and permutation pattern matrix;

FIG. 27 illustrates a relationship between a point and a tangent at a point to angular parameter;

FIG. 28 illustrates geometries of specific probability density distributions on the sphere (or hypersphere);

DETAILED DESCRIPTION OF THE EMBODIMENTS

Performing an approximation to quantum computing by treating permutations as representative of model states provides the interpretation that all states are simultaneously computed by iteration. Treating distributions as approximating density functionals, estimating distributions, coupling these distributions to state spaces represented by permutations, computing based on these distributions, reasoning with these distributions over the symmetric group and structure learning using the present Quanton model are the central ideas as described by embodiments of the present disclosure.

The search space of solutions in permutation problems of n items is n factorial. The search space is usually denoted as Sn, in reference to the symmetric group of size n. In general, permutation problems are known as very hard problems when n goes above a relatively small number and their computational complexity demonstrated that many of the typical permutation problems is NP-hard. In view of their complexity, computing optimal solutions is intractable in general. For this reason, invented the Quanton in order to put in place a data structure designed to work, at worst approximately, and at best in certain special cases, exactly, at the factorial sizes of the search space.

Furthermore, noting that Quantum computing also has a very large space in terms of solution possibilities, the Quanton data structure and methods, using the unique, efficient and computable model described in the present disclosure built on the idea of permutation as computation (aka permutational quantum computing), the Quanton is devised herein to emulate Quantum computing as a virtual machine.

Figure 1:
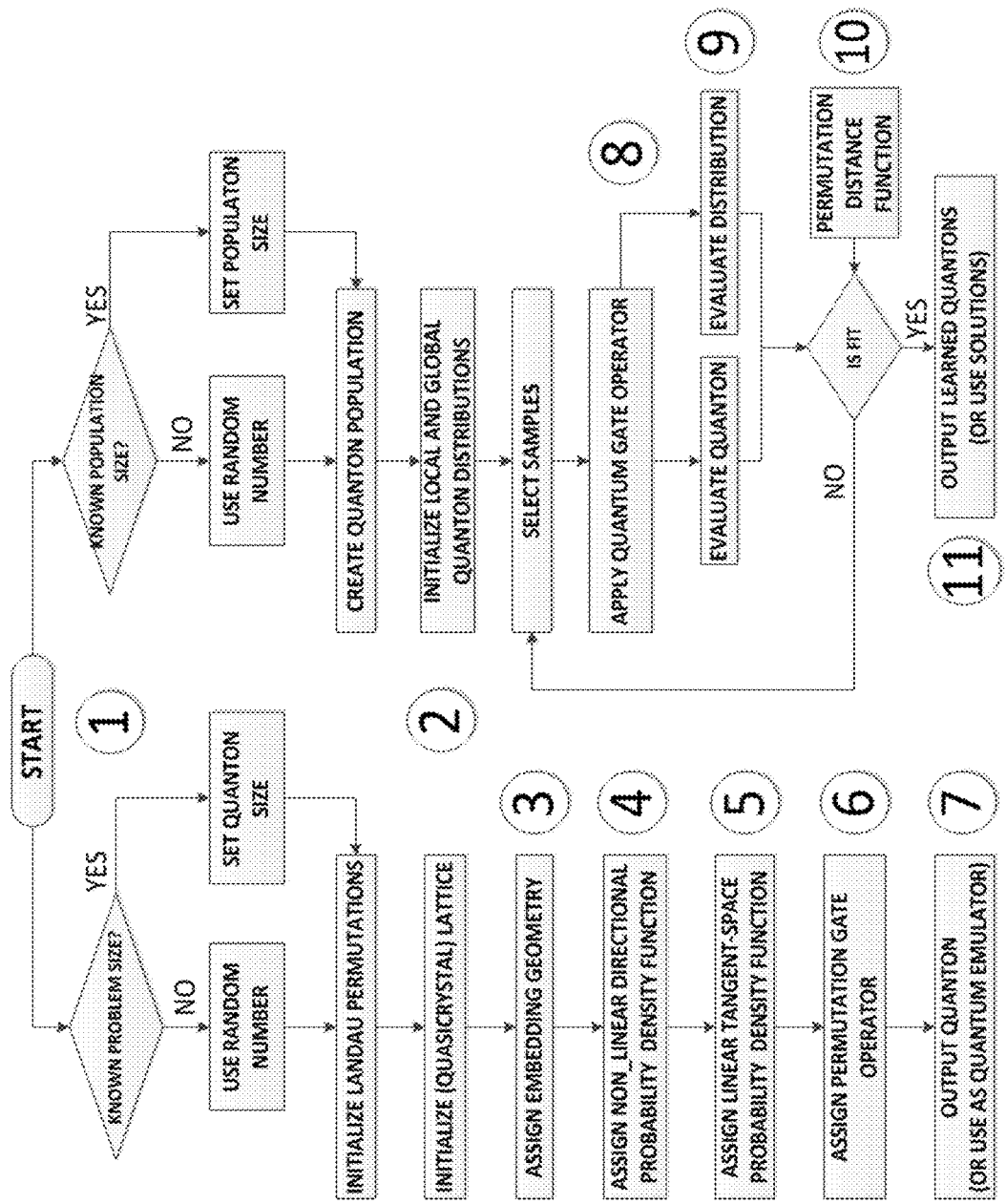
FIG. 1 illustrates an exemplary flowchart of the overview of the system.

Now, referring to FIG. 1, which provides a Quanton Overview, there are two parts to the overall procedure: first, there is the local procedure for creating the Quanton for use in emulating localized (to the Quanton) computational operations and then there is the global procedure for evolving the Quanton or a population of Quantons to learn about incoming data problems. This is done in order to produce optimal solutions based on the procedure of Estimation of Distribution (EDA) algorithms, also known as Probabilistic Model Building Genetic Algorithm (PMBGA).

The Quanton uses embeds permutations in special way that allows the permutations to each have a unique index (by using a lattice) into a continuous probability space. The produces a unique encoding for operations that enable it to mimic quantum gates. Hence quantum gates are embedded in a continuous probabilistic vector space in which fast vector computations perform the equivalent of complex quantum gate operations, transforming inputs to outputs, or, equivalently, computing quantum transitions from state to state. Given that all permutations are simultaneously available as indexed on the Quanton, every continuous vector space operation, therefore, updates all permutations simultaneously since it is the probability density distribution that is performing the update. In this sense the Quanton represents a superposition of all potential solutions. The Quanton represents quantized discrete structure because of its lattice and entanglements are represented by correlations between variables that emerge as a result of an evolutionary process that surfaces the entangled states as solution sets to the input query state (i.e. the data to be learned or solved).

STEP-1: The main procedure for computation with the Quanton is initialization and setup, whether an individual Quanton is being instantiated, or a population of Quantons is instantiated, item 1. Either the problem size is known or unknown, item 1. If the problem size is known, or estimated by an external source, then this number is used to set the size of the Quanton. The problem size often correlates in some with problem complexity and if this is know, then the population size as the population of Quantons can be set. If this is unknown, then a random population size is set.

Figure 2:
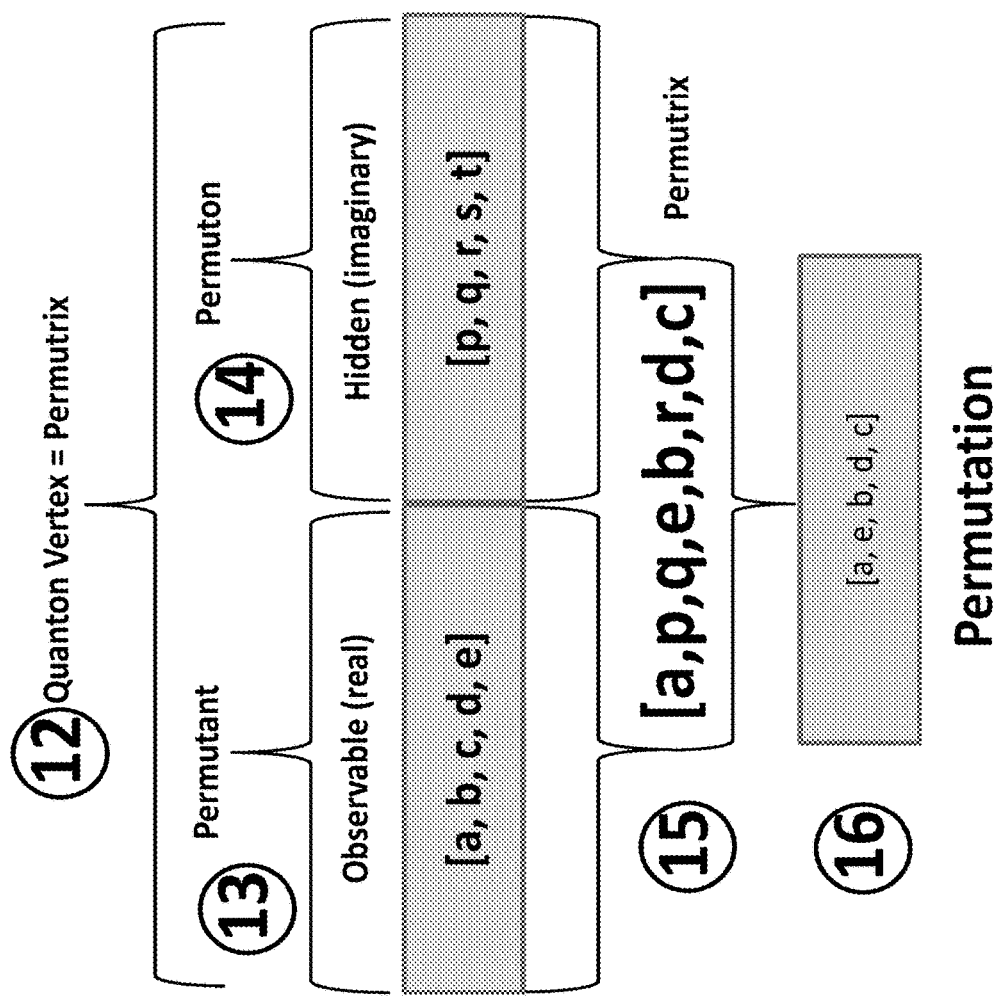
FIG. 2 illustrates an exemplary representation of a permutation sequence at vertices of polytope (Permutrix)

The section of the present disclosure corresponding to at least FIG. 2 and TABLE 4 presents further detail on the design of the Quanton for instantiation.

STEP-2: As part of the design of the local and global structures, the next procedure allocates local structure and global distributional population structure. The local Quanton structure uses the Landau number to generate the size of the largest permutation group that fits the problem size while global structure of the Quanton populations is set by choosing the distribution function. The Landau process for creating the permutations is detailed in the section of the present disclosure corresponding to FIG. 20A.

STEP-3: There is a deep and fundamental concept at both the local and global levels which that of "navigation of the informational geometry" space. In the local case of an individual Quanton this amounts to choosing how to embed a regular grid or lattice into a shaped geometry. Details of choices for the lattice and the geometry are given in sections of the present disclosure in TABLE 1 of the present disclosure. In the global case, the informational geometry is the sampling procedure which explores the search space of the population or, put another way, the sampling function walks in the geometry of the Quanton population to select solution candidates as the space is explored.

STEP-4: In the local model of the Quanton, a non-linear directional probability density function according to TABLE 5 of the present disclosure and is assigned to the Quanton which results in each permutation, embedded at each lattice point have a transition probability to the next permutation or, at the user's discretion, the probability can also represent the likelihood of permutation observation. This enables the use of the L2 norm in operations of the Quanton. For example, the methods of general Bayesian reasoning and probability density redistribution on manifolds, such as the hypersphere, are known as Bayesian filtering and can use distributions such as the Kent or von Mises Fisher distributions and its simpler versions, Kalman filtering to update the distributions until some convergence or fixed point is reached.

STEP-5: A linear probability density is also associated to the Quanton by associating the tangent space at each lattice point of the manifold, which allows the use of the L1 norm in operations of the Quanton. Hence the Quanton combines both a linear and non-linear component associated to each permutation. The update of the Quanton proceeds by using the classical and flexible mixture models based on the Dirichlet process mixture model of Gaussian distributions in distinct tangent spaces to handle an unknown number of components and that can extend readily to high-dimensional data in order to perform the Quanton probability updates in its linear space.

STEP-6: The most unique part of the present disclosure is that, having set up the Quanton using the Landau numberings to generate permutations, a permutation gate operator, directly equivalent to Quantum Gates or Quantum Circuits is associated to the permutations so that permutation relationships on the Quanton correspond to the operation of a Quantum Operation. Further details of this mapping are provided in the disclosure corresponding to at least FIG. 19.

STEP-7: The Quanton can be directly used as a Quantum Emulator (i.e. a Quantum Virtual Machine) or, it can be then used in the Quanton Population where the Quantum Gate Operators replace the conventional notion of crossover and mutation operations on the usual bit-strings of classical computation: in this sense, the Quanton provides an evolutionary path to Quantum Circuits that produce problem solving quantum circuits using PMBGA as further detailed in the section corresponding to FIG. 39 of the disclosure. This is significant because the operations of the present disclosure all occur with very high efficiency at low polynomial cost and hence the system can be seen as an ultra-fast, scalable quantum emulator for problem solving using the new paradigm of quantum computing. If the Quanton is used in solving hard problems, it works as an approximate Turing machine model to approximate solutions to NP-Hard problems by probabilistic polynomial computation steps in an iterative population estimation of distribution algorithm to identify candidate solutions.

STEP-8: The evolutionary step is the main process in which new individuals are created within a population. As explained in the further details in the section of this disclosure corresponding to at least FIG. 18A, the evolution proceeds by application of Quantum Gate operators that will act on the gate states of the Quanton represented by permutations as described by embodiments of the present disclosure. Because this disclosure has a system and method for very fast operations to build and execute quantum gates, using Quantum Gate operators in permutational form, it is efficient to combine this quantum application and methods within classical frameworks like PMBGA in order to evolve quantum computing circuits within the population the serve as problem solvers.

STEP-9: Once the Quantum Gate operators have been selected, as in Step-8, the quantum circuits of the Quanton are updated and the estimate of distribution is updated.

STEP-10: A permutation distance function is used to measure the Quantum Gate solution. If the distance is small, then a solution is near. If the distance is far, then solution is still to be found. A critical piece of the Quanton is, therefore, the choice of a permutational distance function. There are several choices for the distance functions, such as the Hamming Distance between the output bit-strings of gate operations or Levenstein Distance as an edit distance between bit strings of the gate operations. However, the disclosure uses a permutational distance that is more closely aligned with the probabilistic nature of quantum systems: the distance measurement on permutations is based on the generalized Mallows model following the teachings of J Ceberio, E Irurozki, A Mendiburu, J A Lozano, "A review of distances for the Mallows and Generalized Mallows estimation of distribution algorithms", Computational Optimization and Applications 62 (2), 545-564 and is incorporated herein in its entirety.

The distance measure is an analog to the Levenstein Edit distance measure between strings except that in this case, The Mallows model is use which is a distance-based exponential model that uses the Kendall tau distance in analogy with the Levenstein measure: given two permutations $\sigma 1$ and $\sigma 2$, the measure counts the total number of pairwise disagreements between $\sigma 1$ and $\sigma 2$ which is equivalent to the minimum number of adjacent swaps to convert $\sigma 1$ into $\sigma 2$. As noted in section of the present disclosure corresponding to FIG. 39, this is actually equivalent to a Quantum Gate operator in the Quantum Permutational computation regime presented in this disclosure. Hence, the evolution, using this distance measure, seeks optimal quantum circuits performing the problem solving.

STEP-11: Those Quantons that produce the solutions are evaluated for fitness either by computing an output solution state as a bit-string or that are computing the solution state as population are injected back into the population based on a distance function that measures the fitness. If the fitness is sub-optimal with respect to a threshold then the population is injected back and parents are deleted, leaving in place more fit child Quantons. If the system has exceed as user defined threshold for the number of iterations, or that the Quantons have achieved a desired level of fitness, then they are returned as solutions to be utilized.

The probability model is built according to the distribution of the best solutions in the current population of Quantons. Therefore, sampling solutions from a Quanton population model should fall in promising areas with high probability or be close to the global optimum.

Generally, a Quanton virtual machine, which applies the Quanton computational model, has all the properties required of a model of computation based on the original Turing machine. Additionally, the Quanton computational model represents various computational problems using probability distribution functions at lattice points on a high-dimensional surface (e.g., a hyper-sphere or an n-torus) that are represented by permutations. The unique combinations of features provided by the Quanton computational model overcome many of the above-identified challenges with more conventional computational and machine learning models.

For example, as identified above, conventional models of machine learning can falter when assumption assumptions about the congruence between training and solution data cannot be made or when a new model that did not exist before has to be created. In these cases, the Quanton computational model can advantageously mitigate these limitations of conventional methods because, without ignoring the nice linear properties of the traditional methods, local features and intrinsic geometric structures in the input data space take on more discriminating power for classification in the present invention without being overly fitted into the assumption of congruency because non-linearity is also accounted for.

Additionally, while the EDA model has many beneficial properties, as described above, the Quanton computational model can improve upon these. The unique difference with the Quanton model relative to the standard EDA model is that the Quanton model combines the directional (non-commutative, geometric, and usually complex) probability density functions in a representation of structure based on a lattice of permutations (state spaces) with a probability density on the locally linear tangent space. The permutations can index or represent directly, any other model or pattern structure as will be shown in the present disclosure. The directed probability density represents the non-linear components of data and the tangent space represents the linear components. Therefore, the Quanton model distinguishes between directional or complex probability densities and structure while the conventional EDA model uses only isotropic probabilities and without and kind of state-space structure or lattice.

As described in detail later, the permutations are generated and embedded on a lattice that tessellates the manifold: an example of such as lattice is the Fibonacci lattice and an example of a corresponding assignment of permutations to points of the lattice is the Permutohedron or, preferentially, its more optimal representation as the Birkhoff Polytope of permutation matrices. Further details of the structure are provided in several embodiments of the present disclosure; however, it is important to note that, in the Quanton, every discrete structure has a unique non-linear as well as linear probability density function space that is associated to it.

The nearest related concept to the Quanton is that of a probability simplex, which has been used in natural language processing, for example, for topic analysis. Points in the probability simplex represent topic distributions. The differences between two probability distributions results in topic similarity. Distance metrics are not appropriate in the probability simplex since probability distribution differences are being compared and the divergence based measurements based on information-theoretic similarity, such as Kullback-Leibler and Jensen-Shannon divergence and Hellinger distance, which are used do not conform to the triangle inequality. However, the probability distributions over K items, such as topics, are simply vectors lying in the probability simplex to which a single probability distribution is assigned. Therefore, large datasets represent documents by points (i.e. vectors) in the simplex: these cannot be addressed with the usual methods of nearest neighbors or latent semantic indexing based approaches. The inability to perform fast document similarity computations when documents are represented in the simplex has limited the exploration and potential of these topological representations at very large scales.

To further illustrate and emphasize the difference between the Quanton model and the EDA model, a plain Euclidean Sphere is utilized as an example, emphasizing that this is simply a special case of the more general hypersurfaces as defined in the present disclosure. Firstly, there is a directional probability density that can be assigned onto the surface of the sphere which is itself a non-linear space; and, secondly, at any point on the surface of the sphere, a tangent space at the point of tangency can be defined that is a linear subspace, which can also contain its own probability density function. The Quanton thus combines both linear (in the tangent space) and non-linear components (in the spherical surface space) probability density functions with respect to the structure of data. The structure of the data is itself indexed or represented by permutations.

Furthermore, the Quanton model is a hybridization of the ideas of the probability simplex and the EDA approach with a new fast encoding so that computations can be achieved in low polynomial time. The encoding relies on using geometric algebras to represent the Quanton and to simplify computations, when further needed, by re-representing the Quanton in a conformal space: in effect nearest neighbors and comparative search becomes represented by a distance sensitive hash function, which encodes related documents or topics into the linear subspace of the Quanton's non-linear base space.

A geometric algebra (GA) is a coordinate free algebra based on symmetries in geometry. In GA, the geometric objects and the operators over these objects are treated in a single algebra. A special characteristic of GA is its geometric intuition. Spheres and circles are both algebraic objects with a geometric meaning. Distributional approaches are based on a simple hypothesis: the meaning of an object can be inferred from its usage. The application of that idea to the vector space model makes possible the construction of a context space in which objects are represented by mathematical points in a geometric sub-space. Similar objects are represented close in this space and the definition of "usage" depends on the definition of the context used to build the space. For example, in the case of words, with words as the objects, the context space can be the whole document, the sentence in which the word occurs, a fixed window of words, or a specific syntactic context. However, while distributional representations can simulate human performance (for example, LSA models) in many cognitive tasks, they do not represent the object-relation-object triplets (or propositions) that are considered the atomic units of thought in cognitive theories of comprehension: in the Quanton model, data are treated as permutation vectors. Therefore, in the case of linguistics, words are simply permutations over phrases, which are permutations of sentences, which are themselves permutations of paragraphs and texts in general. In the case of image data, the permutations are based on pixels to produce texels, and permutations of texels produce the image.

As mentioned above, conventional computational models can suffer because they use classical approximation techniques to reach a solution that is inexact but closely representative of the decision solution. A challenge with this type of approximation is that the real problem may be non-linear and allowing for non-linear functions results in a much broader expressive power. However, conventional methods for combining both linear and non-linear structure in the same model are largely ad-hoc. The Quanton model provides a homogeneous method for combining both representations and therefore simple procedures for probabilistic learning or inference are used. Further, as mentioned above, learning methods such as Expectation Maximization (EM) strategies or Maximum a Posteriori (MAP) inference can each have their own sets of challenges.

The Quanton model also uses an embedding approach, while leveraging the benefits of higher granularity in being able to handle higher-dimensionality, reducing false positives or negatives and dealing with missing data. Given an appropriate choice of sampling points, noisy partial data can be reconstructed in O(dNK) time, where d is the dimension of the space in which the filter operates, and K is a value independent of N and d.

For example, recent work on accelerating high-dimensional Gaussian filters has focused on explicitly representing the high dimensional space with point samples, using a regular grid of samples. When the space is explicitly represented in this way, filtering is implemented by resampling the input data onto the high-dimensional samples, performing a high dimensional Gaussian blur on the samples, and then resampling back into the input space. This process is usually defined in the literature as the three stages of splatting, blurring, and slicing. Furthermore, unlike other systems, the present system can be used in machine learning to induce filter responses based on training data inputs. Instead of using only a regular grid of samples, one can augment the approach and use the permutohedral lattice, which tessellates high-dimensional space with uniform simplices. Further, one can apply a probability density measure to this tesselation in a machine-learning phase to configure the lattice with priors for inference. The tessellating simplices of the permutohedron are high-dimensional tetrahedra, and therefore the enclosing simplex of any given point can be found by a simple rounding algorithm (based on the quantization resolution). Using the permutohedral lattice for high-dimensional of data with n values in d dimensions has a time complexity of $O(d^2n)$, and a space complexity of $O(dn)$, but with the encoding of the present invention as a sorting orbitope, this complexity reduces to $k \cdot \log(d)$.

Once the machine learning phase is completed, and, the application commences the use of the learned patterns, it is important that these learned patterns are robust and resilient to noise as well as capable of running at high rates, high data throughput in the goal of large-scale online real-time knowledge processing. A key learning problem is that of structure identification, which is finding the best structure that represents a set of observed data. While the problem is in general NP-Hard, the data representation techniques provided in the present disclosure provide the means for fast approximation as a solution.

The Quanton can be applied to anticipatory computing, and in particular, abducing plausible causal states of scenarios, or forecasting potential likely surprise outcomes. The Quanton can be used to compute sets of reachable states as defined by learned trajectories on its manifold: if this set does not intersect with a specified set of hypothetical (i.e. possible counterfactual) states, the Quanton will not predict a likely surprise outcome—however, if the set does intersect, then the outcomes are plausible and could constitute a surprise, given by the trajectory.

In general, quantum computing, machine learning, and artificial intelligence as well as classical probabilistic computing can benefit from reversible circuits and high speed, high efficiency, compact computational representations and algorithms that can scale to super exponential (i.e. beyond exascale) inference and data space sizes. Reversibility leads to substantially improved lower power consumption compared to current technologies both for software and hardware design. The representation and synthesis of reversible logic circuits is the key step for quantum computing: it is also of interest in new types of encryption and computation. The major challenge in synthesizing general types of probabilistic reversible circuits that carry out general computation, machine learning, and inference, is that the state space becomes exponentially large as the number of inputs increases. Embodiments of the present disclosure describe a system of representation and computing method in both classical probabilistic and quantum computing or quantum emulation on classical computers that is fast, efficient, and uses a highly compact representation. Any computable function can be embedded into a reversible function: this means that it can be represented as a permutation. Aspects of the present disclosure reformulate the computation of functions by permutations and embed these into a probability space for realization of a probabilistic polynomial Turing Machine computing model that emulates quantum-like computing and performs several practical data processing functions.

The present disclosure provides techniques of reversibly mapping discrete or symbolic data representations onto a permutation representation embedded in a special probabilistically configured space such that computation steps simulating various decision or logic gate processes can be calculated by shortcutting arbitrarily complex operation sequences into one. The space is quantized and each quantization provides an index that enables the reversible mapping to be efficiently computed. The quantization is performed by a construction that builds a lattice. The quantized space and the reversible discrete to spatial embedding operations provide a data structure for approximate machine learning and approximate computation. The computations can be exact or approximate. In the case of approximation, the quantization can be made fine enough that the difference between an ideal analytic result, and its approximation can be made negligible. The data structure and algorithms collectively define a virtual machine that is referred to herein as a Quanton or the Quanton Virtual Machine (QVM).

In what follows is provided a description of the QVM as a quantum-inspired data representation, computation model and algorithm, for performing indexing, clustering and inference in very high dimensional and combinatorially complex domains. The Quanton encodes data in a manner that algorithms as specified herein perform efficient quantum-like computing on arbitrary data: it must be appreciated that the term quantum-like is used herein, because the action of the Quanton is to act on all possible solution paths within a single virtual clock cycle of the Quanton's virtual machine operation as defined by aspects of the present disclosure.

The Quanton emulates quantum-like computing by encoding high-dimensional parallelism into a single computation step. The Quanton provides a new approach for efficiently performing high-quality, high-dimensional, inference, missing-data interpolation, synthesis and filtering while using sparse training samples. The Quanton avoids the shortcomings found in mainstream techniques. Quantons can be fabricated on current software as well as hardware chip technologies (e.g., Field Programmable Gate Arrays (FPGA), Very Large Scale Integrated (VLSI) Circuits) and the present disclosure for the Quanton includes both the preferred embodiment of software as well its hardware specification.

The Quanton model provides efficient approximations to any degree of user defined accuracy in the following example applications as listed below.

1. learning and ranking preferences;
2. cognitive image understanding;
3. computer-music (e.g. automated accompaniment or musical phrase synthesis); large complex air-traffic control;
4. automatic target recognition and target tracking;
5. high-dimensional factorially Big Data inference, radar and other signal track identity assignment;
6. computer graphics and video analysis;
7. densely coded point-set registration (pixel, voxel or quantum lattice structures);
8. robotics, biometrics, machine learning, such as clustering, experimental design, sensor placement, graphical model structure learning, subset selection, data compression, resource allocation, object or target tracking and other problems with factorially large (state) spaces, alignment problems for rigid objects and detecting similarities between multi-dimensional point sets.
9. Semantic or textual applications such as the discovery of paraphrased paragraphs across different documents that share similar topics and;
10. Cryptography (i.e. pattern discovery in hidden codes).

The Quanton model can process both linear and non-linear correlations for estimating the distribution of some outcome (i.e. probability measure) from data that are naturally observed as groupings or strata given a set of correlated variables under conditional likelihoods. For example, in case-control clinical studies the conditioning is performed on the histogram of the observations in the stratum, which is equivalent to considering all permutations of the unique elements of the case-control response vector: this produces the need to computationally perform a summation over a factorially growing number of terms, which is infeasible on classical computers. The Quanton solves these problems by geometric approximation: it can perform an embedding of this stratified conditional likelihood into a permutation orbitope, onto a hypersphere or hypertorus, which, ultimately, replaces the messy and lengthy combinatorial sums with a single simple vector term that produces the solution in $(n)\log(n)$ steps (instead of factorial n).

The Quanton is not a quantum-computer in the pure technical sense of Quantum Computing as usually defined, which is a "computer that makes use of the quantum states of subatomic particles to store information" (Oxford English Dictionary) but is inspired by the properties and the concepts of quantum systems. The present disclosure defines the Quanton in terms of a probabilistic (geometric) Turing machine based on a discrete state representation encoded using permutations with a continuum representation using either real or complex Estimation of Distribution Algorithms (EDA). The Quanton model represents an approximation model of quantum-like computing to emulate the kinds of results that could be achievable on a topological quantum computer (TQC). In the TQC model, any computation can be solely defined by permutations (i.e. that permutations solely define computations on a Quanton based virtual machine) as described by Stephen P. Jordan. in "Permutational quantum computing", Quantum Info. Comput. 10, 5 (May 2010), 470-497, which is incorporated by reference herein in its entirety.

The Quanton virtual machine enables classical computers to approximate solutions to problems that might be infeasible or certainly highly non-obvious to achieve by any other approach except by true quantum computing (i.e. using the states of subatomic particles). The Quanton is best described as an approximating Turing machine in which any state representation is mapped to a state represented by permutations: each computational step is represented by a permutation transition model where the transition is a directed probability from one permutation to another as equivalent to the transition between one state representation (or state space) and another.

The continuous model of the Quanton is created by embedding the permutations in a probability density distribution or a mixture model of probability densities via building quasicrystals (quasi-lattices) using numbers such as the Fibonacci numbers or sampling from other sequences, such as from the Champernowne number, or utilizing the techniques as described by T. N. Palmer in "A granular permutation-based representation of complex numbers and quaternions: elements of a possible realistic quantum theory, Proc. R. Soc. Lond. A 2004 460 1039-1055; DOI: 10.1098/ rspa.2003.1189", Published 8 Apr. 2004, which is incorporated herein by reference in its entirety.

The general idea is to associate numbers (from permutations) derived from models of numberings, such as sequences (such as Fibonacci or Champernowne) to create a quasicrystal lattice that embeds a quantized (or granular) version of a geometric object, such as the Riemann Sphere, and onto which probability density can be assigned. More specifically, the lattice points are associated to permutations that represent states or data structures of some type as will be explained herein. Further, a probability density can be embedded to the geometric object, such as the n-sphere, which can be complex, but its real output is a directional probability distribution on the manifold of the object representing a pattern of possible states as a function of the permutations.

Permutations represent a state model. Of specific importance is the type of permutation operation (i.e. how a permutation of elements is performed algorithmically), as the choice of permutation operation defines the class of models to which the Quanton is optimally applicable. A specific position value on the sphere defines a state, which represents a surrogate for a quantum particle state. The ensemble of all values on the countable set of paths on manifold of the geometric object (for example the n-sphere), therefore, is a surrogate for a Hilbert-space quantum wave function.

By one embodiment, the Quanton is a software element that may represent any data structure using a permutation representation coupled with an embedding into a probability density space (manifold), with algorithms as specified in aspects of the present disclosure. The Quanton forms a surrogate model for approximating quantum-like computing on classical processors, and in future quantum processors the Quanton is an exact model for complex inference in high dimensional spaces.

The Quanton on a classical processor produces very fast results with minimal iteration, in which the iteration (i.e. generations of population evolution and Kalman-like iteration steps in the probability manifold) in a machine-learning of data cycle, can in many cases, be performed in a single pass. The Quanton data representation enables space and time efficient representation of extremely highly complex data: it also enables algorithms presented herein for reducing the computation space and time of quantum simulations based on genetic algorithms, most notably, the estimation of distribution algorithm (EDA), also known as probabilistic model building genetic algorithm (PMBGA).

By one embodiment, the Quanton uses the following unique embeddings: a permutation or association orbitope, a nonlinear manifold with a probability density function, a lattice for indexing points of the manifold corresponding to points of the orbitope, and a tangent-space at the indexed point for representing the linear subspaces. As one example of a specific instance of a Quanton, consider the Quanton built using a spherical Fibonacci lattice. The Fibonacci lattice defines the indexed points, corresponding to the points of a permutohedron. These points are inscribed in the continuous manifold of a hypersphere. The manifold of the hypersphere is associated with a geometric directional probability density function, such as the von-Mises Fisher function. A tangent space at the lattice point is also associated with its linear sub-space and probability distribution, such as a Gaussian.

Quantons can be assembled hierarchically by embedding Quantons into Quantons or forming networks of Quantons: in the case of networks, the Quantons provide path-anticipation-evolution (PAE) in which connectivity is anticipated as data enters the network because the probability density and permutation functions of a "learned" Quanton provide an structural anticipatory capability. An example of path anticipation, as used in real time tracking and collision avoidance is provided by J. Park, S. Kang, N. Ahmad and G. Kang in "Detecting collisions in an unstructured environment through path anticipation," 2006 International Conference on Hybrid Information Technology, Cheju Island, 2006, pp. 115-119, which is incorporated by reference herein in its entirety.

Quantons are developed in order to handle inference in extremely massive high-dimensional complicated domains in multimedia or multisensory data as well as in difficult combinatorial optimization problems where data spaces can be factorial in the size of inputs. Because of the huge number of these data and their high dimension, conventional classical indexing or search methods as well as traditional inference procedures are far too inefficient to be useful even with modern supercomputing power. For these kinds of problems which include, but are not limited to, optimization problems, Quantum computing has been proposed as well as various other heuristic approximation models, such as EDA models.

Two versions of EDA models are Particle-Swarms and Ant-Colonies for optimization problems. However, none of these various disparate approaches has integrated a robust, flexible software data representation beyond bit-vectors as the fundamental data structure on which the probabilistic, mutation, crossover and other evolutionary operators function upon.

The Quanton is made up of a continuous directional probability distribution whose discrete substructure is made up of the vertices of an orbitope. This geometric shape could be inscribed within a hypersphere (a manifold), and its associated locally linear tangent space, which is a surrogate for a non-directional probability space on the directed probability space. The states form a surrogate to outcomes of corresponding quantum states. Examples of such outcomes include results, inferences or configurations in data clustering, analysis and reasoning applications as mixtures of probability densities.

The data representation and method of the present system is also ideally suited as a bridge from implementations on classical computer architectures (i.e. Von Neumann models) to analog-computer, hybrid analog-digital and fully quantum computer models.

One of the key ideas is to connect the way that orbitopes (i.e., combinatorial polytopes), such as the permutohedron and associated zonoids, can be compiled by embedding them into the surface of a hypersphere or hypertorus or other geometric object with probability distributions that are oriented in ways that represent data behaviors, while at the same time providing an efficient indexing method (as provided by the lattice of the present disclosure).

By one embodiment, the Quanton of the present disclosure combines five key ideas: (i) combinatorial polytopes, (ii) manifold embedding, and (iii) directional probability density (iv) lattices; and, (v) tangent spaces. The Quanton provides a quantum surrogate data representation (for example, by combing the permutation structure here with the teachings of Palmer as referred earlier in this disclosure, on which the novel and non-obvious result is that a variety of (non-parametric) inference processes can be applied as surrogate quantum computing approximators. These approximators provide a degree of approximation producing results that are close to but not perfectly matching the fidelity of a true quantum computer, but easily amenable to a quantum computer for artificial intelligence (also known in the art as Quantum Artificial Intelligence).

For the purposes of simplifying the disclosure, we will use the n-Sphere (i.e., hypersphere) as our geometric object in order to illustrate, disclose, and explain the core working algorithms and methods of the present disclosure. However, it must be appreciated that other geometric objects (e.g. hypertorii) are equally applicable.

Selecting, ranking and inference using such large sets of data objects lead to rule-structures in which the permutations of data objects, and therefore, the number of rules or possible chains of inferences becomes factorial in the number of entities (n!).

The Quanton data representation and algorithm provides an embedding of all n! permutations of any object set, for a given number of objects (entities) in a surface of a combinatorial hypersphere is defined in R(n−1) of a space in R(n+1). The Quanton provides n(log(n)) time algorithms, at worst case, kn(log(n)), between the combinatorial hypersphere representation, quantum computing surrogate data representations, and the n!-element combinatorial time and space complexity reduced to a simple polynomial, that is required in inference. Aspects of the present disclosure provide a way to use continuous Morton Codes that can be associated to directional probability densities and other methods for establishing probability densities over arbitrary states or structures that can be represented as permutations using the algorithms described herein.

The method can handle a large number of objects, emulate traditional probabilistic data association algorithm results, differentiate weak signals in conditions of high noise, handle chirality and can scale to data sizes that are not by the state of the art mainstream inference methods known to those skilled in the art. The Quanton is ideally suited to implementation on both Quantum and Classical computers.

Referring now to the drawings, wherein like reference numerals designate identical or corresponding parts throughout the several views. In describing the embodiments in detail some conventional notation is used that is defined in the foregoing.

n is the length of a permutation.

$\pi_{1_n} = (1, 2, 3, \ldots, n)^T$ is the Identity Permutation.

$p^n$ is the set of all permutation vectors of length n.

$\pi \in P^n$ is any permutation.

$p_i$ is the i-th indexed element of the permutation vector, p.

$\pi_{1(n)}$ is the vector of length n whose entries are all set to 1.

$P^M$ is the set of n×n permutation matrices containing ones and zeroes with a single one in each row and column.

The convex hull of the set of n×n permutation matrices is the Birkhoff polytope denoted $\mathcal{B}^n$. The set of all doubly-stochastic n×n matrices is:

$$\{X \in \mathbb{R}^{n \times n}; X \geq 0, X\pi_{1(n)} = \pi_{1(n)}, X^T\pi_{1(n)} = \pi_{1(n)}\}$$

The permutahedron, $P\mathcal{H}^n$ is the convex hull of permutations, $P^n$, has $2^n - 2$ facets and is defined as follows:

$$P\mathcal{H}^n = \left\{ x \in \mathbb{R}^n; \sum_{i=1}^{n} x_i = \frac{n(n+1)}{2}, \sum_{i \in S} x_i \leq \sum_{i=1}^{|S|} (n+1-i) \forall S \subset [n] \right\}$$

The permutohedron is the projection of the Birkhoff polytope from $\mathbb{R}^{n \times n}$ to $\mathbb{R}^n$ by $$x_i = \sum_{j=1}^{n} j \cdot X_{ij}$$

Let $v_n = (v_1, v_2, v_3, \ldots, v_n)$ and $u_n = (u_1, u_2, u_3, \ldots, u_n)$ be two vectors pointing to vertices in the permutohedron and let the distance between u and v be d(u,v).

Further, define the ε-neighborhood of u as:

$$N(u, \varepsilon) = \{v \in \text{Permutohedron} | d(u,v) < \varepsilon\}$$

for example:

for $0 \leq \varepsilon < \sqrt{2}$ the the ε-neighborhood $N(1324, \varepsilon) = \{1324\}$, and for $\sqrt{2} \leq \varepsilon < \sqrt{4}$ the the ε-neighborhood $N(1324, \varepsilon) = \{1324, 1234, 2314, 1423\}$.

When vertices are adjacent, then $(u,v) = \sqrt{2}$, and there are $(n-1)$ adjacent vertices for each point of the Permutohedron.

Further, let a set of real numbers be given as: $x = \{x_1, x_2, x_3, \ldots x_n\}$. The permutation is defined as: $P(X) = \{x_{i_1}, x_{i_2}, x_{i_3}, \ldots x_n\}$; $1 \leq i \leq n$.

The permutahedron is a submodular polyhedron. Permutohedra are simple zonotopes. Zonotope theory is equivalent to the theories of vector configurations: realizable oriented matroids and of hyperplane arrangements. The hyperplanes for each dimension v are given by:

$$\sum_{i=1}^{n} v_i = v_1 + v_2 + v_3 + \ldots + v_n = \sum_{i=1}^{n} i = \frac{n(n+1)}{2}$$

The points of the Permutohedron are on an (n−1)-sphere (hypersphere) in n-dimensional space and given by:

$$\sum_{i=1}^{n} (v_i)^2 = v_1^2 + v_2^2 + v_3^2 + \ldots + v_n^2 = \frac{n(n+1)(2n+1)}{6}$$

In the Birkhoff polytope, two neighboring vertices differ by a single transposition for the symbols: v; ∞; ×n; $\wp$; Ω; $\Omega^d$.

It is also helpful to introduce a penalty to force a result in the continuous space of probability distributions at a solution x to be closer to a permutation, that is, a vertex of the permutahedron. To this end, what follows is a vector-based regularization scheme defined by the following rules:

Rule 1: Let $v \in \mathbb{R}^n$, and the set X consisting of the convex hull of all permutations of v. Define the points in X with the highest $l_p$ norm, for $1 < p < \infty$, as permutations of v.

Rule 2: All n×n permutation matrices in $\mathbb{R}^{n^2}$ are extreme points of a convex $(n-1)^2$ dimensional polytope, which is the convex hull of all bistochastic matrices.

Rule 3: Embed n! elements to the surface of a $(n-1)^2$ dimensional hypersphere.

Rule 4: Set the extreme points of the Birkhoff polytope and the permutation matrices for any bi-stochastic matrix, to the surface of a radius $\sqrt{(n-1)}$ hyper-sphere clustered around the center of mass of all n! permutations; all in $\mathbb{R}^{n^2}$.

Let the permutation matrix be denoted as $\mathcal{M}$ and a specific permutation matrix as $\mathcal{M}_k$ and a specific element at a cell in the matrix as $\mathcal{M}_{(i,j)}$ Rule 5: Set the $(n-1)^2$-dimensional affine subspace in $\mathbb{R}^{n^2}$, to contain all permutations $\mathcal{M}_k$ as well as the hyper-sphere of Rule 4, by the intersection of 2n−1 hyperplanes with normals.

$S^d$ is a d-dimensional hypersphere in $\mathbb{R}^{d+1}$ with dimension: $d = (n-1)^2 - 1$ All permutation matrices, $\mathcal{M}_n$ on n objects are set to be on the surface of a hypersphere $S^d$ of radius/$\sqrt{(n-1)}$ n in $\mathbb{R}^{(n-1)^2}$ using the previous rules. Therefore, for example, 3 permutations are in a 4-dimensional space. In the conformal model, 3 permutations are in a 5-dimensional space since the conformal model adds the point at infinity.

Rule 6: Define $S^d$ centered at the origin. The requirement is transformation between the basis between the space of $\mathbb{R}^n{}_2$, and the space of $\mathbb{R}^{(n-1)^2}$.

Define a probability density function on $S^d$ and use it to reference the discrete n! permutation space. This feature is useful in the present disclosure as it describes a way to efficiently transform elements of one space, the continuous space of the probabilities, into the other space, a quantized discrete state space whose structure is represented by permutations.

Rule 7: Define the transformations between the discrete n! permutation space and the surface of the origin-centered convex $(n-1)^2$ dimensional hypersphere of radius $\sqrt{(n-1)}$ in polar coordinates and the radius of the hypersphere normalized to unity.

Rule 8: Refer to all permutations using their Lehmer code as the index to the permutation and set a regular origin on the coordinate of the hypersphere between the Lehmer code and the coordinates in polar angles.

Rule 9: Define the $n^{th}$ Lehmer code to be the $n^{th}$-Fibonacci point on the Fibonacci spiral lattice (respectively, sphere and hypersphere) from the origin in dimensionality, d>2. Therefore, every permutation is a point on a lattice and, by Rule 6, also a bounded region of probability density (bounded by the quantized induced on the continuous manifold by the lattice).

Rule 10: Define the Tangent Space at the $n^{th}$ Fibonacci spherical lattice point, S, corresponding to the nth Lehmer code, to be the linear subspace, T at S.

Rule 11: The Reciprocal Lattice of a polytope such as a Permutohedron, Calabi-Yau Polytope, or any quasi-crystalline generating function can be used instead of the Lattice to quantize the continuum of a given manifold such as the (hyper)-sphere or torus or other continuous manifold structure such as the Calabi-Yau manifolds.

Rule 12: Define tangent spaces to be linearly dependent on the reciprocal lattice within an uncertainty of epsilon, corresponding to the uncertainty of choosing the correct nearest lattice point to the space of tangency.

A unit vector x of dimension-d is said to have the multivariate Watson distribution if its probability density function is given as:

$$f(\pm x | \mu \kappa) = M\left(\frac{1}{2}, \frac{d}{d}, \kappa\right)^{-1} e^{\kappa(\mu^T x)^2}$$

where $$M\left(\frac{1}{2}, \frac{d}{d}, \kappa\right)$$

is the confluent hyper-geometric function also known as Kummer function.

Definition 1: The information-carrying degrees of freedom are referred to herein as observable, denoted as o and the other degrees of freedom in the system that may carry virtual information as hidden, denoted as h. The description of the state that results from a quantum state tomography procedure is given by the density matrix, $\mathcal{D}$.

The key approach is to separate the state explicitly into observable and hidden parts and to calculate the observable parts and their constraints using the quantum statistical needs of the whole state.

Definition 2: The real observable permutation that includes a sequence of symbols in a particular order we call the permutant and another, hidden sequence of symbols (possibly acting as fixed constraints) that we shall call the permuton. An operation of applying the permuton to the permutant will result in a permutrix.

Definition 3: The probability measures are observable at the vertices of the lattice (e.g. Fibonacci Lattice) and the points within the subspace bounded by the lattice points are undefined: in other words, we interpret the space in analogy to a quantum Psi-Epistemic theory in which the lattice points provide observables while the intervening regions are transition spaces, remain undefined.

Definition 4: The Quanton

A Quanton comprises the following data elements:
(1) A geometry that is symmetric and in the form of a continuous manifold;
(2) A lattice (and therefore a topology) that partitions the symmetry group of the manifold and an optional tangent plane at the point of the lattice that provides a linear subspace embedded in the manifold;
(3) An index to the points of the lattice that associate a permutation of the integers to each;
(4) A rule for transition from one permutation to another between lattice points; and,
(5) A probability density function that associates a transition probability between points of the lattice.

Given the elements of the Quanton, one can identify the specific operational rules by which the QVM operates to perform its functions. For the purpose of simplicity and clarity of the exposition of the method of the present disclosure, a spherical geometry in the form of the n-Sphere will be used throughout to show the exact algorithms and processes, noting that these shall be obvious to apply to other geometries.

Definition 5: The Quanton Language is defined herein as a reversible language of operations that correspond to movements between permutations and these movements are reversible between lattice points.

An n-Sphere is an exemplary geometry and topology for the Quanton data structure. Other geometries such as the n-Torus or other manifold structures, such as the Calabi-Yau can be used also. The Quanton is an object that is composed of a polytope whose kissing vertices inscribe a hypersphere such that the kissing vertices correspond to points on the Fibonacci spherical lattice as well as to permutations.

The surface of the Quanton will usually have a probability distribution or probability density function (PDF) associated with it such as the von Mises Fisher, Watson, Gaussian or a mixture, as well as complex versions of these probability density functions such as the complex Bingham or complex Watson distribution on the complex n-sphere. The Quanton is, therefore, by one embodiment, a software data structure composed of at least, the PDF, a discrete lattice and certain algorithms as presented herein for computation or learning deep patterns in complex data.

The Quanton may be an object that is composed of a polytope whose kissing vertices inscribe a hypersphere such that the kissing vertices correspond to points on the Fibonacci spherical lattice as well as to permutations. The surface of the Quanton will usually have a probability distribution associated with it such as the von Mises Fisher, Watson, Gaussian or a mixture, as well as complex versions of these probability density functions, that the present disclosure defines as the software data structure and associated quantum-inspired algorithms for learning deep patterns in complex data. One example is a tangent plane to one of the vertices, a normal vector at the point and a probability distribution, not limited to, for example, a Gaussian distribution, about the point on the tangent space. This structure enables a mix of probability distributions on either or both the surface and the tangent spaces to the points on the surface for a variety of mixtures to be represented.

The Fibonacci spiral lattice permits fully analytic solutions to the distribution of points as coordinates on the surface of a hypersphere and these points number in the same quantity as the permutation sequence. The relationship between a permutation sequence the Fibonacci lattice, as explained in the present disclosure, is such that the vertices of the permutation polytope intersect the Fibonacci lattice so that all point on hyper surface to permutation and vice-verse are indices of the Fibonacci lattice, in analogy with space filling curve indexing, such as the Hilbert Curve. The arrangements of the vertices is also important so the vertex to vertex relationships are not random: for example, given a set of four integers, (1, 2, 3, 4) there are 4!=24 ways of arranging them, however, the geometries by which these 24 numbers may be written down, which is to say, their ordering, is itself 24!. Therefore, the Quanton requires a certain kind of regular ordering using an ordering rule. These rules will be stipulated further in the embodiments under FIGS. 13A and 13B for exemplary topologies of the orbitope characterizing the Quanton.

Table 1 shows the types of geometric objects usable for design of the Quanton:

TABLE 1

Lookup Table for Quanton Construction

| Manifold Type | Lattice Constructor | Probability Distribution |
|---|---|---|
| Calabi-Yau | Bravais Lattice | Lattice Green Function, Lp measure |
| n-Sphere | Fibonacci | Univariate Directional, L2 measure |
| n-Torus | Fibonacci, Fermat | Bivariate Directional, L2 measure |
| n-Cube | Binary | Uniform, L1 measure |
| n-Simplex | Simplicial polytopic number | Any |
| 2-polygon | Figurate Numbers | Any |
| Zonotope | Any | Any |

FIG. 2 shows the unique methodology and representation of a permutation sequence 16 at the vertices 12 called a Permutrix 15. The permutrix 15 is composed of a permutation pattern, the permutant 13, which is the visible part of a permutation pattern, and other entries, called the permutons 14, whose purpose is to serve as the invisible parts of a permutation pattern. The Permuton 14 can serve as a constraint system by making its positions invariant to permutations of the other elements, the Permutant 13. One analogy is to think of the permutant as the allowed moves and the permuton as the blocked (disallowed) moves in some game: in 2-dimensions, the game can be Chess, as one example of many.

The permutrix like the preceding description for the Quanton, also can generate, for n-permutants and d-permutons (n+d)!, and the number of orderings of the arrangement of ((n+d)!)! geometric orders. This point bears some importance as the ordering determines the starting sequence for any index, and the order itself determines the relationships that govern the way the index behaves. Given that the d-permutons could (as one possible rule of many) act as "dummy" variables and if deleted, results in some sequences that will be repeating. The role of the permutons will become clear in the foregoing but the permutons can also play the role of virtual-particles that enable other operations and relationships to control the permutants and the factors depending on permutant relations. As one concrete example, permutants can be indexed by the natural integers (1, 2, 3 . . . N), while permutons can be indexed by imaginary valued natural integers (i1, i2, i3 . . . iN) so that other operations can result in output indices by combining the permutants and permutons in certain ways (e.g. complex conjugation). Of importance is that the consecutive permutations in which the numbers of inversions that differ by one, forms a Gray code based on the Lehmer code (factoradics) from the in Steinhaus-Johnson-Trotter algorithm. Therefore, using the Lehmer code, the $n^{th}$-inversion is deterministically computable.

Any data structure of any kind can be represented by a permutation and the permutation can represent sequences, sets and multisets: therefore, one can use permutations as the most fundamental building block for both data representation and computation by the method and algorithm expressed below.

The factoradic numeral system replaces digits multiplied by a power of a base n with digits that multiply successive values of the factorial of n. The Lehmer code, which is a sequence of factoradics, represents a permutation uniquely, and also can be represented using a natural number. The natural number is computing by first computing a rank for the permutation of size greater than zero by first computing its Lehmer code, and then associating a unique natural number to it by converting it from its factoradic representation into decimal. In this way, it easy to reconstruct any permutation from its Lehmer code, which in turn is computed from the permutation's factoradic representation.

Given the preceding, therefore, the procedure for converting between arbitrary lists, sequences, sets and multisets into permutations is represented as index numbers (i.e. a natural number from which the permutation and subsequently the source data structure such as multiset is recoverable without loss). The procedures for encoding and decoding between data structures, permutations and succinct integer representations covers all the other cases (sequences, sets and lists) and is given by the following set of transformation rules:

The factoradic numeral system as described by Knuth replaces digits multiplied by a power of a base n with digits that multiply successive values of the factorial of n. In the increasing order variant fr the first digit $d_0$ is 0, the second is $d_1 \in \{0, 1\}$, and the n-th is $d_n \in [0 \ldots n]$. For instance, fr(42)→[0, 0, 0, 3, 1]→0*0!+0*1!+0*2!+3*3!+1*4!.

The left-to-right, decreasing order variant fl is obtained by reversing the digits of fr. For instance, fr (42)=[0, 0, 0, 3, 1] and, therefore, fl(42)=[1, 3, 0, 0, 0]. The inverse of the procedure fr that transforms a factoradic into a list of numbers is denoted as rf that transforms a list of numbers back into a factoradic. Similarly, the inverse of fl is lf.

EXAMPLE fr: 42→[0, 0, 0, 3, 1];
rf: [0, 0, 0, 3, 1]→42;
fl: 42→[1, 3, 0, 0, 0]; and
lf: [1, 3, 0, 0, 0]→42

The rank and un-ranking of permutations is performed using Lehmer codes and their Factoradics. The function perm2nth generates the n-th permutation of a given size and, therefore, naturally represents a rank for any permutation of size greater than zero. It starts by first computing its Lehmer code Lh with perm2lehmer. Then it associates a unique natural number n to Lh, by converting it with the function lf from factoradics to decimals. Of special note for the present disclosure is that the Lehmer code Lh is used as the list of digits in the factoradic representation.

The function nth2perm is the inverse of perm2nth and provides a matching un-ranking that associates a permutation to a given size (greater than zero) and a natural number N. A permutation can therefore be reconstructed from its Lehmer code which in turn can be computed from the representation of the permutation as a factoradic.
Examples of the Bijective Mapping Follow:
nth2perm (5, 42)→[1, 4, 0, 2, 3]
perm2nth [1, 4, 0, 2, 3]→(5, 42)
nth2perm (8, 2008)→[0, 3, 6, 5, 4, 7, 1, 2]
perm2nth [0, 3, 6, 5, 4, 7, 1, 2]→4 (8, 2008)

Given the preceding process and application of methods of encoding permutations and numbers in with respect to Lehmer codes and factoradics, the present disclosure uses these facts to build succinct integer representations of data structures such as lists of natural numbers, arbitrary lists, sets and multisets.

Procedure-1: Encoding Lists of Natural Numbers (1) For any input multiset, first sort the multiset it as and then compute the differences between consecutive elements i.e. $[x_0 \ldots x_i \boxed{i+1} \ldots ] \to [x_0, \ldots x_{i+1}-x_i \ldots ]$. As an example: given multiset [4, 4, 1, 3, 3, 3] sort into [1, 3, 3, 3, 4, 4] and compute pair wise difference list as [1, 2, 0, 0, 1, 0].

(2) Given the result of step (1), re-encode the difference list by elements in the sequence of increments replaced by their predecessors: therefore, predecessors of the incremental sums of the successors of numbers in the sequence, return the original set in sorted form. For example, the first element of [1, 2, 0, 0, 1, 0] is the number 1 and is followed by its successors as the list [2, 0, 0, 1, 0]. Prefix sums of the numbers in the sequence return the original set in sorted form. For another more obvious example, given [1, 2, 3, 4, 5], the resultant difference list is [1, 1, 1, 1, 1].

(3) Given any set of natural numbers, such as {7, 1, 4, 3}, the application of the first two operations preceding produce the sort {1, 3, 4, 7} and then computing the differences between consecutive elements gives [1, 2, 1, 3], in which, with the first element 1 followed by the increments [2, 1, 3] we convert it into a bijection, including 0 as a possible member of a sequence, by taking the elements in the sequence of increments and replacing by their predecessors to produce [1, 1, 0, 2] such that this can be encoded using the Lehmer or factoradic into a natural number.

(4) Taking the output of (3), the predecessors of the incremental sums of the successors of numbers in such a sequence, return the original set in sorted form.

The (big-endian) binary representation of any natural number can be written as a concatenation of binary digits of the form $$n = b^{k_0} b^{k_1} \ldots b^{k_i} \ldots b^{k_m} \quad (1)$$

with $b_i \in \{0, 1\}$, $b_i \neq b_{i+1}$ and the highest digit $b_m = 1$.
Therefore, by one embodiment, a process is defined wherein:
an even number of the form $0^i j$ corresponds to the operation $2^i j$, and an odd number of the form $1^i j$ corresponds to the operation $2^i(j+1)-1$. Thus, the following equation holds true:

$$f^i(j) = 2^i(j+1)-1 \quad (2)$$

Therefore, each block $1^i$ in n, shown as $1^i j$ in representation (1), corresponds to the iterated application of f, i times, $n = f^i(j)$.

It follows from this fact that the highest digit (and therefore the last block in big-endian representation) is 1 and the parity of the blocks alternate that a number n is even if and only if it contains an even number of blocks of the form $b^{k_i}$ in equation (1). A number n is odd if and only if it contains an odd number of blocks of the form $b^{k_i}$ in equation (1).

Define the procedure compose (i, j, N) that outputs a single natural number, N, given two separate input natural numbers as follows:
compose(i,j)=$2^{i+1}j$ iff j is odd and $2^{i+1}(j+1)-1$ iff j is even
Therefore, in general, define procedure:

$$\text{compose}(i,j,N) = i \geq 0, j \geq 0, D = \text{mod}(j+1,2), N = (2^{i+1}(j+D))-D$$

Specifically, defined herein is that the exponents are i+1 instead of i as counting is defined herein to start 0. Note also that compose (i, j) will be even when j is odd and odd when j is even. The operation compose (i, j) is reversible and can be used to iteratively convert a list of numbers to a single number or can reverse from a single number back to the original list of numbers.

Define the procedure uncompose(N)=[i,j] that accepts a single natural number as input, and outputs two numbers i and j that composed it. The definition of the uncompose is the inverse of compose and utilizes a helper subroutine, divine(N,i,j) to identify the largest exponent of 2 dividing N. It is computed as follows noting that the symbol "||" means integer division.

$$\text{divine}(N,i,j) \to i = lsb(N), j = N/2^i$$

Therefore, in general, define procedure to uncompose a natural number reversibly into two other natural numbers:

$$\text{uncompose}(N,i,j) \to i \geq 0, j \geq 0, B = \text{mod}(N,2), X = N+B, \text{divine}(X,p,q), i = \max(0,p-1), j = q-B$$

The preceding procedures are used to define rules and are summarized in Table 3. Provided that the numbers refer to a structure, such as a graph or fragment or have any other mapping, like a hash to other objects, then these can be encoded, decoded, and represented using the methods of Table 3. This feature is important in mapping structures in the Quanton.

TABLE 3

Mapping Permutations to Data Structures

| Rule | Procedure | Example |
| --- | --- | --- |
| List to Permutation | encodes a sequence of natural numbers as a permutation of natural numbers | Input List = [1, 1, 2, 0] Output Perm = [4, 1, 3, 0, 2] |
| Permutation to List | Decodes a permutation to a list | Input Perm = [4, 1, 3, 0, 2] Output List = [1, 1, 2, 0] |
| List to Set | | Input List = [1, 1, 2, 0] Output Set = [1, 3, 6, 7] |
| Set to List | | Input Set = [1, 3, 6, 7] Output List = [1, 1, 2, 0] |
| List to Multiset | | Input List = [1, 1, 2, 0] Output MultiSet = [1, 2, 4, 4] |
| Multiset to List | | Input MultiSet = [1, 2, 4, 4] Output List = [1, 1, 2, 0] |
| List to Natural Number | compose | Input List = [1, 1, 2, 0] Output Number = 140 |
| Natural Number to List | uncompose | Input Number 140 Output List = [1, 1, 2, 0] |
| List to Permutation | | Input List = [1, 1, 2, 0] Output Perm = [4, 1, 3, 0, 2] |
| Permutation to List | | Input Perm = [4, 1, 3, 0, 2] Output List = [1, 1, 2, 0] |

Procedure-2: Quanton Combinatorial Design

The combinatorial design of the Quanton builds on the relationship as established between data structures and permutations to provide a transition model between permutations to produce resultant permutations as outputs. There are several elements in the combinatorial design:

(i) Design of the permutations of the Quanton in terms of a choice of integer sequence that relates permutations to successors and predecessors;
(ii) Design of the permutation transition operator between permutations in the design produced by step (i) preceding; and,
(iii) Associating the permutation transition operator from step (ii) to an operational semantics.

First, the design of the structure, ordering and size of the Quanton is based on a user defined requirement in the size of computations, type of operations and data representations needed. For example, and in analogy with traditional CPU, a 4-element Quanton can represent $2^4$ bits, and a 10-element Quanton can represent $2^{21}$ bits (e.g. 10!). The issue is to have a method to choose the right size and design of the permutation in terms of the appropriate design of the symmetric group of Sn that provides optimality. The answer is given by determining the Landau Numbers in terms of permutations: these guarantee, with the design of the permutation operator design, that the operational semantics of transforming permutations is bijective and reversible, as will be shown in the later sections of this disclosure.

The choice of the integer sequence is not obvious and follows from the twelvefold way as originally defined by Gian-Carlo Rote and explained in the reference: Richard P. Stanley (1997). *Enumerative Combinatorics, Volume I*. Cambridge University Press. ISBN 0-521-66351-2. p. 41, which is incorporated by reference herein in its entirety. Preferred sequences for the combinatorial design of the Quanton are illustrated in Table 4. However, it must be appreciated that, any permutation that is decomposable into regular patterns of some series, or set of operations, can serve to build the permutation lattice. For instance, the pattern operator may be Catalan automorphism, signature permutations and the like.

The Landau Sequence, based on the Landau Number, provides the largest cycle into which the Permutation can be naturally structured in a natural ordering in a cyclic subgroup of Sn: in this case, for example, the usual arithmetic addition operation becomes just the application of permutations, as will be shown. This is important because the Quanton relies on the design of the permutations in order to be able to represent and compute by using transitions (i.e. movements) between the lattice points by which the permutations are indexed.

The main tool used in the distribution of the vertices of the polytope onto the surface of the hypersphere is illustrated in FIG. 3: Fibonacci Lattice. The Fibonacci Lattice and the Fermat Lattice (also a spiral) are analytic and enable fast generation of points with variable geometries. Other Lattices could also be used. For example, FIG. 3 item 17 illustrates a geometry generated by the Fibonacci lattice that is evenly distributed while FIG. 3 item 18 shows how the lattice generator has been modulated to increase the density of the points generated on the equator.

The representation of the Fibonacci lattice for arbitrary dimensions is given in the form of angular parameters, with one angular direction per point on the n-dimensional surface. The use of angular parameters is preferred because of the symmetry of rotation operations using angles in periods of $\pi$ radians. Given this representation, in hyperspherical coordinates, then any movement from one permutation to another is simply and analytically given by movement either along the Fibonacci hyperspiral or between windings of the Fibonacci hyperspiral.

In the case of generating the vertices of a permutation, the nth-permutation is given by the Lehmer code and the nth-Fibonacci number is given by the Binet Formula. Hence there is an analytic correspondence between permutations and coordinates on the Fibonacci Lattice. Exemplary options as to how these can be further distributed to points are further expounded upon for FIGS. 13A and 13B. For the 2-sphere, the spherical Fibonacci point sets are directly defined using the angles (and these can be generalized to n-spheres as stated earlier for the hyperspherical coordinates by simple substitution):

TABLE 4

Preferred Sequences for the Combinatorial Design of a Quanton

| Pattern Operator | Description | Example |
|---|---|---|
| Blockwise pattern operator | The simplest blockwise permutations are obtained by acting on blocks of fixed size, always with the same permutation operation, which can include permutation operations as part of the operator | Odd-And-Even Swaps = {2, 1, 4, 3, 6, 5, 8, 7, 10, 9, . . . } p(1) = 2. p(2) = 3. p(3) = 1. p(n + 3) = 3 + p(n), for all positive integers n = {2, 3, 1, 5, 6, 4, 8, 9, 7, . . . } |
| Alternating pattern, zigzag pattern, or up/down pattern operator | Stanley, Richard P. (2010). "A survey of alternating permutations". Contemporary Mathematics 531: 165-196. Retrieved 11 February 2016 | ZigZag(1, 2, 3) = [{1, 3, 2}, {2, 1, 3}, {2, 3, 1}, {3, 1, 2}] |
| Landau Number based Permutation Sequence | largest order of permutation of n elements. Equivalently, largest LCM of partitions of n" (LCM means Lowest Common Multiple) | |
| Baxter Permutation | They satisfy a pattern avoidance property. These permutations are defined by prohibited subsequences in the permutation | all permutations of length 4 are Baxter except {2, 4, 1, 3} and {3, 1, 4, 2} |

$$\theta_j = \arccos\left(1 - \frac{2j}{F_m}\right)$$
$$\varphi_j = 2\pi\left\{j\frac{F_{m-1}}{F_m}\right\}$$
$0 \le j < F_m$; $F_m$ is the $m^{th}$ Fibonacci number For each base angle, θ, the points are distributed on the vertical (z-axis):

$$z = \cos(\theta) = 1 - 2j/F_m$$

And the angle of rotation, φ, is given by the Fibonacci ratio:

$$\frac{F_{m-1}}{F_m}$$

The limit of the Fibonacci inverse ratio is the Golden Ratio as m increases. By adding 1/N to z coordinates we achieve uniformity at the poles and hence:

$$\theta_j = \arccos\left(1 - \frac{(2j+1)}{N}\right)$$
$$\varphi_j = 2\pi\{j\Phi^{-1}\}$$
$0 \le j < N$; N is the number of spherical points It must be appreciated from the preceding description that a circle can be evenly divided into points that correspond to the numbers of points representing a single permutation, or that a two dimensional Fibonacci spiral, or Euler Spiral can also be used. For example, with three permutations, there will be six points on the circle, corresponding to a hexagon. For a permutation of 3 objects, indexed using the set {1, 2, 3}, and treating the integers as coordinates in a vector space, then, the six vectors are (1, 2, 3), (2, 1, 3), . . . (3, 2, 1) which are coordinates in 3-space. However, from this it must be noted that various ways of mapping from high-dimensional coordinate systems to lower dimensional coordinate systems can be used without loss of information, such as the Z-Order (Morton Code) to convert from high dimensional to single dimension numberings bijectively. Therefore, for example, coordinates of the permutations for a permutation of 4-objects, {1, 2, 3, 4} would result in a 4-dimensional space, but these can be projected as indices using the Morton Code onto a Fibonacci spiral and distributed onto the 3-sphere. The teachings of Benjamin Keinert, Matthias Innmann, Michael Sänger, and Marc Stamminger. in "Spherical fibonacci mapping", ACM Trans. Graph. 34, 6, Article 193 (October 2015), and incorporated herein by reference in its entirety describe the mapping of points to spheres as the means to associate permutations as points to various desired manifolds including spheres using the Fibonacci series.

If the choice is that the permutation represents the coordinates in a space, then, these discrete coordinates represent the zonotope: a polytope or hypercube. In the case of 3 points, these would form the vertices of a hexagon that are the kissing vertices of the surface of a sphere in three dimensions. In general, therefore, any subset of permutations can be represented in a dimension lower than that required if the permutation elements were each taken as a dimension.

In generating the permutations themselves, and especially, in providing a generator that results in permutations in a sequence that can be indexed starting at 0 (no permutation) or starting at 1 (the first permutation) to N (the $N^{th}$ permutation, regardless of whether 0 or 1 was chosen), the simplest generator is the additive permutation generator using the integers as follows from the teachings of John R. Howel, "Generation Of Permutations By Addition"—Mathematics of Computation—Vol. 16—Issue 78-1962—p. 243 and incorporated herein by reference in its entirety: K! permutations can be generated by addition of a constant, C to a permutation generation operator. The integers, {0, 1, 2, . . . , (K−1)} or {1, 2, 3, . . . K} can be concatenated to form the "digits" of a base K integer. Using the base K integers, the repeated addition of 1 will generate integers whose "digits" represent permutations of length K.

This process will also generated numbers which are not permutations. The correct number, C, greater than 1 to add to this integer is a multiple of C=(K−1) radix K. The arithmetic difference radix K between an integer composed of mutually unlike digits and another integer composed of a permutation of the same digits will be a multiple of (K−1). This algorithm will generate all K! permutations in lexicographic order or that any permutations "between" two given permutations can also be directly computed. For example, for the 4! permutations for K=4, using the set of digits, D={0, 1, 2, 3}, then C=3 radix 4. First concatenate D to get the digit "0123". Second add C get "0132" which is the first permutation of "0123". This can be repeated until the permutation cycles back to "0123".

It must be noted that for each permutation generated in order, that it can be associated to the indices (0, 1, 2, 3 . . . N) of the lattice generating function (i.e. the Fibonacci sequence). In this way, permutations can be associated to any point on the lattice.

In FIG. 4, items 19 and 20, show respectively a von Mises Fisher circular directional statistic and a mixture model of the multivariate Watson distribution from a sample directional data set, though other distributions such as Gaussian or Generalized Mallows distributions could also be depicted.

FIG. 4 depicts the sphere without the vertices of the inscribed correlation polytope (e.g. Permutohedra, Associahedra), but serves to emphasize that the basic underlying implementation and design of the software Quanton is a centered on the use of probability density functions (PDF's) on the n-sphere, or, on an n-torus. Formally, the depiction is a mixture model, which represents a distribution of data, seen as the circles on item 19, and the trajectory on item 20, which are modeled as a weighted sum of individual probability distributions of the generating data.

In other words, the observed data is a mixture of a number, M, of probability distributions, and defined by the formula:

$$P(v, M) = \sum_{k=1}^{M} w_k f_k(v, \rho_k)$$

where v is a d-dimensional vector (datum) and M is the number of mixture components with w as the evidence (weight) and p as the probability density of the k-th components respectively.

The Quanton can also be built on a complex space, therefore, for example, the Quanton on a Riemannian manifold coupled with a discrete structure as permutations of objects. The Probability Density Function (PDF) of a potentially large dataset that lies on a known Riemannian manifold is approximated by the methods of the present disclosure. The Quanton data structured thus provides a completely data-driven representation and enables data driven algorithms that yields a PDF defined exclusively on the manifold.

Now, turning to FIG. 5, we describe the relationship between the tangent space, the nonlinear manifold space 21, probability and, later, its relationship to permutations, and finally, the use of permutations to define the Quanton in the computation of state space 22 to state space 23 transitions in the Turing machine sense.

Figure 5:
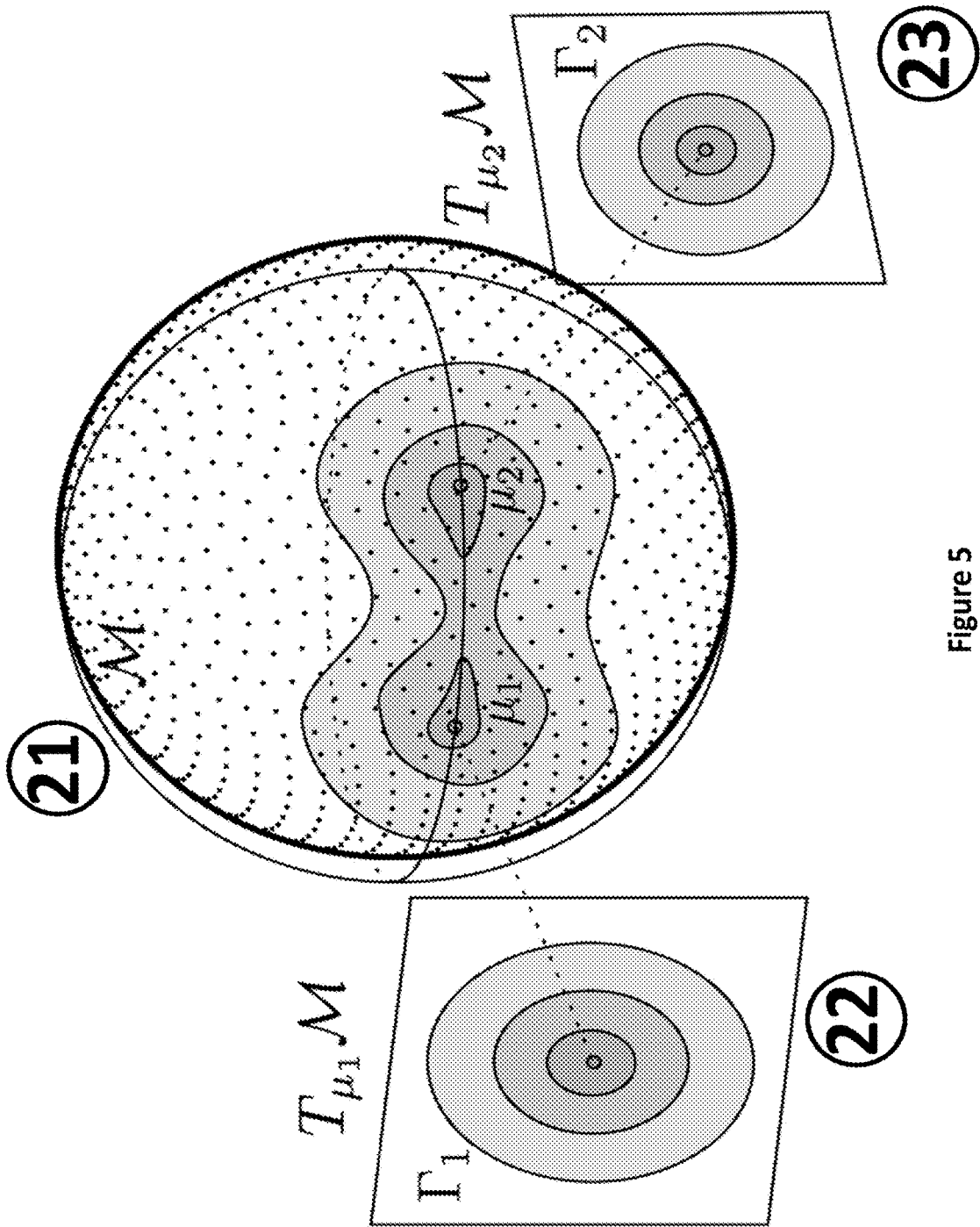
FIG. 5 illustrates an exemplary mixture of distributions on tangent spaces to the Hypersphere.

FIG. 5 illustrates specifically the tangent spaces at the vertices of the inscribed Fibonacci spherical lattice whose points represent the vertices of the inscribed orbitope. The figure is important because it illustrates a key point about the Quanton, which is that the Quanton represents a non-linear manifold PDF as well as a linear PDF that resides in the tangent space at a point on the manifold. Alternative representations use a single tangent space located at the geodesic mean, which can lead them to have significant accuracy error when input data is spread out widely on the manifold, or when the data sizes are very large, the associated algorithmic complexity, for example of using Gaussian processes, makes them unfeasible for large datasets.

By one embodiment of the present disclosure, a logarithmic map is utilized to project multiple input data points using an unsupervised algorithm that automatically computes the number of model components that minimize the message length cost in the linear Euclidean tangent space. Data inputs are represented by distributions on the tangent spaces at corresponding mean points, quantized to the nearest vertex point (this is produces an approximation with a small error). The accuracy loss produced using a single tangent space versus multiple tangent spaces overcomes the cost of the quantization error at vertices on the manifold. However, the quantization error is addressed herein as a separate term by itself, which is a non-linear correcting component, also a PDF of the surface of the manifold. This PDF is itself approximated since it plays the role of the non-linear part of the posterior of the total model of the Quanton.

Tangent space statistics are computed and projected back to the manifold using the exponential map. This process iterated until convergence of the statistics. The Quanton can handle an arbitrarily large number of samples in contrast to existing non-parametric approaches whose complexity grows with the training set size. The Quanton manifold mixture model handles both non-linear data modeling as well as regression to infer subsets of missing components without any specific training (i.e. a missing data gap identification solution). In other words, the Quanton can always produce hypotheses on demand.

The analytical estimates of the parameters of a multivariate Gaussian distribution with full covariance matrix, using the Minimum Message Length (MML) principle are preferred in approximating Gaussian PDFs using the tangent space. The Riemannian center of mass of N points, $x_i$, sometimes also called the "Karcher Mean" on a manifold is:

$$\mu = \operatorname{argmin}_p \sum_{i=1}^{N} d(x_i, p)^2$$

$$\mu(t+1) = RiemannExp_{u(t)}\left(\frac{\delta}{N}\sum_{i=1}^{N} RiemannLog_{u(t)}(x_i)\right)$$

This is iterated until:

$$\|u(t+1)-u(t)\|<\varepsilon$$

The value ε is a threshold and the value δ is the quantization (resolution or step size) of the Fibonacci lattice (or other quasi-crystalline structure) used to construct the manifold. Essentially, the directional PDF defines a vector field on $R^n$ and this can be interpreted as averaging the vectors from an arbitrary point $x \in R^n$ to the mass points p.

Thus, while a single zero-mean Gaussian in the tangent space around a point, p, provides an effective model for the within-cluster deviations from p provided it is the Riemannian center of mass of this cluster.

The formula for the expression to infer the concentration parameter k and mean vector, u, of any d-dimensional vMF distribution on a d-dimensional sphere is given as:

$$f_d(\mu, \kappa) = \frac{\kappa^{\frac{d}{2}-1}}{(2\pi)^{\frac{d}{2}} I_{\frac{d}{2}-1}(\kappa)} e^{\kappa, x, \mu}$$

The Minimum Message Length (MML) requires a prior distribution or at least an approximation if the prior is unavailable easily. The easiest prior that we can use as an assumption is uniform and independent of k, written simply as:

$$h_{\alpha,\beta}(\alpha, \beta) = \frac{\sin(\alpha)}{4\pi}$$

The MML estimate are values of $(\alpha,\beta,\kappa)$ minimizing a Message Length Expression (MLE) for 3-dimensional von Mises Fisher distributions and were D represents the data and h represents the hypothesis:

$$MLE(\alpha, \beta, \kappa \mid D) = -\log\left[\frac{h_{\alpha,\beta,\kappa}(\alpha, \beta, \kappa) \cdot f_3(D \mid \alpha, \beta, \kappa)}{\sqrt{\det(F(\alpha, \beta, \kappa))}}\right] + C;$$

where C are constants.

The expression $\det(F(\alpha,\beta,\kappa))$ is the determinant of the expected Fisher Information Matrix, whereas the expression $h_{\alpha,\beta,\kappa}(\alpha,\beta,\kappa)$ is the prior in 3-dimensions:

$$h_{\alpha,\beta,\kappa}(\alpha, \beta, \kappa) = h_{\alpha,\beta}(\alpha, \beta) \times h_\kappa = \frac{\kappa^2 \sin(\alpha)}{\pi^2(1+\kappa^2)^2}$$

Finally, the expression $f_3(D|\alpha,\beta,\kappa)$ is given in 3-dimensions following the vMF distribution from:

$$f_3(\alpha, \beta, \kappa) = \frac{\kappa}{4\pi \sinh(\kappa)} e^{\kappa(\sin\theta_i \cdot \sin\alpha \cdot \cos(\theta_i - \beta) + \cos\theta_i \cos\alpha)}$$

Therefore, for n data elements, D, we have:

$$f_3(D \mid \alpha, \beta, \kappa) = \prod_{i=1}^{n} \frac{\kappa}{4\pi \sinh(\kappa)} e^{\kappa(\sin\theta_i \cdot \sin\alpha \cdot \cos(\theta_i - \beta) + \cos\theta_i \cos\alpha)}$$

A generalized search heuristic for minimum message length to infer the optimal number of mixture components and their corresponding parameters that explain the observed data is used and based on the search used in various versions of the 'Snob' classification program as the preferred embodiment for the Quanton.

The situation illustrated in FIG. 5: Mixtures of Distributions on Tangent Spaces to the Hypersphere, provides the Quanton mixture model that ability to represent use both linear tangent spaces to the sphere providing full covariance matrices as well as isotropic covariances associated with the spherical von-Mises-Fisher (vMF) distributions of FIG. 4.

The end result is that the Quanton model, in the inference processes of the present disclosure, which involve Quantons as particles and as models in the context of estimators of distributions that is parallelizable and handles both isotropic as well as anisotropic distributions with adaptive model complexity to observations. As will be shown, each point of tangency is the vertex of a correlation polytope built on permutations. This space is denoted $T_p \mathbb{S}$ and is the linear subspace that best approximates a region of the sphere in a neighborhood of the point p and can be thought of as a directional derivative. Vectors in this space are called tangent vectors at p.

Every tangent point on the sphere, at the point of tangency is defined to map to its linear tangent space using the Riemann transforms as follows:

Let $T\mathbb{S}$ be a point on the sphere and $T_p\mathbb{S}$ be the tangent point on the sphere, and p be any tangent point, where the sphere is in dimension D−1. Hence: $T\mathbb{S} \in \mathbb{S}^{D-1}$; tangent points are in $T\mathbb{S}^{D-1}{}_p$; and $p \in T\mathbb{S}^{D-1}{}_p$; and
And:

$$\forall\, v \in T_p^{\mathbb{S}}; \|v\| = \sqrt{g_p(v,v)} \overset{def}{=} \text{Riemannian } Norm$$

$$\text{Riemannian inner product} \overset{def}{=} g_p(u,v) = \langle u, v \rangle$$

The mapping from point on sphere to tangent space as the Riemannian logarithmic map:

$$T^{\mathbb{S}} \to T_p^{\mathbb{S}} = (T^{\mathbb{S}} - p\text{Cos}(\theta))\frac{\theta}{\text{Sin}(\theta)};$$

$$\theta \approx \text{Sin}(\theta) \text{ for } \lim_{\theta \to 0} \frac{\theta}{\text{Sin}(\theta)} = 1; \theta = d_g(p, T^{\mathbb{S}})$$

where $d_g(p, T\mathbb{S})$ is the geodesic distance between any point and a point of interest.

The inverse transform is defined herein as:

$$T_p^{\mathbb{S}} \to T^{\mathbb{S}} = p\text{Cos}(\|T_p^{\mathbb{S}}\|_2) + \frac{T_p^{\mathbb{S}}}{\|T_p^{\mathbb{S}}\|_2}\text{Sin}(\|T_p^{\mathbb{S}}\|_2)$$

where the $l_2$ norm is the Riemannian norm $\|T_p\mathbb{S}\|_2$ for $T\mathbb{S}^{D-1}{}_p$ which is the geodesic distance between $T\mathbb{S}$ and p (a point of tangency). In this representation, each probabilistic mixture component is in its own unique tangent space.

The geodesic distance transformation is: $d_g(p,q) \to \arccos(p,q)$.

Figure 6:
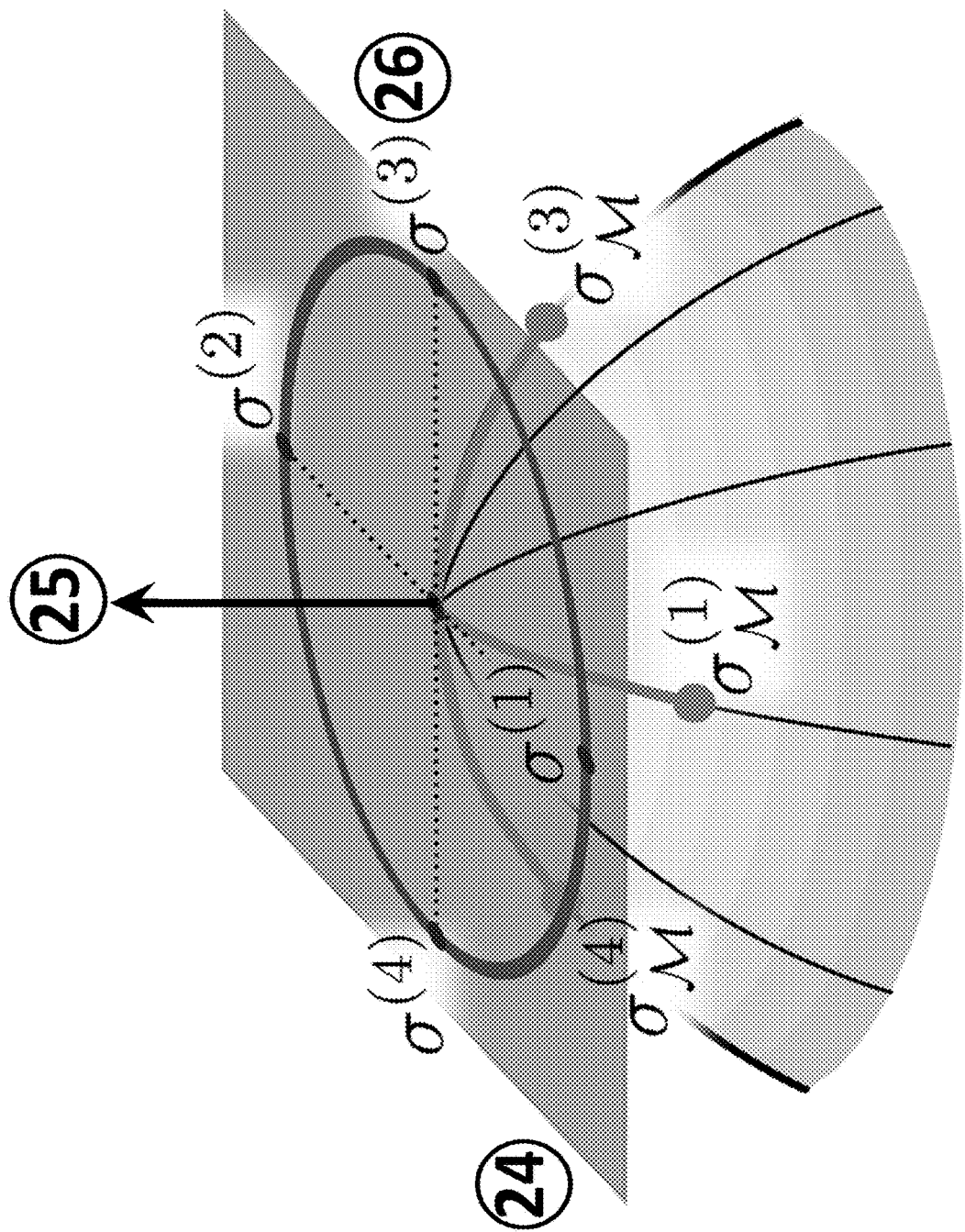
FIG. 6 illustrates a specific tangent point and tangent space on the spherical Fibonacci lattice of the Quanton.

FIG. 6 depicts a Specific Tangent Point and Tangent Space on the Quanton's Spherical Fibonacci Lattice—this figure shows a neighborhood indicated by item 24, of the tangent point indicated by item 25, as well as its linear subspace indicated by item 26. The points on the linear space are indicated on item 26 as $\sigma^{(1)}$, $\sigma^{(2)}$, $\sigma^{(3)}$, and $\sigma^{(4)}$ with their corresponding points on the manifold of the sphere as $\sigma_M^{(1)}$, $\sigma_M^{(2)}$, $\sigma_M^{(3)}$ and $\sigma_M^{(4)}$. These sigma points form an ellipse that is the covariance, which means that statistics on the tangent space are linear while being embedded on the n-sphere which is non-linear. This bridge between linearity and non-linearity is specifically taken advantage of in the present disclosure to reduce the computational burdens and bring speed as well as precision to estimators given some data set.

Figure 7:
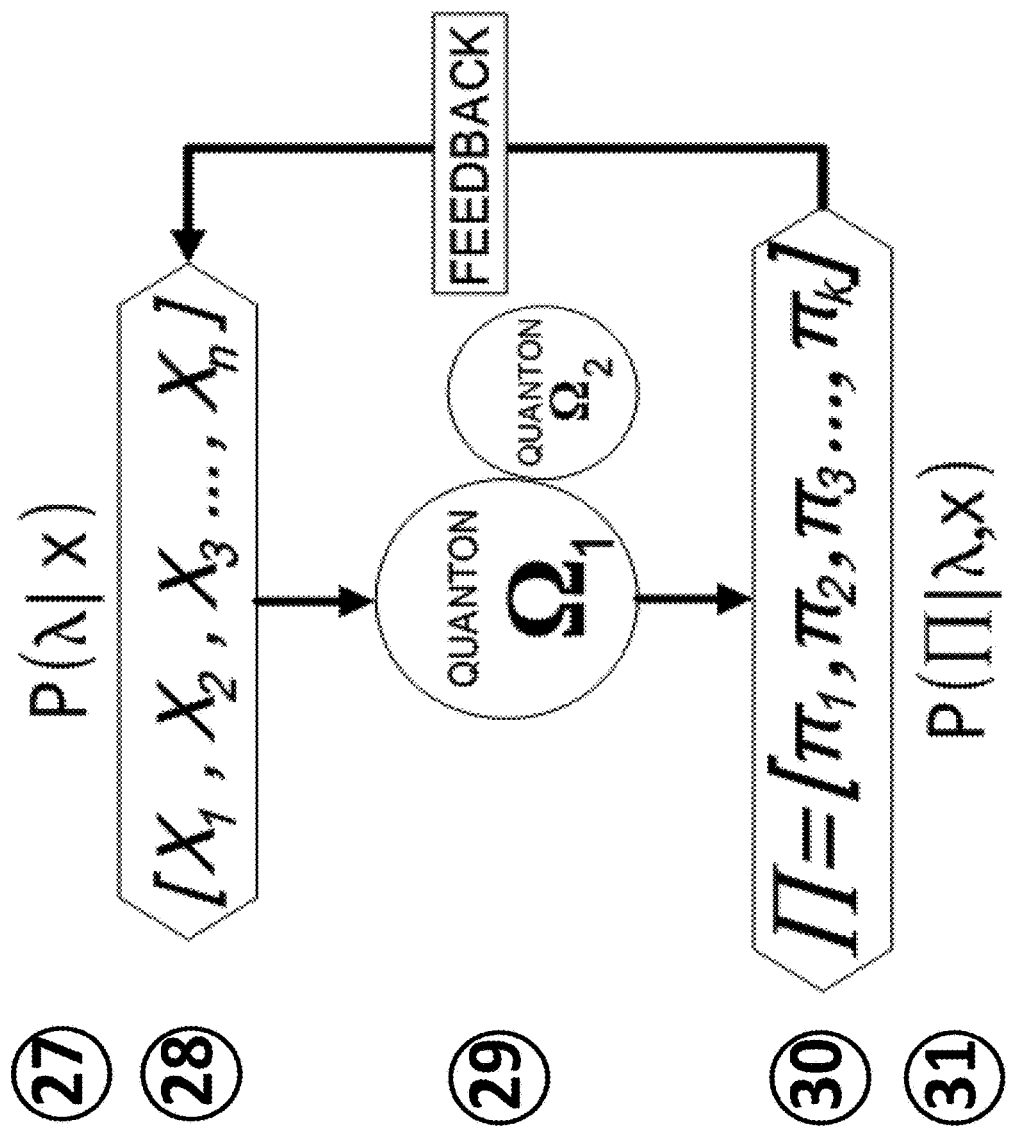
FIG. 7 illustrates a schema of iterative feedback data processing for estimation of distribution algorithms for the Quanton.

The overall model of use of the preceding diagrams is summarized by the overall schema depicted in FIG. 7: Quanton Schema of Iterative Feedback Data Processing for Estimation of Distribution Algorithms. In item 27 of FIG. 7, we have a hypothesis that models some observational data, and represented as P(λ|x) where λ represents the hypotheses and x represents the observable data. The data x, in item 28, is mapped to the Quanton. This can be done for several, or a mixture of various P(λ|x).

A few key points are in order. First the basic approach consists of maintaining information relative to the first order marginals, which express the probability of some item e being at some position n in the permutation σ of the data x. In the case of the Quantons, item 29, shown as $\Omega_1$ and $\Omega_2$ connected at a tangent point, we provide the concept of permutants and permutons, that together form the permutrix, and therefore, the Quanton extension consists of higher order marginals on the permutrix, Π, item 30 in FIG. 7, which corresponds to the probability of a specific set of items in the permutrix $(e_1, e_2, \ldots, e_k)$ being at specific positions $(\sigma_1, \sigma_2, \ldots, \sigma_k)$.

Using the permutrix, the Quanton can therefore maintain the probability of an element being at a position following another element without specifying an exact position, thus relative information without absolute information is captured. Thus, the permutrix represents the x data items that are in the Quanton. The output of the Quanton, item 31 of FIG. 7, after the computation model is executed, is the model of the permutrix, Π, as well as the hypothesis and data that go together, P(Π|λ,x) In other words, raw data and its underlying model and results are probabilistically induced as outputs.

In order to represent arbitrary distributions over large x, given that x is factorial in size, the permutations of x are referenced, not stored, by an analytic relationship given by the index on the Fibonacci spherical lattice and the Lehmer code representing the n-th index permutation at that point of the lattice. In this way, a uniform distribution over the x data items, for any size of x can be represented, where σ is the permutation and U(σ) is the uniform distribution over σ:

$$U(\sigma) = \frac{1}{x!}; \forall\, \sigma \in \mathbb{S}^{D-1}$$

The structure of the Quanton encodes permutations and their relations to each other with respect to certain primitive operations such as, but not limited to, swap operations or addition operations. Each permutation is indexed by a lattice that tessellates an underlying manifold to which is associated a probability distribution, that implicitly is a distribution, therefore, over the permutations.

Distributions can be complex directional statistics and can serve as a proxy for the density functional, which is itself used, in this disclosure, as an approximating surrogate for a quantum wavefunction, in which case each permutation represents a state space configuration.

Figure 8:
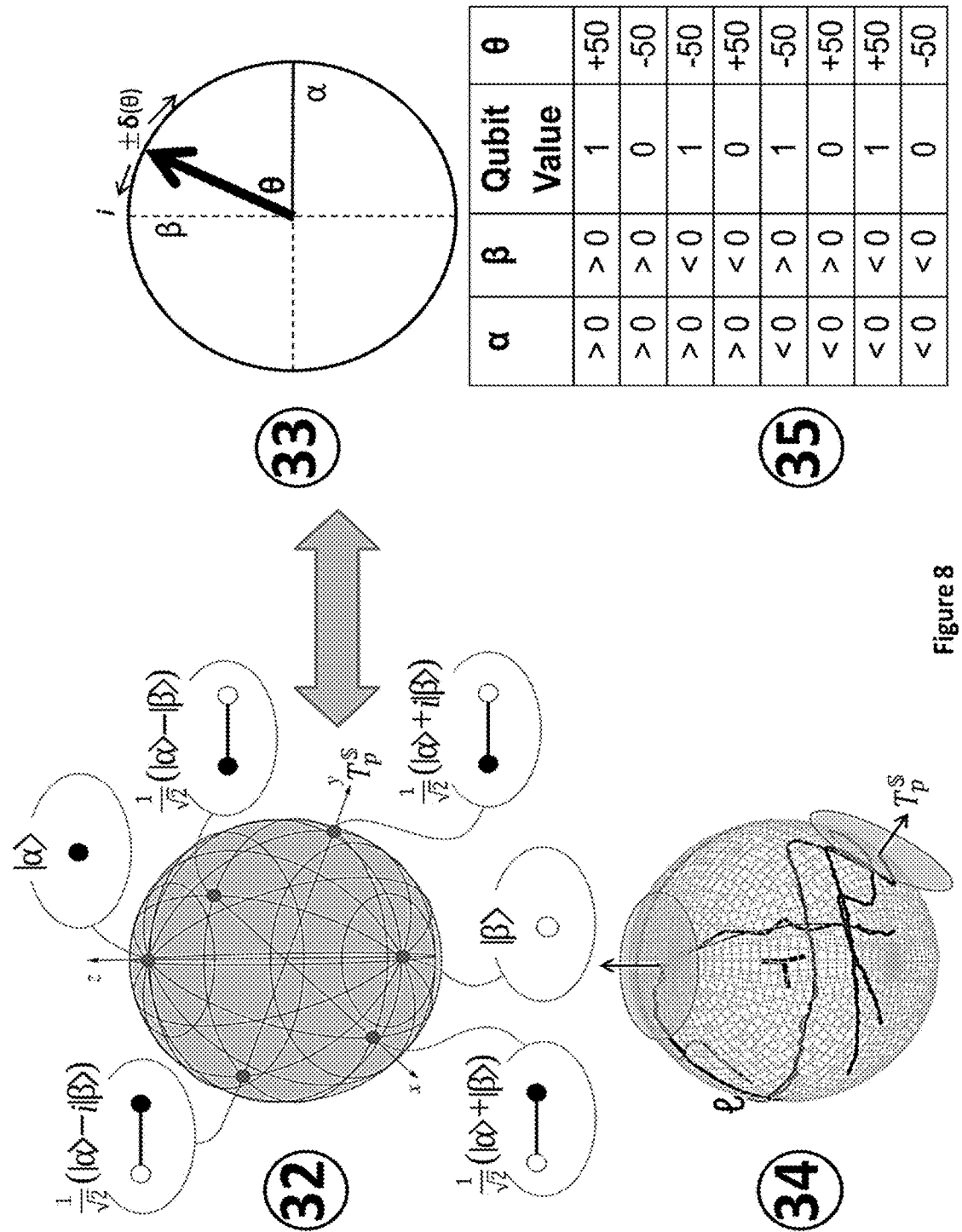
FIG. 8 illustrates probability path densities with a lookup table for mapping Qubits to classical bits for the Quanton.

This situation is illustrated in FIG. 8: Quanton Probability Path-Densities, with Lookup Table for Mapping Qubits to Classical Bits. In FIG. 8, item 32, we illustrate the Poincare-Bloch sphere and use a special representation in terms of line-segments with an open and closed endpoint for each of the superposed compositions of the basis of α and β: the line segment. In item 33 of FIG. 8, we depict the usual Qubit model in terms of the angular parameter. Note that the permutrix, which is a tangent point on the sphere, specifies the linear tangent hyperplane from which samples can be selected as well as approximating the nearby-random axis-aligned hyperplanes of its neighborhood.

Item 34 of FIG. 8 illustrates the tangent point, $T_p \mathbb{S}$, and the oriented segment, l, that represents the geodesic distance with respect to θ to another point and showing that the interval of the point is somewhere between 0 and 1 with the orientation given by the filled and unfilled circles at the endpoints. Finally, item 35 shows the rules defined by which to determine if the line segment, based on θ is deemed to map to a classical bit, 0 or 1. The line segment is drawn to represent the subspace of the superposition and to emphasize the geometric specification of the Quanton and its relationship to the Qubit.

In other words, just as a Qubit represents a probability density, so too does the Quanton. The geometry of the Quanton is a hypersphere though for illustrative purposes a sphere and circle have been drawn to depict lower dimensional cases. However, the Quanton, unlike the Qubit, but similar to the Qudit, represents a set of subspaces in which each permutrix is a set of independent, mutually orthogonal, k-dimensional subspaces labeled by an integer aligned with the coordinate axes for efficiency: in the simplest case, the k-dimensional subspace is 1, but in more complex situations, the Quanton represents subspaces greater than 1. In the case of the subspace in which the permutrix represents the binary space [0, 1], then the space is proportional to binary exponent of the number of dimensions as is the usual interpretation.

Figure 9:
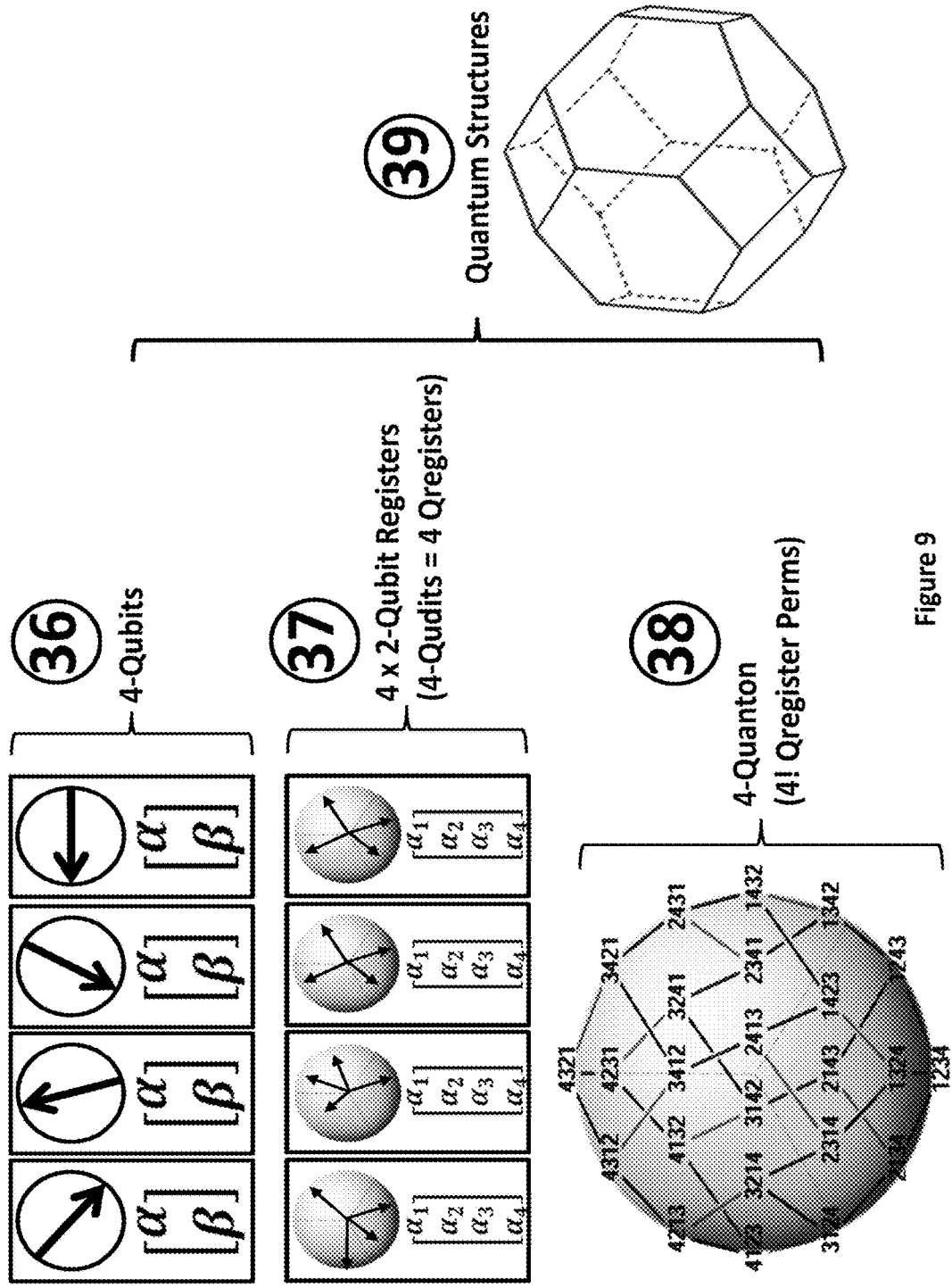
FIG. 9 illustrates an example of the topological structure of the Quanton and embedding a permutation state space as an Orbitope on a sphere.

To make this clear, and to show that the Quanton is a complex data object of unique design, "FIG. 9: Topological Structure of Quanton and Embedding Permutation State Space as Orbitope on Sphere" illustrates the subspaces and the mappings. In FIG. 9, 36, a simple sequence of 4 Qubits is shown with the circle diagram of FIG. 8, 33 representing the states. The structure of a quantum permutation register is defined and constructed by taking sets of Qubits, and an example of a register with pairs of 2-qubits at time in a quaternary Qudit register of 4 pairs of Qubits is shown, with their respective vector subspaces, in 37 of FIG. 9. Finally, for the set of four pairs (i.e. 4 Qudits) there are 4-factorial possible sequences (4!=24), with 24-factorial possible orderings of the permutations.

The permutations are represented by integers which represent the subspaces and the integers are mapped to coordinates which define the Permutohedron, a permutation zonotope, as shown in 38. However, as described by embodiments of the present disclosure, there is an extended compact representation of the Permutation polytope as a sorting-orbitope, which is derived from the Birkhoff-polytope, an equivalent representation of the Permutohedron, but the Birkhoff-polytope is further extended to the sorting-orbitope which provides n(log(n)) computation complexity in contrast to the $n^2$ complexity of the Birkhoff-polytope. The final orbitope for the Quanton is schematically illustrated as the output in 39 of FIG. 9, wherein the details of its construction will be explained later in this disclosure.

Figure 10:
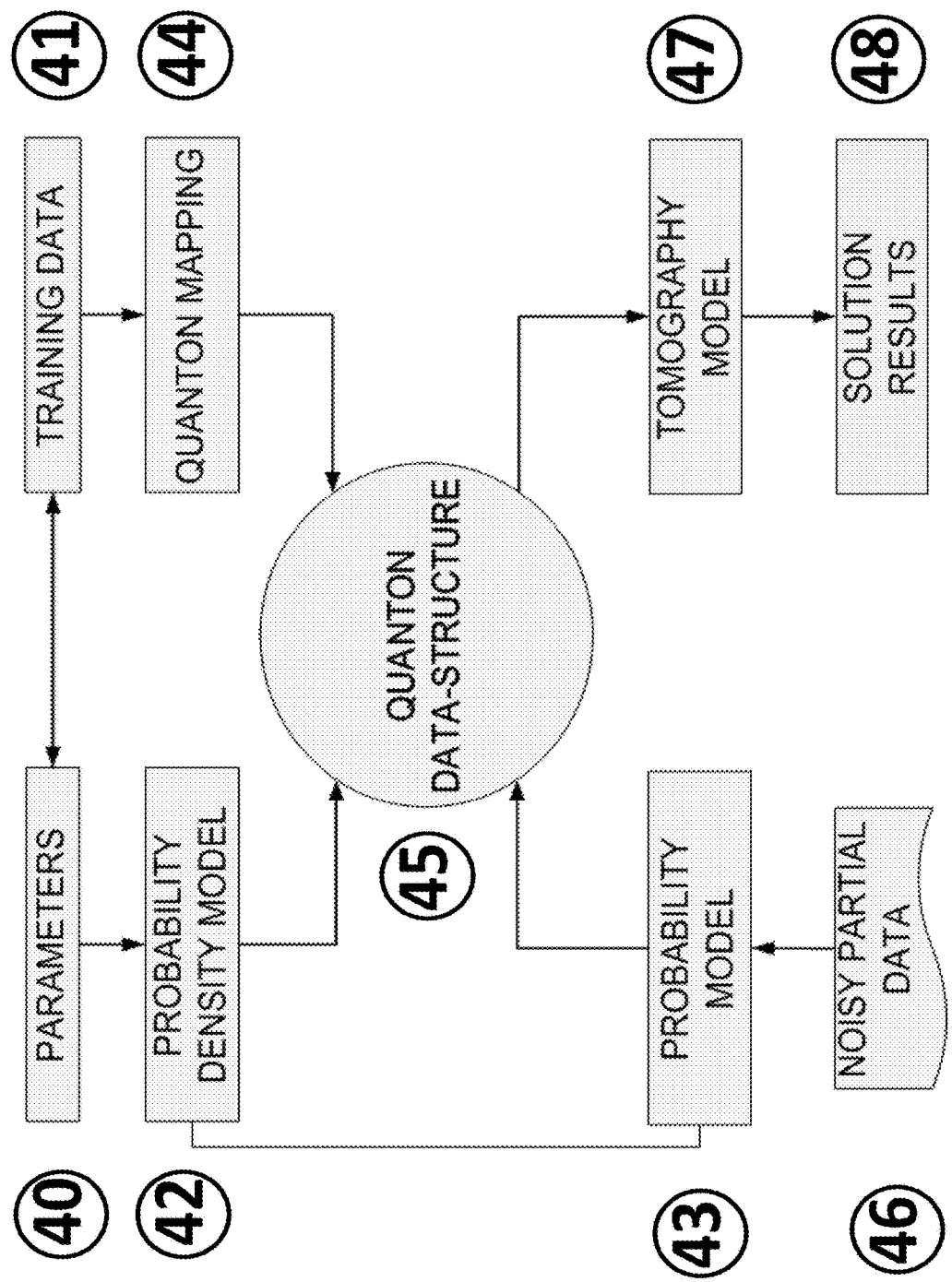
FIG. 10 illustrates an operational model for estimation of distribution algorithms for the Quanton.

The operational model is fully shown in FIG. 10: Quanton Operational Model for Estimation of Distribution Algorithms, in which we have a set of parameters, 40, that determine the structure of the Quanton, specifically the size of the permutrix as a permutation size, which may or may not originate from the training data, 41, the number of dimensions, the Fibonacci spherical grid and the choices of control parameters that are required by the choice of probability density model, 42: the choices of probability distributions not limited to but preferentially include the von Mises Fisher, Watson, Mallows and Gaussian distributions, though others may be chosen as needed and any mixture thereof.

The choice of Probability Model, 43, includes Bayesian models, Kalman Models and Quantum Models with a preferential use of Time Dependent Density Functionals (TDDF) or Direction Dependent Density Functionals (DDDF) using pseudo-potentials in lieu of formal quantum wavefunctions. While TDDF may be known to those skilled in the art, DDDF is not known as it pertains to the use of directional statistics provide an vector direction for transitions, while, in TDDF, time provides the directionality.

The Quanton data mapping, 44, will depend on the chosen probabilistic model, 43 and the Table 5 shows the preferred mapping models.

TABLE 5

Lookup Table for Quanton Probability Density

| Quasicrystal Type | Probability Measure |
|---|---|
| n-Sphere | Von Mises, Kent, Watson, Gaussian |
| n-Torus | Bivariate Von Mises |
| n-Cube | Uniform, Viterbi |
| n-Simplex | Bayes, Markov-Chain, Viterbi |
| 2-polygon | Markov |
| Zonotope | Any |

One model developed for quantum computing defines quantum circuitry in terms of topological models: these topological quantum computing models, in one instance, use permutations in an operation called "braiding" in order to perform computations. A braid operation can be represented by a matrix, called a generator, that acts on the qubit space to perform the logical operations of a quantum gate. A braid can represent a product of the generators that encode the individual braid operations.

Therefore, using the permutation representation of the Quanton, the braiding operation is a path through the permutation space driven to a solution path by learning using the evolution of the estimation of distributions of probabilities. The details are presented in the foregoing.

FIG. 10, 46 receives the noisy partial data, which can include image data, directional data, probabilistically associated data, partial graph data, time series and state representation data. Computation on the Quanton data structure, constructed as 45, and explained further in FIG. 11, produces a solution to a tomography of the data relationships, 47, in the form of an estimated distribution and an output from the tomograph of the sought results, item 48. Therefore, the principle components are a density model, with a set of parameters, and a database of valid observations, though if the database is not available, the system will be shown to converge to an approximate solution.

Figure 11:
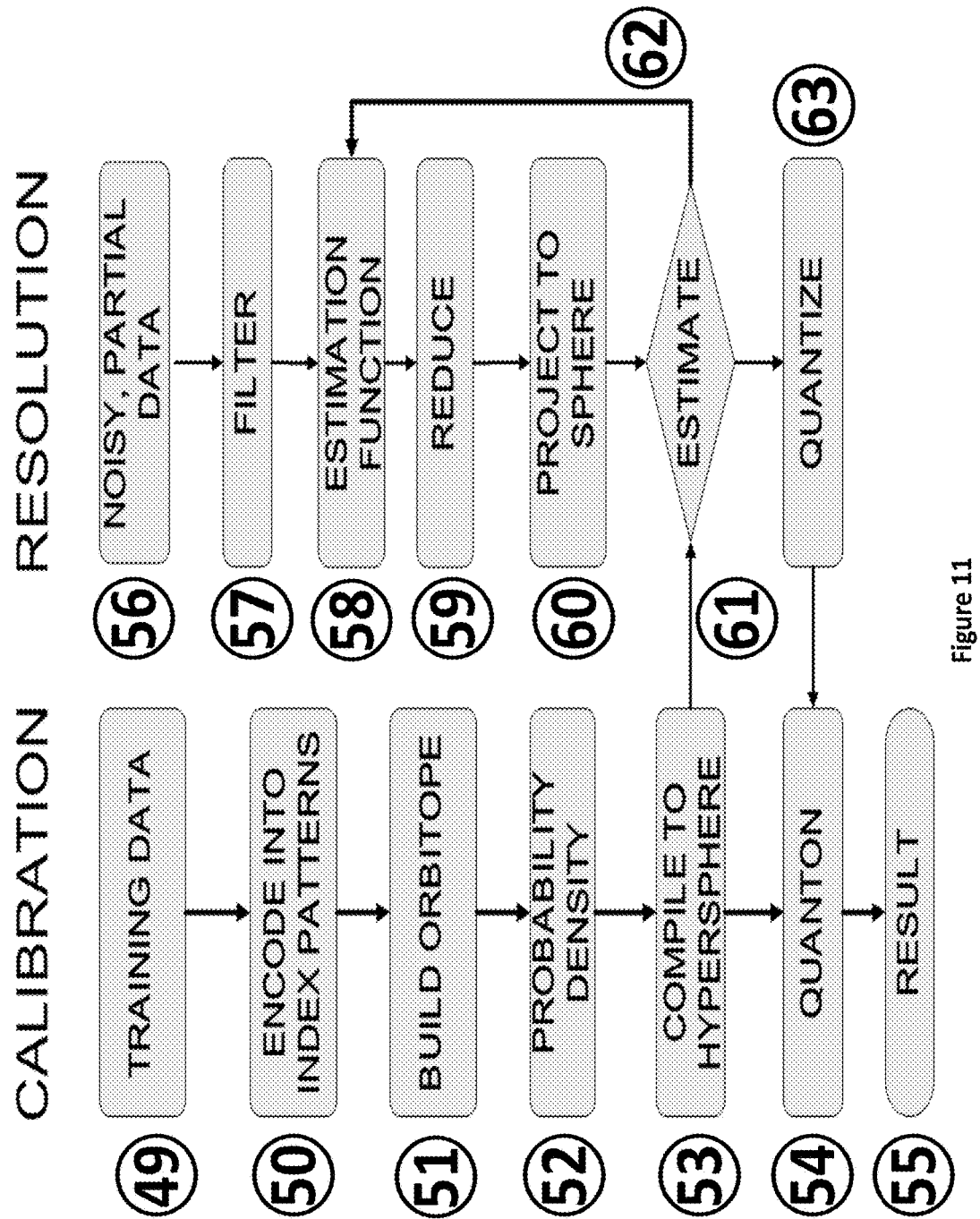
FIG. 11 illustrates an exemplary calibration operation and resolution for Quanton construction.

In the preceding FIG. 10, we have provided the high-level model description, with reference to the Quanton at FIG. 10, 45, and now in "FIG. 11: Flowchart for Quanton Data Structure Construction", a description is provided with fine granularity, of the operational steps and flow chart to construct the Quanton.

Now referring to FIG. 11, training data, item 49, is represented as permutations by the method of Table 3 of the present disclosure and these resultant permutation patterns are resolved to their index locations on the Quanton as, for example, the k-th index of Fibonacci series which is the k-th Lehmer Code representing the permutation (pattern), item 50. The Orbitope, item 51, is constructed as per the methods of Table 1 of the present disclosure and optimally, as the sorting polytope, as shown later in the description for FIG. 23. The probability density, item 52, is chosen using the method of Table 5 and a step of compilation comprising writing the Binnet Formula and the list of its indices in a basic data structure, item 53, such as set of relational predicates or standard relational database system using the index as the primary key as well as an estimate (for example using a Bayesian recursive filtering process), item 61, of the maximum a-posterior (MAP) probability distributions of the training set. Once this has reached a fixed point, as per the methods of FIG. 5, then the calibrated Quanton is returned.

Now, with resolution which is a generalization of the Quanton using noisy partial data to produce results, the noisy data, item 56, is also represented as permutations by the method of Table 3 of the present disclosure: in this case, however, a filtering process may be applied to reject data using a variety of user chosen methods, to reduce the data presented for the Quanton, item 57. An estimation function, item 58, such as a recursive Bayesian filtering process to produce an output that can be reduced, using a Gaussian for example, as a Kalman Filter, to allocate the distributions of the noisy data to the Quanton by projecting onto the sphere, if a spherical geometry had been chosen as the embedding geometry, item 60. The estimate may be updated and then the nearest quantized points on the lattice returned as candidate solutions, with a conversion back to the data from their permutational representation by the methods of Table 3.

This general process is used to locally update the Quanton probability distribution with respect to a set of training data and is a typical well understood idiom to those skilled in the art of machine learning with probabilistic methods and MAP computation.

The construction of the Hypersphere can be described as follows:

$\mathbb{S}^d$ is embedded in $\mathbb{R}^{d+1}$; dimensions=$d=n^2-2n+1=(n-1)^2$;
$\mathbb{S}^{n-1}=\{x\in\mathbb{R}^n | x^T x=1\}$.

The hypersphere $\mathbb{S}^{n-1}$ is represented by a set of hyperspherical polar coordinates in n-dimensions as follows:

Let $\mathbb{R}^n=\{x_1, x_2, x_3 \ldots x_n\}$ be the Cartesian coordinates in n-dimensions
Therefore:

$$x_1 = r \cdot \sin(\theta_{n-1})\sin(\theta_{n-2}) \ldots \sin\theta_2 \sin\theta_1$$
$$x_2 = r \cdot \sin(\theta_{n-1})\sin(\theta_{n-2}) \ldots \sin\theta_2 \cos\theta_1$$
$$x_3 = r \cdot \sin(\theta_{n-1})\sin(\theta_{n-2}) \ldots \cos\theta_2$$
$$\vdots$$
$$x_3 = r \cdot \sin(\theta_{n-1})\sin(\theta_{n-2}) \ldots \cos\theta_2$$
$$x_n = r \cdot \cos(\theta_{n-1})$$

Given the transformation, and for sake of explanation, n=3 is used to simply for notational convenience with the direct generalization to all hyperspheres of dimension of n.

Also, the radius is assumed to be unity for the unit hypersphere in order to simplify the foregoing without any loss of generality to the higher dimensional cases.

Now, the arc-segment (for n=3 dimensions) is given by:

$$dS^2 = \sin^2(\theta) \cdot d\theta^2 + d\theta^2$$

Therefore:

$$ds = \sqrt{1 + \sin^2(\theta)\left(\frac{d\phi}{d\theta}\right)^2} \, d\theta$$

A slope of a spiral curve on the sphere is defined to be a constant given as:

$$k = \frac{d\phi}{d\theta}$$

Therefore, $\phi = k\theta$

Permutation embedding into surface of Hypersphere: $\mathbb{R}^{d+1}$
Dimension d: $d=(n-1)^2-1=n^2-2n+1-1=n^2-2n$
Space: $\mathbb{R}^{n^2}$
Permutation Embedding into hypersphere of dimension: $(n-1)^2$ Radius of hypersphere: $\sqrt{(n-1)}$
All permutation matrices on n objects belong to the surface of a radius: $\sqrt{(n-1)}$ on hypersphere $\mathbb{S}^{n^2-2n}$ in $\mathbb{R}^{n^2-2n+1}$
Permutation space: $\mathbb{P}^{d-1}$
Center of mass of all permutation vectors:

$$c_m = \frac{1}{n!}\sum_{i=1}^{n!}\mathbb{P}_i$$

Let the index be q,r so if the position q has a value, it will be r. As an example, $\mathbb{P}_{(q,r)}=\mathbb{P}_{(1,1)}$ means that the first position in the permutation vector is set to value 1.
For n vectors, there are, therefore, (n−1) vectors with (1,1) permutations.
Therefore, $$c_m = \frac{1}{n!}\sum_{i=1}^{n!}\mathbb{P}_i = \frac{1}{n!}\sum_{i=1}^{n!}\mathbb{P}_{i-1}(n-1)! = \frac{1}{2}(n+1)$$

The radius of the hypersphere is:

$$|c_m - \mathbb{P}_i| = \sqrt{\sum_{i=1}^{n}\left(\frac{1}{2}(n+1)-i\right)^2} = \sqrt{\frac{1}{12}(n^3-n)}$$

The nth-Fibonacci Number is given by the Binet Formula:

$$F(x) = \frac{1}{\sqrt{5}}\left[\left(\frac{1+\sqrt{5}}{2}\right)^x - \left(\frac{1+\sqrt{5}}{2}\right)^x\right]$$

The motivation is drawn from the design of a probability density estimator for data of arbitrary dimension, more generally from source coding. The following procedures define a PDF estimation model that maps (n−1)-dimensional samples onto $\mathbb{S}^{n-1}$. The PDF estimation is performed in the new domain using a kernel density derived estimation technique. A smoothing kernel function represents each sample at its place and sums their contributions.

This is equivalent to a convolution between the kernel and the data; therefore, the derived convolution result represents the estimation. Note that convolution is used only to compute the estimate, not to handle the dependency. In the vMF transition model, the marginalization can be performed using the fact that a vMF can be approximated by an angular Gaussian and performing analytical convolution of angular Gaussian with subsequent projection back to vMF space (Mardia & Jupp).

In related work, the teachings of S. M. Plis, T. Lane and V. D. Calhoun, "Permutations as Angular Data: Efficient Inference in Factorial Spaces," 2010 IEEE International Conference on Data Mining, Sydney, N S W, 2010, pp. 403-410 are incorporated here by reference in its entirety. However, while the Plis et al. teachings show a way to embed the discrete permutation structure into an n-Sphere, they do not show how to make the process efficient and general by using an indexed quasicrystalline lattice, such as the way of the present invention. The present disclosure provides for one way of several ways, but generally all using a number-series, such as the Fibonacci Series, to build an indexed embedding space on the manifold that can generalize to other kinds of geometries, such as the n-Torus, and not just the n-Sphere.

Algorithm From Permutation Polytope to Hypersphere: $\mathbb{P}^{d-1} \to \mathbb{S}^d$ The general algorithm to map from the vertices of the polytope to the surface of a sphere is given by the following three simple generic steps:
1. Given polytope, IP, transform integer coordinates to origin.
2. Change basis by transforming the vectors to spherical coordinates in $\mathbb{R}^{n-1}$.
3. Rescale by the radius to get unit vectors.

Now, the preferred embodiment of this general procedure presented below avoids re-scaling and many other computations as otherwise shown by Plis et al:
1. Transform the permutation polytope $\mathbb{P}_n$ into a Lehmer Code index, so any code from 0 . . . n provides the permutation, P-th index:
2. Associate each Lehmer code to a unique index from 1 to N.
3. Let this p-th index, be the point on the Fibonnaci hypercurve on the hypersurface of the hypersphere. Use the Binet formula to compute this P-th integer.
4. Apply the von Mises Fisher or other (Mallows, Watson) probability model to the hypersurface on which the hypercurve is embedded.
5. Therefore, each index on the hypersphere, as given by the Fibonacci number at that point, represents the respective permutation and, therefore, also a locale with the indexed directional distribution indexed by the area patch around the point.
6. Use unit spherical coordinates in $\mathbb{R}^{n-1}$.
7. Associate the indices to the index terms of the Fibonacci spherical map.

Algorithm From Hypersphere back to Permutation Polytope: $\mathbb{S}^d \to \mathbb{P}^{d-1}$ Given an arbitrary point, in $\mathbb{R}^{n^2}$ (on or near the surface of the hypersphere), we find the closest point that is a permutation. As per the teachings of Plis et al., an arbitrary point on the hypersphere can be matched to the nearest permutation point by using a minimum weighted bipartite matching algorithm in which a cost matrix between the input point and its nearest neighbors is minimized to produce the best nearest neighbor choice.

However, in the present disclosure, the situation is simpler because the Quanton generator is analytic and the Fibonacci lattice tessellates (i.e. quantizes) the space in a regular index so that any arbitrary point at any quasi-cell is easy to identify and compute a distance in order to choose the best lattice (i.e. permutation) point. In other words, the index points of the Fibonacci lattice polytope quantizes the space and, therefore, the nearest point on the Fibonacci curve, to an arbitrary point, is found using the minimum distance along the curve to the arbitrary point. If the arbitrary point is a perfect midpoint bisection (for example, between two lattice points), then randomly select the nearest neighbor lattice point. The procedure for solving for the distance to the curve is as follows:

(1) The Fibonacci curve spirals down the sphere from North Pole to South Pole. It remains a constant distance from neighboring windings for z (−1 at South Pole to +1 at North Pole):
n=a constant defining a given spiral
$k=\sqrt{n\pi}$
$r=\sqrt{z^2}$
$\theta=k \cdot \text{Arcsin}(z)$
$x=r \cdot \text{Cos}(\theta)$
$y=r \cdot \text{Sin}(\theta)$ It makes k/2 revolutions around the sphere, with each winding $\sqrt{4\pi/n}$ from adjacent windings, while the slope dz/d(x,y) is 1/k.

(2) Set k such that the inter-winding distance covers the largest tile on the sphere.

(3) For every point in the main set, calculate the theta of the nearest point on the curve, and index the list of points by those numbers. For a given test point, calculate it's theta of the nearest point on the curve, which is the nearest neighbor distance limit, and find that point in the index.

(4) Search outward (in both directions) from there (i.e. from the index), to theta values that are as far away as your current nearest neighbor using linear scanning. After reaching that limit, if the distance to that neighbor is less than the distance from the test point to the next adjacent winding, one has obtained the nearest neighbor. If not, jump the theta value by 2pi and search that winding the same way.

(5) Then, the arc length, s, on an n-sphere is computed as follows:

$$s = R \cdot \text{acos}\left(\frac{a \cdot b}{2 \cdot R}\right)$$

(6) Transform from point on surface of hypersphere to nearest lattice point back to nearest permutation using the relation that the index of the nearest lattice point produces the Lehmer code for the permutation at that point; however, (7) In the case that the point on the surface is equidistant from multiple lattice points, choose the nearest point at random and return the permutation at that point.

Quanton Just-In-Time Calibration Algorithm. Now, referring to FIG. 12: Detail of Quanton Calibration Construction Processing, 64, starts with the structure model that defines how the permutation if generated. The permutation structure is defined in terms of the type of permutation and how it represents a given problem or how it represents some data as well as how one permutation leads to the next permutation. Element 65, the state transition model, specifies the type of probabilistic transition between permutations and may be learned from data or provided a-priori: the model, in effect, describes a transition state vector. The Temporal Model, 66 specifies a function that determines how the permutation or their allocation to the manifold changes over time. The Measurement Model, 67, provides a weighting or scaling factor and a function to measure distances between permutations: in effect, it provides a measurement vector of lower dimensionality than observations at the state vector. For example, the Hamming Distance could be used.

Algorithm Parameters, 68, contain any constants or heuristic or concentration or other parameters needed by the probabilistic model, as given by the choice of the probability density function, 69.

The probabilistic model is composed of the observation, transition and posterior 70 probabilities in accord with the standard definitions to those skilled in the art in, for example, Bayesian inference.

Figure 12:
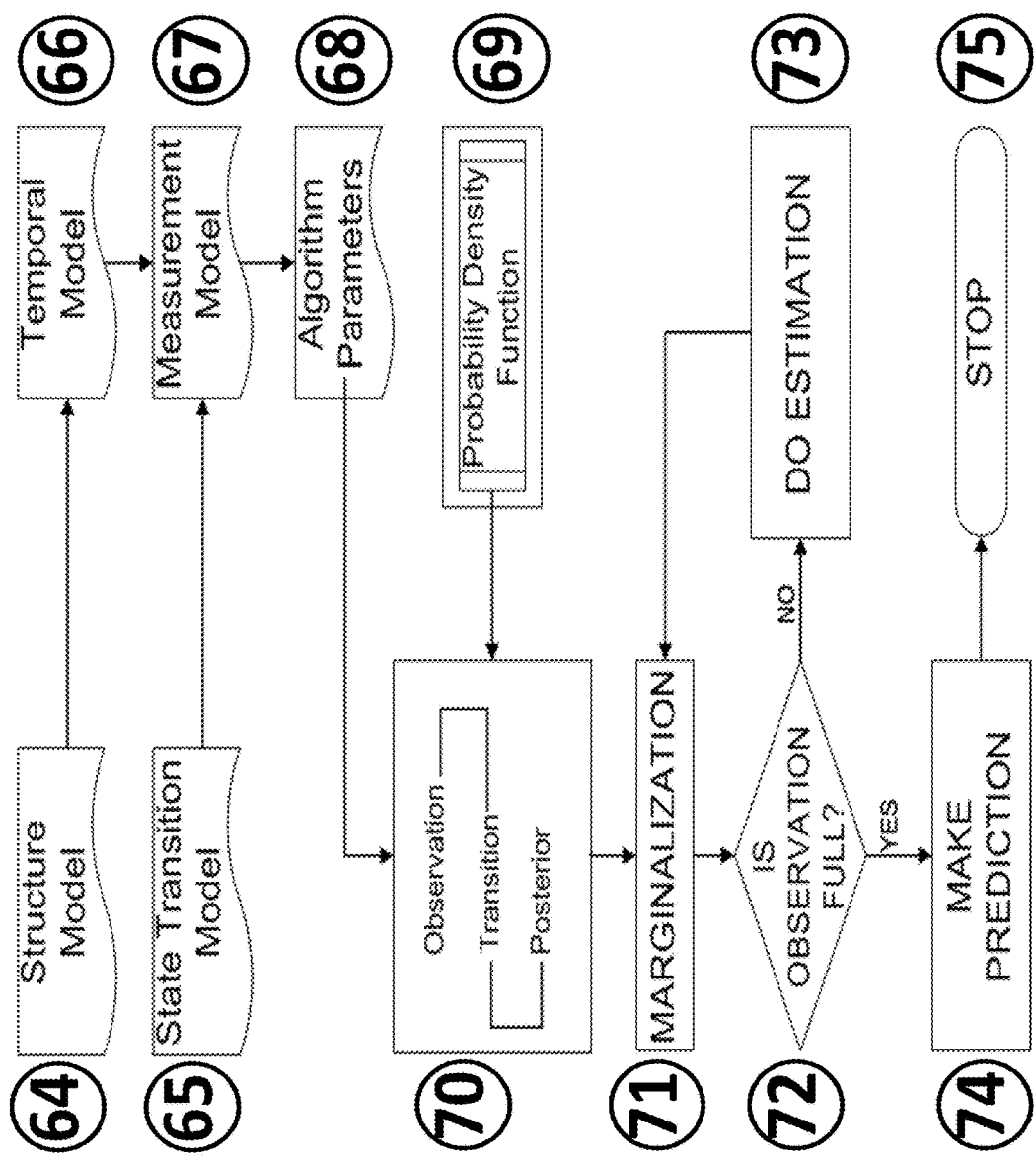
FIG. 12 illustrates exemplary details of Quanton calibration construction processing.

Now, the items referred in FIG. 12 as 71, 72, 73, 74 and 75 collectively constitute a process of calibration, also known as machine learning. The Quanton is calibrated using some known reference data as the observation: the calibration is based on iterative estimation of the probability density distribution between the permutations on the manifold until they correspond to an acceptance threshold in which the observed training data is satisfied. The marginalization step, item 71 produces a new distribution and this is used, as in the traditional case, in an update estimation process, item 73, that is recursive (like recursive Bayesian estimation) until the data are learned, item 72 and calibration is completed, 74, 75.

Figure 13A:
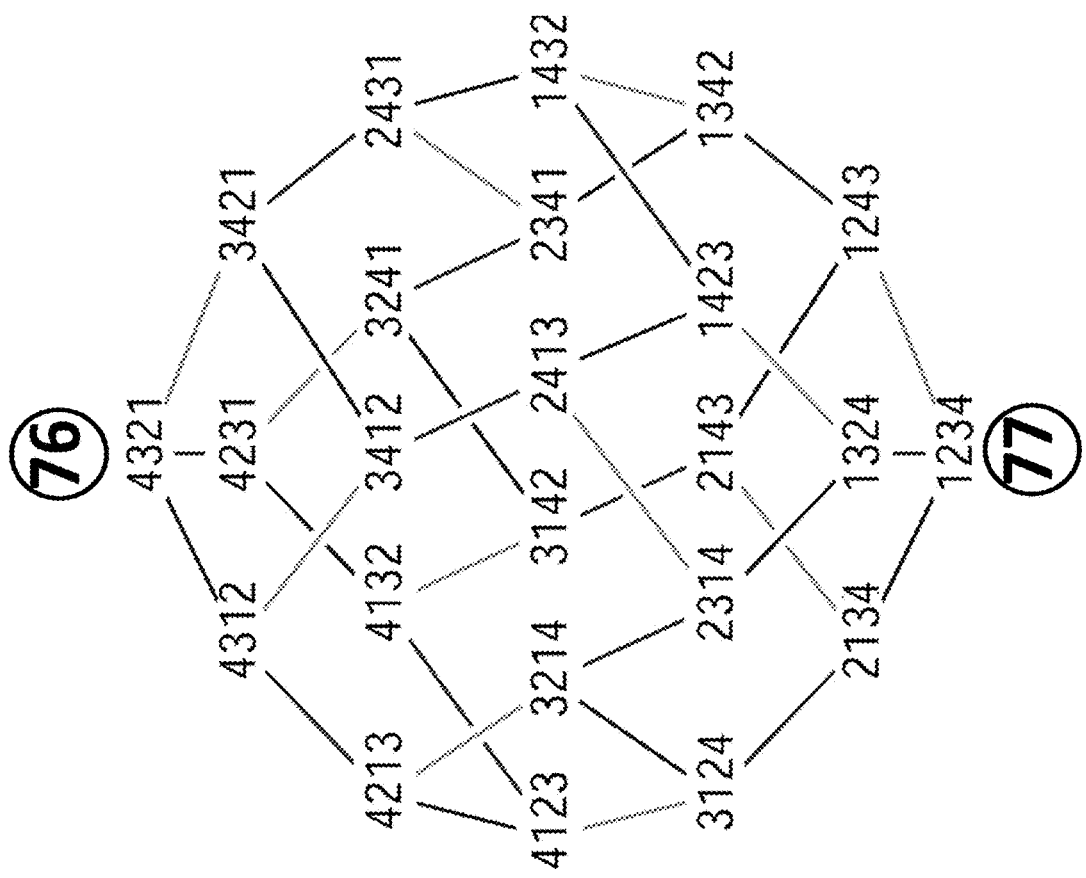
FIG. 13A illustrates an exemplary topological structure of the space of the 4-Permutation Orbitope.
Figure 13B:
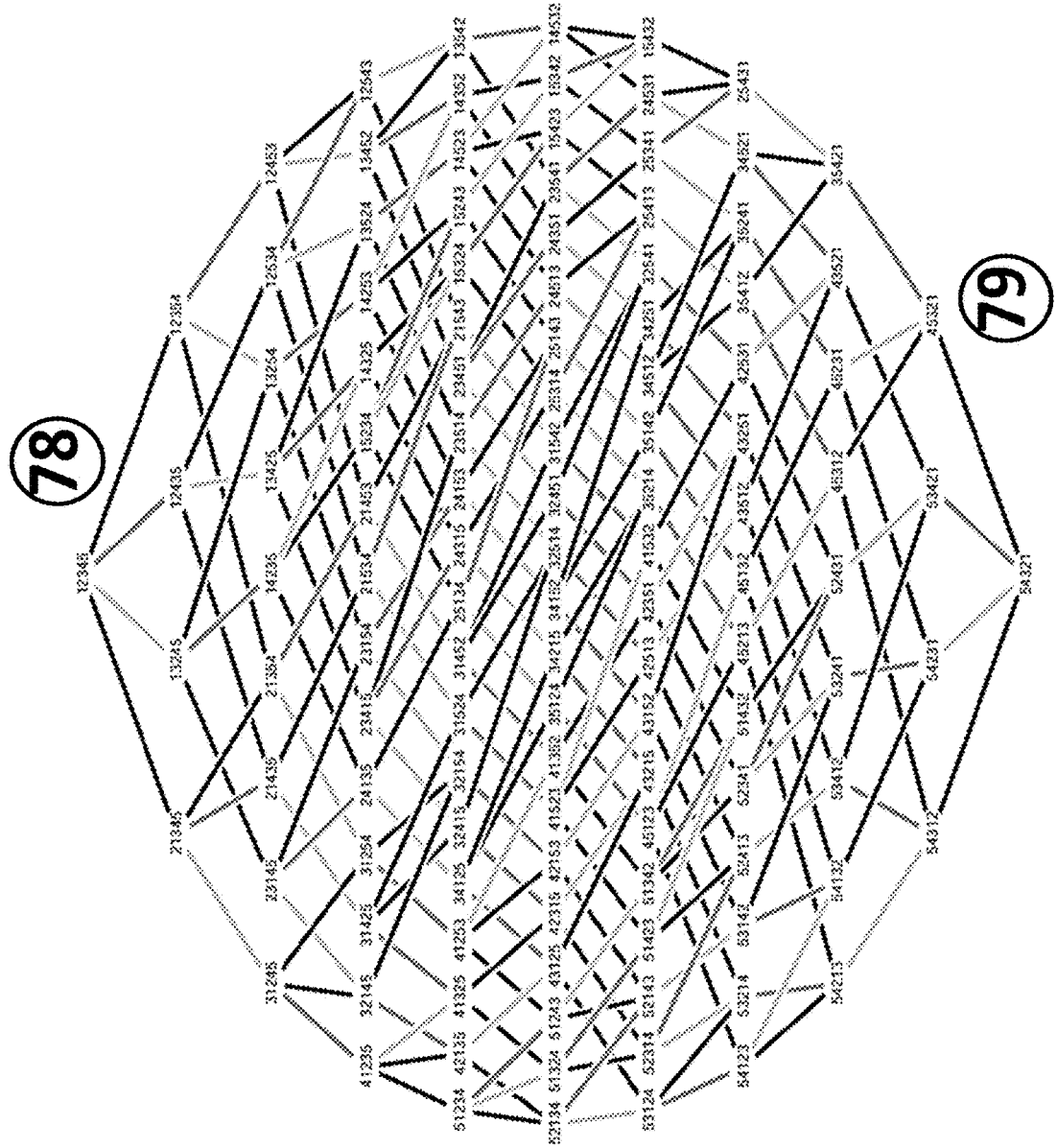
FIG. 13B illustrates an exemplary topological structure of the space of the 5-Permutation Orbitope.

Now, referring to FIG. 13A: Topological Structure the space of the 4-Permutation Orbitope. We note that the structure of the permutation as movements of the numbers defining a permutation, forms a certain configuration. In one example shown herein, a four permutation may start at 76 and results at 77. FIG. 13B illustrates the topological structure of the space of the 5-Permutation Orbitope. In one example, a five permutation may start at 78 and end at 79.

Figure 14:
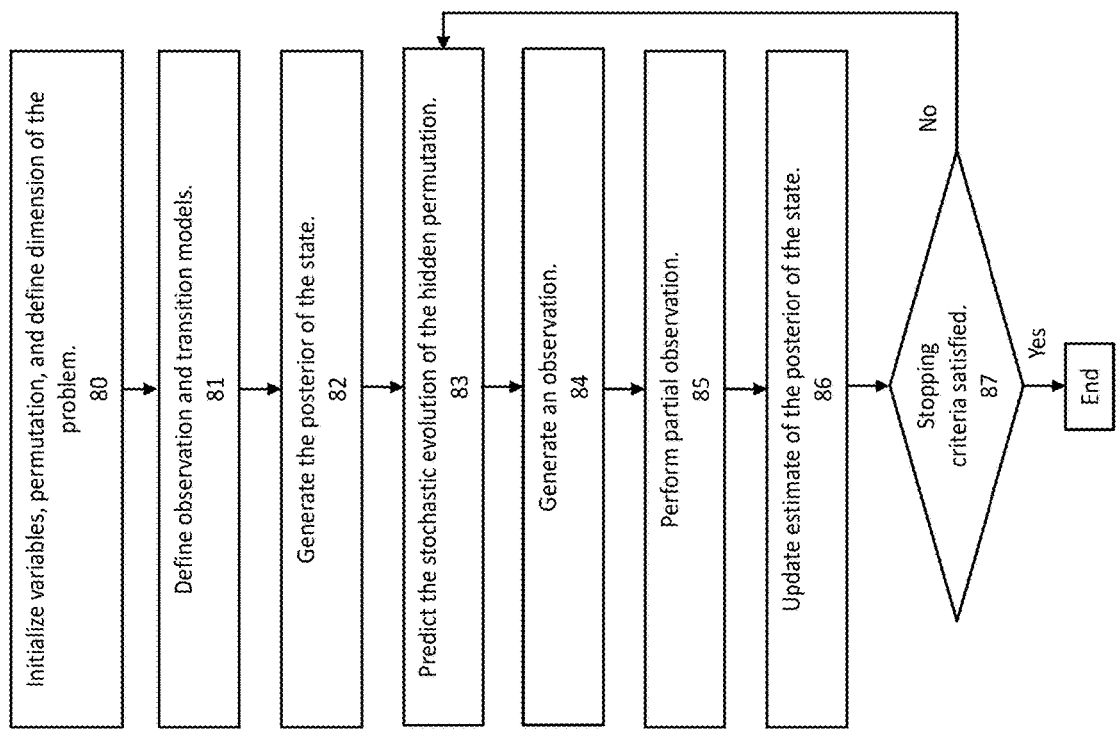
FIG. 14 illustrates a flowchart describing recursive evolution and estimation.

FIG. 14 depicts a Recursive Evolution and Estimation Flowchart.

The model has two main parts:
prob($h_t|h_{t-1}$); which describes the stochastic evolution of the hidden permutation
prob($o_t|x_t$); where $o_t$ is the noisy observation of the hidden permutation $$prob(h_t|o_{t-1}) = \int p(h_t|o_{t-1}) p(h_{t-1}|o_{t-1}) do_{t-1}$$

marginalization for this equation can be computed with by approximating the vMFs with angular Gaussians, convolving analytically, and projecting back to vMF space.

All the inference steps operate only on $S^f$ representations of permutations, avoiding unnecessary transformation overhead.

The transition model is defined by a possibly mixed conditional probability distribution over the permutations $h(\sigma^{(t)}|\sigma^{(t-1)})$, and might be that elements belonging to two different data are swapped with some probability by a mixing event. The observation model is defined by the distribution $P(h^{(t)}|\sigma^{(t)})$, which might, for example, capture a distribution over a specific data feature that is observable for each data element.

Given the distribution $h(\sigma(t)|z(1), \ldots, z(t))$, we recursively compute the posterior at time t+1, $h(\sigma(t+1)|z(1), \ldots, z(t+1))$, in two steps: a prediction/rollup step and a conditioning step. Taken together, these two steps form the Forward Algorithm. The prediction (induction)/rollup step multiplies the distribution by the transition model and marginalizes out the previous time step:

Closely related permutations have more information in common and hence more compressible than the permutations that are poorly related. This information theoretic framework can be adapted to individual contexts by accommodating prior knowledge about rankings in those settings. The specific types of measurements that can be made are:
(1) the measurement of the extent of non-overlap in the two permutrixes;
(2) the measurement of disarray of its overlapping elements in permutrixes;
(3) the displacement of the positions (ranks) of these elements in permutants; and,
(4) A surrogate for entanglement based on the size of the permutons and the alignment between their subsequence avoiding patterns or their subsequence isomorphisms.

Continuous parameters (which are projections to the n-sphere) can necessarily only be stated only to finite precision (due to the Fibonacci lattice structure and permutations). MML incorporates this in the framework by determining the region of uncertainty in which the parameter is located: The value:

$$\frac{q_p^{-p/2}}{\sqrt{|\mathcal{F}(\Theta)|}}$$

gives a measure of the volume of the region of uncertainty in the parameter $\Theta$ is centered.

When $\Theta$ is multiplied by the probability density, $h(\Theta)$ gives the probability of a specific $\Theta$ and is proportional to:

$$\frac{h(\Theta)}{\sqrt{|\mathcal{F}(\Theta)|}}$$

This probability is used to compute the message length associated with encoding the continuous valued parameters (to a finite precision).

The vector of parameters e of any distribution given data, D. A prior on the hypothesis, $h(\Theta)$, is chosen (e.g. Gaussian). The determinant of the Fisher information matrix is also necessary to evaluate: $|\mathcal{F}(\Theta)|$ of the expected second-order partial derivatives of the log-likelihood function: $-\mathcal{L}(D|\Theta)$.

$$I(\Theta, D) = \frac{p}{2}\log(q_p) - \log\left(\frac{h(\Theta)}{\sqrt{|\mathcal{F}(\Theta)|}}\right) - \mathcal{L}(D|\Theta) + \frac{p}{2}$$

Note that p is the number of free parameters in the model.
Convex Relaxations for Permutation problems
Given: pairwise similarity information $A_{ij}$ on n variables.
Let $\pi$ be a seriated permutation ordering (poset): then, $A_{\pi(i)\pi(j)}$ decreases with $|i-j|$ (aka R-Matrix).
Define the Laplacian of A as $L(A)=\text{diag}(A1)-A$
The Fiedler vector of A is: $f(A)=\text{argmin } x^T L(A)x$; $1^T x=0$; $\|x\|_2=1$ $x \in \mathbb{R}^n$ is in $P\mathcal{H}^n$ if and only if the point z is obtained by sorting the coordinate-wise values of x in descending order satisfies the equations:

$$\sum_{i=1}^{k} z_i \leq \sum_{i=1}^{k} (n+1-i) \; \Big| \; \forall k \in [n] \sum_{i=1}^{n} z_i = \frac{n(n+1)}{2}$$

Example of vMF:
prob($h_t|h_{t-1}$)=vMF($h_t;h_{t-1}$, $\kappa_{transition}$) (see element 81)
prob($o_t|h_t$)=vMF($o_t;h_t$, $\kappa_{observed}$) (see element 81)
prob($h_t|o_t$)=vMF($h_t;u_t$, $\kappa_t$); posterior model (see element 82)
Use the new observation to update the estimate through the observation model (see element 86):

$$\text{prob}(h_t|o_t) \propto p(o_t|h_t)p(h_t|o_{t-1})$$

We use probability distributions for the transition, observation, and posterior models.

When a partial observation of o objects becomes available, the dimension of the unknown part of the observed permutation matrix O is reduced from n to (n−o). Therefore, the algorithm provides for the abduction (inference) of a hidden permutation from its noisy partial observables.

FIG. 14 shows a flow chart of one implementation of a method 1400 Quanton model simulation.

In step 80 of method 1400, various input parameters are initialized. For example, the initialized parameters can include the maximum the stopping criteria (e.g., the maximum number of iterations), the dimension the structure model, the state transition model, the directional probability density function (e.g., the mean and the variance for a Gaussian distribution, and for a von Mises-Fisher distribution the mean and the value of x). While many directional probability density functions can be used, method 1400 will be exemplified herein using the von Mises-Fisher distribution. Further, the initialized parameters can include the relative percentage of hidden permutations. The Quanton can be represented as a Birkhoff polytope and/or as a hypersphere.

In step 81 of method 1400, observation and transition modes are defined. The transition model is defined by a possibly mixed conditional probability distribution over the permutations h($\sigma^{(t)}|\sigma^{(t-1)}$), and might be that elements belonging to two different data are swapped with some probability by a mixing event. The observation model is defined by the distribution P($h^{(t)}|\sigma^{(t)}$), which might, for example, capture a distribution over a specific data feature that is observable for each data element.

Given the distribution h($\sigma(t)|z(1)$, ..., z(t)), we recursively compute the posterior at time t+1, h($\sigma(t+1)|z(1)$, ..., z(t+1)), in two steps: a prediction/rollup step and a conditioning step. Taken together, these two steps form the Forward Algorithm. The prediction (induction)/rollup step multiplies the distribution by the transition model and marginalizes out the previous time step:

In step 82 of method 1400, the posterior of the state is generated.

In step 83 of method 1400, the marginalization for the stochastic evolution of the hidden permutations is calculated. For the von Mises-Fisher distribution, this can be calculated using the approximation that the convolution between two von Mises-Fisher distributions represents the marginalization.

In step 84 of method 1400, the observations are generated. The observations can be generated by first converting the permutation to its matrix operator representation. Next, the matrix operator representation can be used to project the matrix operator representation onto the surface of a hypersphere in the subspace spanned by orthogonal basis vectors that represent the subspace of the Birkhoff polytope to generate a mean vector of the distribution.

In certain implementations of step 84, the mean vector of the distribution is used to generate random draws from von Mises-Fisher distribution to generate a statistical sample to generate a modified permutation distribution on the Birkhoff polytope.

In certain other implementations of step 84, the mean vector of the distribution is used to calculate, for various object locations, flip probability matrices. The flip probability matrices are then used as a probability model to determine the changes to the permutations represented on the hypersphere to generate modified permutations. The modified permutations can then be converted to modified permutation distribution on the Birkhoff polytope.

The modified permutation distribution on the Birkhoff polytope can then be mapped onto the nearest vertices of the hypersphere using the inverses of the orthogonal basis vectors that represent the subspace of the Birkhoff polytope in order to solve for the nearest vertex of the permutations matrix, wherein nearest is determined using a Euclidean distance.

In step 85 of method 1400, the partial observations are performed to generate a new observation.

In step 86 of method 1400, the new observation is used to update the estimate through the observation model:

$$\text{prob}(h_t|o_t) \propto p(o_t|h_t)p(h_t|o_{t-1}).$$

In step 87 of method 1400, an inquiry is performed whether the stopping criteria have been reached. If the stopping criteria have not been reached, method 1400 proceeds from step 87 to step 83. Otherwise, method 1400 is complete.

An arbitrary point in $\mathbb{R}^{n^2}$ corresponds to a point on the hypersphere and therefore to a permutation. Let $T^s$ be any point in in $\mathbb{R}^{n^2}$ therefore this point must correspond to a point on $S^d$ which is to say, on $S^{(n-1)^2-1}$ In terms of a PDF on permutations the vMF establishes a distance-based model, where distances are geodesic on Sd. However, while the VMF works for isotropic distributions the lack of a closed-form conjugate prior for the concentration parameter in the vMF distribution complicates posterior inference and the concentration is usually parameter is arbitrarily fixed and not inferred from the data.

The addition of a tangent space model allows for anisotropic distributions and can act as a correction to other distributions on the sphere while adapting the model complexity to the data, as driven by the data. The inference algorithms are parallelizable while leveraging the geometry of the sphere and the Fibonacci lattice.

In the present disclosure, in the tangent space model, each mixture component exists in its own tangent space, and each tangent space is unique.

Figure 15:
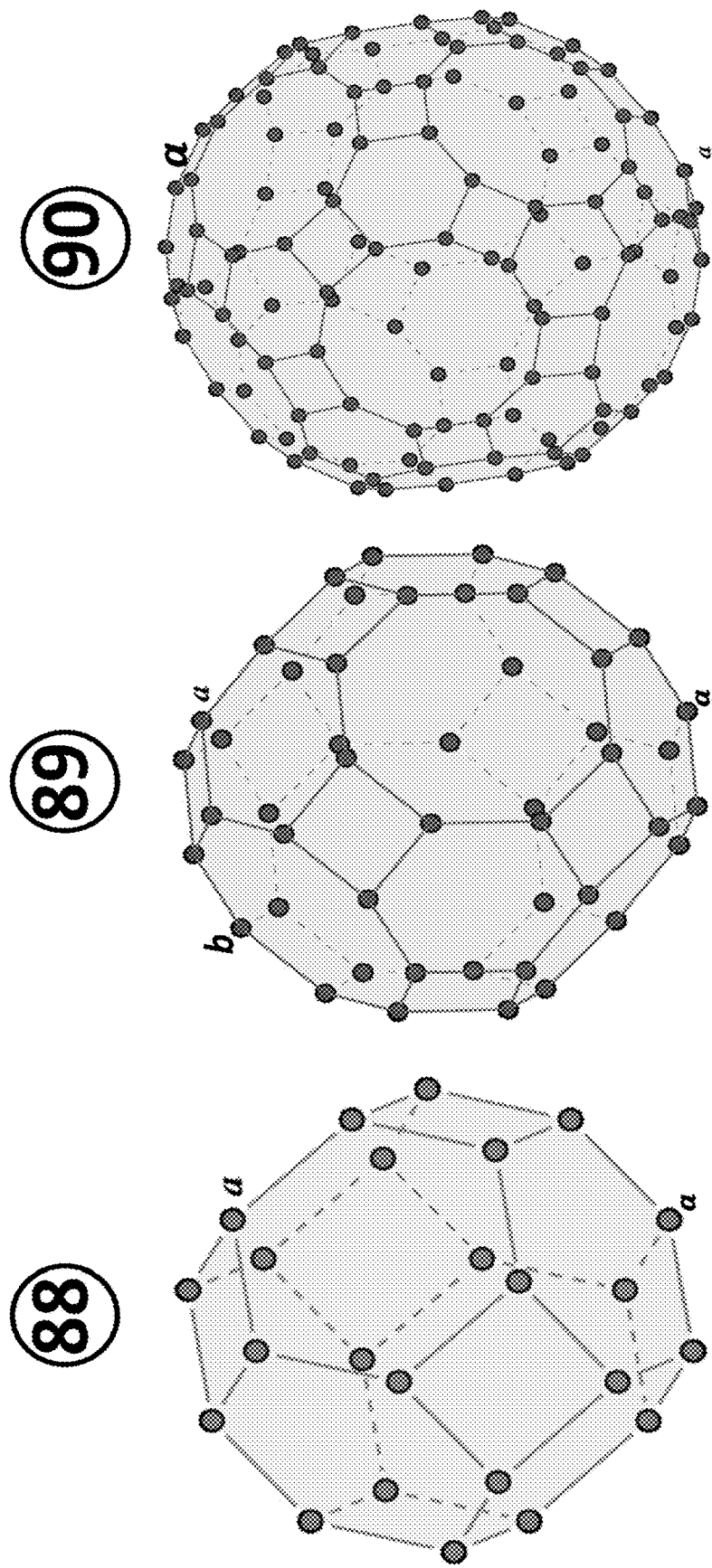
FIG. 15 illustrates a polyhedral structure of the space of a few Braid group and permutation Orbitopes (Zonotopes)

Now, referring to FIG. 15: Polyhedral Structure the space of a few Braid Group and Permutation Orbitopes (Zonotopes), the different permutation layouts are shown which identifies the paths or relations in transitioning from one permutation to another. The purpose of FIG. 15 is to draw attention to the structure of the geometry with respect to the ordering of the permutations. This is important because permutation ordering in the Quanton model provides the transition ordering between state spaces. For example, in 88, label a, sits at a "square" arrangement of permutations and is adjacent to a hexagonal arrangement of permutations.

However, in 89, label a, sits at a "square" arrangement of permutations and is adjacent to an octagonal arrangement of permutations at label b. In 90, several different polygonal locales are shown which tile the surface of the Quanton.

Figure 16:
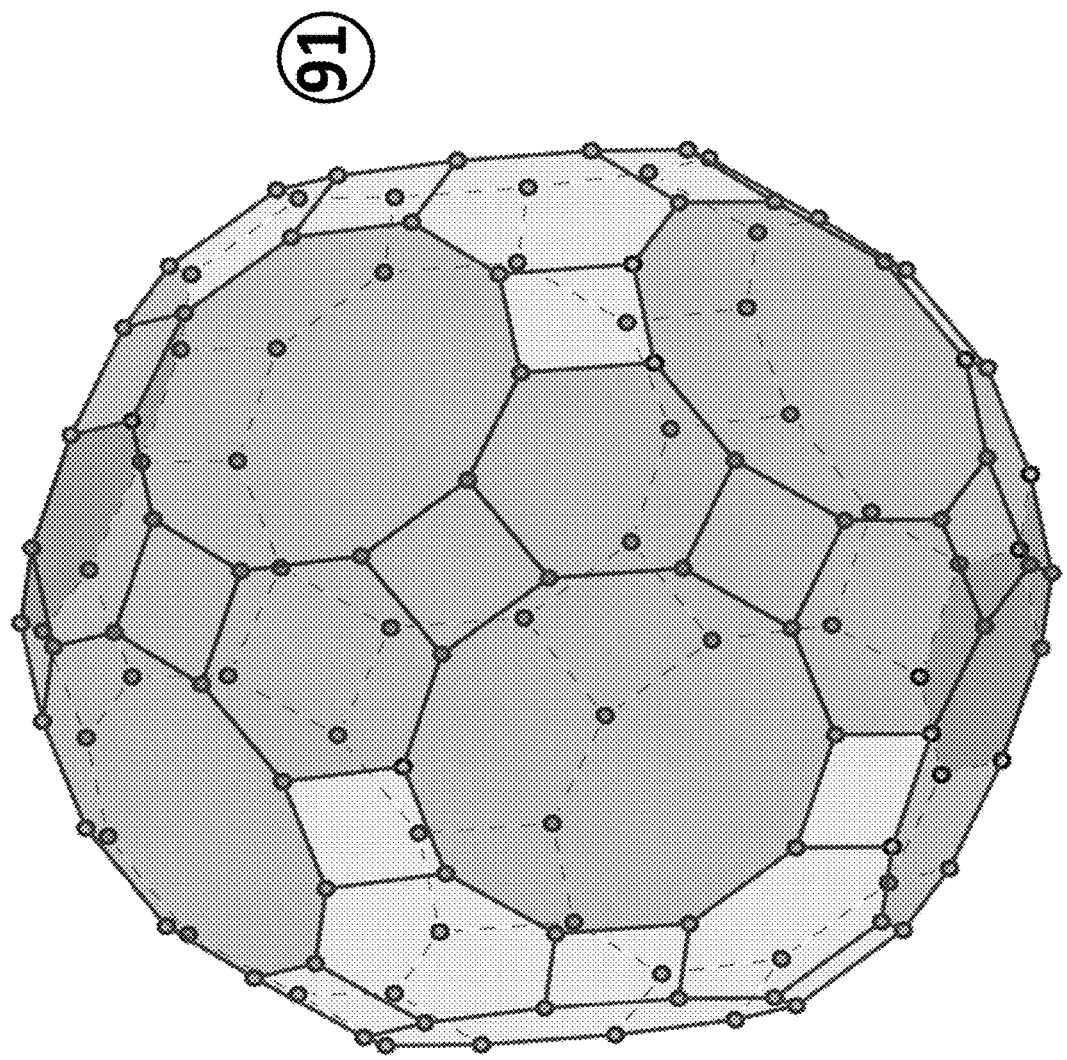
FIG. 16 illustrates a polyhedral structure illustrating a Quantized polyhedral probability density distribution.

Now, referring to FIG. 16: Polyhedral Structure Illustrating Quantized Polyhedral Probability Density Distribution, we can see that the lighter shaded patches of equal probability density 91 are interpreted to mean that all the permutations covered associates the external semantics as observables to the state spaces as permutations. As shown in this disclosure, this can be learned by the Quanton using Bayesian like approaches.

Figure 17:
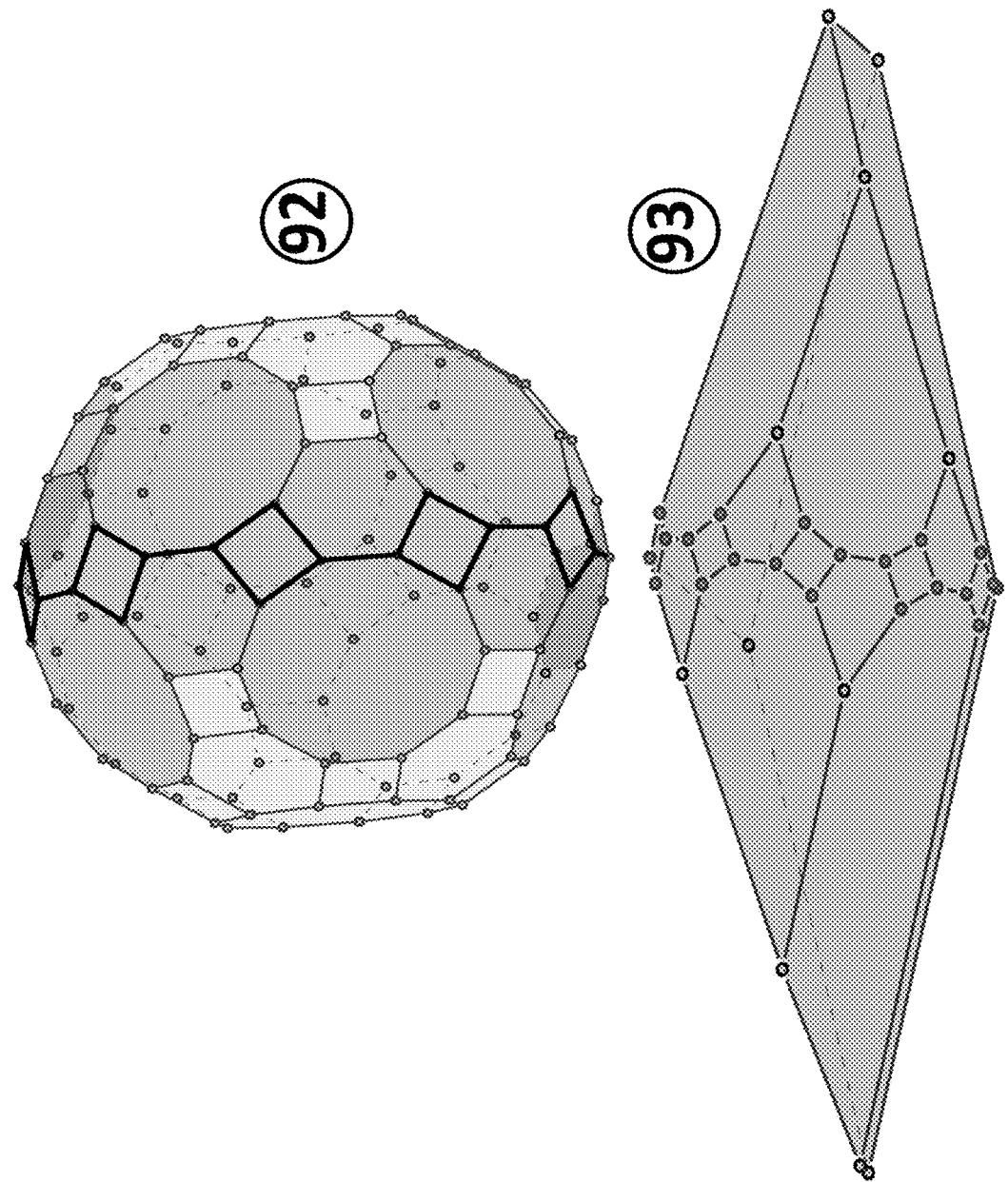
FIG. 17 illustrates a polyhedral structure illustrating a projection of a single Quantized polyhedral probability density.

FIG. 17: Polyhedral Structure Illustrating Projection of a Single Quantized Polyhedral Probability Density. In the case of a learned state represents a trajectory, or a sequence of causal states on the Quanton 92, these states can be unrolled 93 out in a sequence and the set of the states and their transitions constitutes a model of causality as learned by standard probability based learning methods.

FIGS. 13,14,15 and 16 illustrate the general idea that permutations are embedded in patterns according to a permutational pattern sequence and that this is associated to a geometry and topology given by the quasi-lattice generating procedure. At this point, we now show how any Quantum Gate and circuit can be represented by the permutation pattern and that any Quantum Gate process (i.e the operation of a complicated set of quantum gates) can be directly emulated by paths in the Quanton. Specifically, we address the fact the both non-computable numbers and computable numbers result in abductive hypotheses and deductive computation while machine learning that adjusts the probability transitions results in inductive learning.

Included herein by reference in its entirety is the teachings of Michael A. Nielsen and Isaac L. Chuang. 2011. Quantum Computation and Quantum Information: 10th Anniversary Edition (10th ed.). Cambridge University Press, New York, N.Y., USA.

It must be appreciated that a group (register) of n bits can contain only one of $2^n$ different numbers at a given time and that also for any constant, k>1, and any natural number n, that the following holds: $k^n \leq n! \leq n^n$. Therefore, for example, consider a 4 Qubit state which contains $2^4=16$ possibilities, as contained in the permutation, 4!=24 possibility state. Therefore, it is clear to see that the state space of permutations scales astoundingly quickly compared to traditional qubits and lastly qubits scale fast than the state space of simple bits (or even probabilistic bits, such as pbits known to those skill in the art).

Just as real numbers can be seen as a subset of the complex numbers, it is possible to rewrite Qubits in terms of real numbered Rebits as the subset of quantum states of Qubits that have density matrices with real entries in the computational basis. Based on the teachings of Rudolph, T and Grover, L, "A 2 rebit gate universal for quantum computing", we can state that n+1 Rebits (real bits), with the additional coding for the real and imaginary parts and an initial state of a n-qubit state can represent any state:

$$|\psi\rangle = \sum_{v \in \mathbb{Z}_2^n}^{n} r_v e^{i\theta_v}, |v\rangle$$

The corresponding encoded state is where $|R\rangle = |0\rangle$ and $|I\rangle = |1\rangle$ is just notation that makes explicit the real and imaginary parts in the encoding:

$$|\overline{\psi}\rangle = \sum_{v \in \mathbb{Z}_2^n}^{n} (r_v \mathrm{Cos}\theta_v |v\rangle \otimes |R\rangle + r_v \mathrm{Sin}\theta_v |v\rangle \otimes |I\rangle)$$

Changing a Qubit state by a global phase is reflected by the existence of infinitely many Rebit states encoding the same Qubit state. In simple terms, the resulting formula is similar to the complex case, except that an overall absolute value sign is missing. Hence, the two-Qubit state may be rewritten as a three-Rebit state in the Rudolph and Shor model. This is important because the Quanton is an approximation model of quantum systems in the real-amplitude variant of quantum theory.

Any given Quantum model state may be transformed into a unique Quanton which serves as the normal form of the quantum state. The normal form depends on algebraically independent Stochastic Local Operations and Classical Communication (SLOCC) which are the equivalent groups under probability on the Quanton. These invariants, therefore, constitutes a family of orbits parametrized by these probabilities. By one embodiment, this idea is interpreted to set the stage for entanglement representation by a model of equivalent group sharing such that for example, given that at least one group (i.e orbit) must be shared, also known as a pattern avoiding sequence that that is share or as a shared pattern conforming sequence, that a N–Qubit entanglement state is defined as (N−1)! entangled families. So for N=4, there are 3!=6 families and for N=3, there are 2 families (i.e. two non-isomorphic patterns).

Procedure for Mapping Quantum Logic Circuits to Permutation Representation:

Quantum circuits, following Nielsen and Chuang as earlier cited and incorporated herein, can be seen as n-bit reversible logic gates. These logic gates can form complicated functional circuits, however, they are all equivalent to permutations acting on the $2^n$ possible states of bits that pass through them. Therefore, specifying a reversible logic gate is defined as specifying the mapping that it performs in terms of permutations. In quantum computing, these computational states are represented by the quantum mechanical states.

Define a finite set S having n-elements which are well defined quantum mechanical states: therefore, any reversible logic is expressed by introducing a permutation operator $\sigma \in S^n$ where $\sigma$ is a one-to-one mapping of S onto itself (i.e. a permutation).

Let the set of bits be represented by the lower case letters as follows: a,b∈(1, 0); and let the set of sets be represented by i (such that i=0, 1, 2, 3) which are interpreted as the four computational states expressed by two input bits of the measurement gate. Therefore, we can write the specification of the logic as follows:

TABLE 6

Quantum Gate State Transition Mapping (Truth Table)

| a control | b target | \|i input> | a control | b target | \|i output> |
|---|---|---|---|---|---|
| 0 | 0 | 0 | 0 | 0 | 0 |
| 0 | 1 | 1 | 0 | 1 | 1 |
| 1 | 0 | 2 | 1 | 1 | 3 |
| 1 | 1 | 3 | 1 | 0 | 2 |

This representation is interpreted in this disclosure as an element of the permutation group $S^4$. Now, the important idea is that any universal gate, such as the C-NOT gate can be represented as a one-to-one mapping in $S^4$ so that the above table can now be represented solely by permutations. $S^4$ contains 4! permutations that implies 24 different logic gates for a 4-state system. As noted earlier in the present disclosure, any N-level quantum system can be permutated in N! computationally distinct logic sets: these permutations of degree N form a group of order N! under the composite operation of permutation.

Therefore, in what follows is illustrated how the present disclosure represents a virtual machine for Quantum computation by (probabilistic) Permutation (aka Computation by Permutation).

Any permutation group, $S^n$ is the collection of all bijective maps of the set of permutation $$\varphi : S^n \underset{\sigma}{\Leftrightarrow} S^n$$

of interval S={1, 2, 3 ... N}, with composition maps φ as the group operation over σ.

Recall that a transposition is a cycle of length 2, hence, any permutation can be written as a product of transpositions and that therefore any permutation can be written as a product of disjoint cycles, it is sufficient to write each cycle as a product of transpositions:

$$(n_1, n_2, \ldots n_k) = (n_1, n_k)(n_1, n_{k-1}) \ldots (n_1, n_2)$$

Note that there are several ways to write a given permutation as a product of transpositions. For instance, let P=(3, 5, 4)(1, 2, 3, 4). Then applying formula [00183] above to each of the cycles (3, 5, 4) and (1, 2, 3, 4), we get P=(3, 4)(3, 5)(1, 4)(1, 3)(1, 2), so P is a product of 5 transpositions. On other hand, we can first write P as a product of disjoint cycles (in this example there will be just one cycle) and then use (T). This gives P=(3, 5, 4)(1, 2, 3, 4)=(1, 2, 5, 4)=(1, 4)(1, 5)(1, 2), so now P is a product of 3 transpositions.

Figure 18A:
FIG. 18A illustrates an example of Quantum Gates (Quantum Circuits)
Figure 18B:
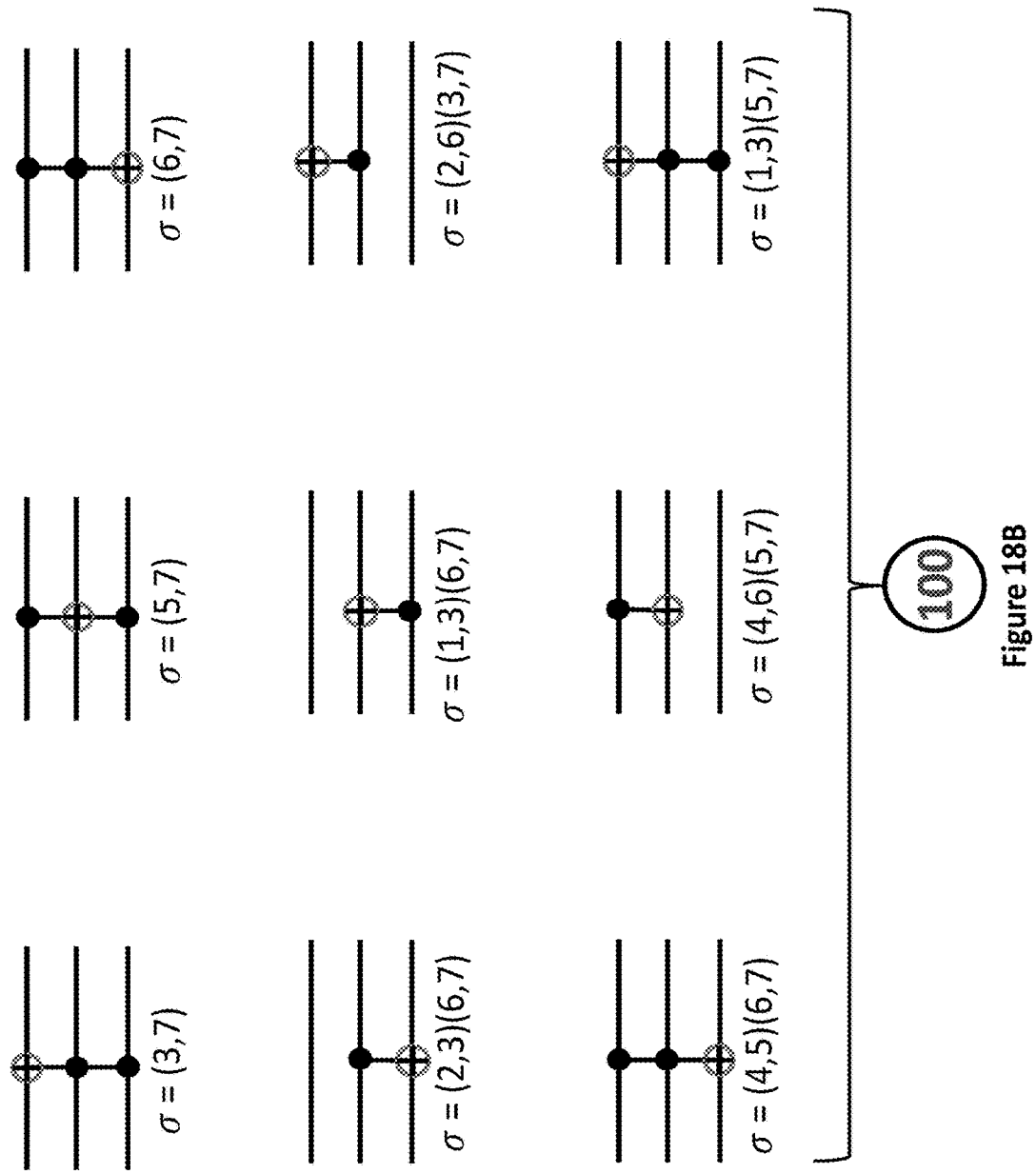
FIG. 18B illustrates an equivalence between permutation representations and Quantum circuits.

The C-NOT gate 94 is a universal quantum gate as explained in Nielsen and Chuang. FIG. 18A illustrates the mapping of C-NOT circuits to permutations written in permutation cycle notation. The product of cycles of a permutation is equivalent to reversible logic. The n-bit CNOT gate (i.e., controlled-NOT or C-NOT) operates on any one bit of n while the control bits are the other (n−1) bits or (n−2) and so on. For n=3, there 9 possible C-NOT gates 100 as shown in FIG. 18B, where each permutation operation between inputs and outputs is actualized by a unique product of transpositions.

For quantum computation, we need universal reversible gates. One of such gates is the Toffoli Gate 95 is a 3-bit gate with 3 inputs (a, b, c) and corresponding outputs (a', b', c').

The relationship between the input and output is the following $a'=a$ $b'=b$ $c=c \oplus (a \cdot b)$ Here ⊕ denotes the Exclusive OR (i.e. addition modulo 2) and · denotes the AND function. The variables a and b are control bits where c is called the target bit. As seen from the logic, the control bit has no change while passing through the gate. However, the target bit flips if both control bits are logic 1. The permutation corresponding to a Toffoli Gate gate is, $$\sigma_{TOFFOLI} = \begin{bmatrix} 000 & 001 & 010 & 011 & 100 & 101 & 110 & 111 \\ 000 & 001 & 010 & 011 & 100 & 101 & 111 & 110 \end{bmatrix}$$

The transposition representation in binary is (110, 111) which in decimal is (6, 7).

The Peres gate 96 is a combination of the behaviors of a Toffoli and C-NOT gate as illustrated in FIG. 18A in 97 added to 98 to result in 99: therefore, it can realize more complex logic such as addition, subtraction etc. The Peres gate is a 3-bit gate which maintains relationship between the input and output as follows:

$a'=a$ $b'=a \oplus b$ $c=c \oplus (a \cdot b)$

The permutation corresponding to this gate is, $$\sigma_{PERES} = \begin{bmatrix} 000 & 001 & 010 & 011 & 100 & 101 & 110 & 111 \\ 000 & 001 & 010 & 011 & 110 & 111 & 101 & 100 \end{bmatrix}$$

In decimal, the corresponding cycle has a length of 4 and can be decomposed in 3 transpositions as: $\sigma_{PERES}$=(4, 6, 5, 7)=(4, 7)(4, 5)(4, 6).

Any reversible logic can be rewritten in terms of a permutation group: therefore, we use the concept of the permutation cycle works the building block of reversible gates. For every n-bit reversible logic there exist a unique permutation of degree $2^n$. Therefore, all properties and the operations on permutation groups apply or implement reversible logic operations. Therefore, all gates can be defined by permutations, such as other useful gates such as the Fredkin gate which is also known as a controlled permutation gate. Further, all gates are general in that they can represent n-bit operations, such as the n-bit Toffoli gate also known as the Multiple Control Toffoli (MCT) gate which is a reversible gate that has n inputs and n outputs.

Since permutation mimics reversible logic, therefore, the compositions of permutations are used to define operations performed by reversible gates or quantum circuits composed of the reversible gates given that any reversible gate is expressible by corresponding permutation, therefore any quantum circuit is simply a product of disjoint cycles and necessarily as a product of transpositions. We will show, in the present disclosure, that for the primitive operation of a full-adder Quantum circuit, that certain know-how is needed in order to build quantum circuits by permutation operators corresponding to circuits. The naïve approach of simply composing products of transpositions is the groundwork on which we build general efficient and simple computation operators on the Quanton.

Any irreversible function is mapped to a reversible function just by adding constant inputs and garbage outputs. However, the constant inputs must have certain values to realize the functionality in the outputs and the garbage outputs must have no impact on the end computation. The minimum number of garbage outputs required to convert an irreversible function to a reversible function is $\log_2$ (Q), where Q is the number of times an output bit pattern is repeated in a truth table representing the irreversible function. In the case of a full adder 101, as shown in FIG. 19, it is clear to one skilled in the art that the output bit patterns 01 and 10 are repeated three times and have the highest number of occurrences. Therefore, for Q=3; at least $\log_2(3)$ =2 garbage outputs and one constant input are required to make the full adder function reversible as shown in the FIG. 19.

Procedure for Computing in Permutation Representations: The Quanton design and procedure for computing in the permutation representation is presented that includes and extends the teachings of Deléglise, Marc, Nicolas, Jean-Louis, and Zimmermann, Paul. "Landau's function for one million billions." Journal de Théorie des Nombres de Bordeaux 20.3 (2008): 625-671. Prior art in the teachings of Carroll Philip Gossett, Nancy Cam Winget in their patent "Apparatus and method for extending computational precision of a computer system having a modular arithmetic processing unit" referenced in U.S. Pat. No. 6,256,656 B1 shows how modular integer representations can be productively used for enhancing computing basic irreversible computer operations. The difference between our use in the present disclosure of a similar concept of modular integer representations is that we use the Landau function to create a numbering sequence for permutation operations, and that it is with these permutation operations that enhancing computing basic fully reversible computer operations that are also fully parallelizable as seen in 102 of FIG. 19. Furthermore these reversible computation by permutation operations enable high speed emulation of quantum computing circuits, and, when combined with the probabilistic model, enable very fast approximate quantum-like computation as a general approximating probabilistic Turing machine model.

Figure 20A:
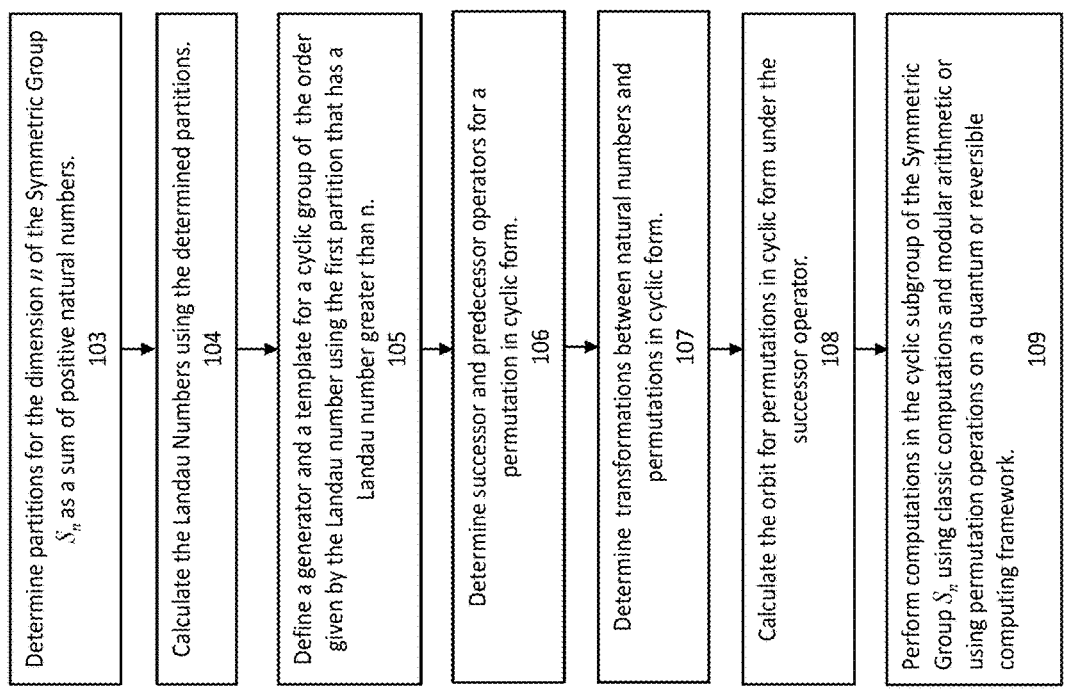
FIG. 20A illustrates a flowchart for a permutational model of computing.

FIG. 20A shows a flow chart of a method to choose a size and design of the permutations of the symmetric group of $S_n$ that provides optimality. All steps are fully parallelizable. The method uses the Landau numbers that, when combined together with a corresponding design of the permutation operator design, provide that the operational semantics of transforming permutations to ensure that the transforming permutations are bijective and reversible. For example, by using the Landau numbering to design the permutations, an addition operator can be written as an operation between permutations where the numbers must fit within the Landau numbering. The result is that the Quanton can perform all the traditional instructions, such as addition and subtraction, in terms of the movements and operations in the design. Using this design, the Quanton provides a model of computation for the instructions, which can represent the smallest Turing computing model.

In step 103 of method, partitions are determined for the dimension n of the Symmetric Group $S_n$. The partitions are determined as a sum of positive natural numbers. This step and the remaining steps of method are exemplified below using functions written in Haskell code. The method as illustrated in FIG. 20A makes possible for performing arithmetic with a subset of the permutations in the Symmetric Group $S_n$. To achieve that end, the Landau number can be used to obtain an ideal candidate for the order of the largest cyclic subgroup of Sn. Relatedly and as is described by method illustrated in FIG. 20B, cyclic groups are isomorphic with Zn which can be decomposed as a product of subgroups. These products of subgroups each have order $p_i^k$, wherein p a prime factor of n; and the subgroups can be used to emulate operations with these permutations using modular arithmetic in order to parallelize and rapidly perform these calculations.

To initialize method of FIG. 20A, a maximum integer size can be set (e.g., the maximum integer can be set to 100).

In step 103, the Landau numbers are calculated using the determined partitions. Landau number can be calculated using partitions of n as a sum of positive natural numbers. The Landau number can be determined using the lowest common multiple (LCM) of the elements of a partition. Here, the least common multiple of two integers a and b, which can be denoted by LCM(a, b), is the smallest positive integer that is divisible by both a and b.

The partitions and the Landau number in steps 103 and 104 can be defined in Haskall code, in one example. Any other programming language could also be used. Also shown below are examples of function calls and the output generated by the function calls.

Example landau 19
(420, [3, 4, 5, 7])
landau 42
(32760, [5, 7, 8, 9, 13])

In step 103 of method in FIG. 20A, a generator and a template are defined for a cyclic group of the order given by the Landau number using the first partition that has a Landau number greater than n. The generator uses the first partition for which Landau number is above n. As shown below, the generator and the template in step 1230 can be defined in code. Also shown below are examples of function calls and the output generated by the function calls.

Example

"landau function" 42
(60, [3, 4, 5])
"landau function" 100
(105, [3, 5, 7])
⊥Generator 100
[[0, 1, 2], [3, 4, 5, 6, 7], [8, 9, 10, 11, 12, 13, 14]]

In step 106, the successor and predecessor operators are determined for a permutation in cyclic form. The successor operators for a permutation in cyclic form can be represented as a right rotation. Similarly, the predecessor operators for a permutation in cyclic form can be represented as a left rotation.

In step 107, the transformations between natural numbers and permutations are determined in cyclic form.

As shown below, the successor and predecessor operators in step 106 as well as the transformations between natural numbers and permutations in step 107 can be defined in code for example. Also shown below are examples of function calls and the output generated by the function calls.

Example generator
[[0, 1, 2], [3, 4, 5, 6, 7], [8, 9, 10, 11, 12, 13, 14, 15]]
"right operator" generator
[[1, 2, 0], [4, 5, 6, 7, 3], [9, 10, 11, 12, 13, 14, 15, 8]]
"left operator" it
[[0, 1, 2], [3, 4, 5, 6, 7], [8, 9, 10, 11, 12, 13, 14, 15]]
"Quatnton Add" ("number to permutation cycle" 10)
    ("number to permutation cycle" 20)
[[0, 1, 2], [3, 4, 5, 6, 7], [14, 15, 8, 9, 10, 11, 12, 13]]
"permutation cycle to number" it
30

Also included in the Haskell code above is the definition of successor arithmetic.

In step 108, the orbit for permutations in cyclic form are calculated using the successor operator. As shown below, the orbits in step 108 can be defined in code. Also shown below are examples of function calls and the output generated by the function calls.

Example mapM_print "Landau Orbit function"
[[0, 1, 2], [3, 4, 5, 6, 7], [8, 9, 10, 11, 12, 13, 14, 15]]
[[1, 2, 0], [4, 5, 6, 7, 3], [9, 10, 11, 12, 13, 14, 15, 8]]
. . .
[[1, 2, 0], [6, 7, 3, 4, 5], [14, 15, 8, 9, 10, 11, 12, 13]]
[[2, 0, 1], [7, 3, 4, 5, 6], [15, 8, 9, 10, 11, 12, 13, 14]]

Finally, in step 109, computations are performed in the cyclic subgroup of the Symmetric Group $S_n$ using classic computations and modular arithmetic or using permutation operations on a quantum or reversible computing framework.

Figure 20B:
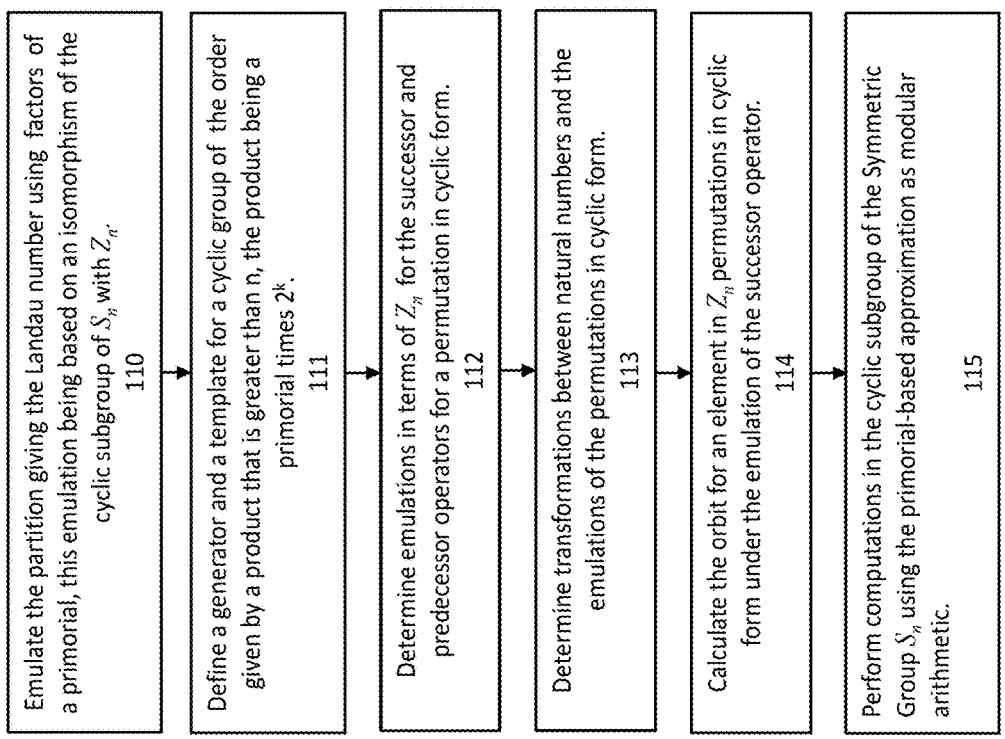
FIG. 20B illustrates another flowchart for the permutational model of computing.

FIG. 20B shows a flow chart of a method to choose a size and design of the permutations using an emulation of the symmetric group of $S_n$. The method as illustrated in FIG. 20B performs a similar function as method of FIG. 20A, except method (FIG. 20B) is faster and can be parallelized because the modular arithmetic happens independently in each subgroup of which Z, is a product.

In step 110 of method as depicted in FIG. 20B, the partitions for the dimension n of the Symmetric Group S, are emulated using factors of pirmorials. This emulation is based on an isomorphism of the cyclic subgroup of $S_n$ with $Z_n$. As stated above, cyclic groups are isomorphic with $Z_n$, which can be decomposed as a product of subgroups. These products of subgroups each have order $p_i^k$, wherein p a prime factor of n, and the subgroups can be used to emulate operations with these permutations using modular arithmetic in order to parallelize and speedup performance of these calculations.

The partitions and the primorials in steps 110 can be defined in code. Also shown below are examples of function calls and the output generated by the function calls.

Example

"partition function" 42
(60, [3, 4, 5])
"partition function" 100
(120, [3, 5, 8])

The function "partition function" returns the first partition with such that a primorial times $2^k$ is above n.

Further, in step 111, a generator and a template are defined for the emulation of the cyclic group. The generator and a template are for a cyclic group of the order given by a product that is greater than n, the product being a primorial times $2^k$. As shown below, the generator and the template in step 111 can be defined in code. Also shown below are examples of function calls and the output generated by the function calls.

Example

"primorial Generator" 100
[[0, 1, 2], [3, 4, 5, 6, 7], [8, 9, 10, 11, 12, 13, 14, 15]]

In step 112, the successor (z) and predecessor (z') operators are determined for an emulation of a permutation in cyclic form. For example, each rotation of the cycles of a permutation can be mapped to a corresponding modular addition by 1 in these subgroups. In the Haskell code below, the function z implements successor and the function z' implements predecessor.

In step 113, the transformations between natural numbers and emulations of the permutations are determined in cyclic form.

As shown below, the successor and predecessor operators in step 112 and the transformations between natural numbers and emulations of the permutations in step 113 can be defined in code. Also shown below are examples of function calls and the output generated by the function calls.

Example z [0, 0, 0]
[1, 1, 1]
z it
[2, 2, 2]
z it
[0, 3, 3]
z' it
[2, 2, 2]
z' it
[1, 1, 1]
z' it
[0, 0, 0]
mapM_print (map n2zs [0 . . . 7])
[0, 0, 0]
[1, 1, 1]
[2, 2, 2]
[0, 3, 3]
[1, 4, 4]
[2, 0, 5]
[0, 1, 6]
[1, 2, 7]
map (zs2n.n2zs) [0 . . . 7]
[0, 1, 2, 3, 4, 5, 6, 7]

In step 114, the orbit for permutations in cyclic form are calculated using the successor operator. As shown below, the orbits in step 108 (FIG. 20A) can be defined in code. Also shown below are examples of function calls and the output generated by the function calls.

Example

"Primorial Orbit"
[[0, 0, 0], [1, 1, 1], . . . , [1, 3, 6], [2, 4, 7]]

Finally, in step 115, computations are performed in the cyclic subgroup of the Symmetric Group $S_n$ using the primorial-based approximation as modular arithmetic.

The above methods of determining the permutations each perform functions of determining the operational semantics of transforming permutations to ensure that the transforming permutations are bijective and reversible. However, an open question exists as to whether a faster conversion mechanism can be realized, rather than the above described methods that rely on successor and predecessor functions. The answer is yes, and the faster conversion mechanism cam be realized using the Chinese Reminder Theorem, which allows us to recover a number form the residues efficiently, as shown in method of FIG. 20C. Thus, fast conversion to a list of modular remainders can be achieved by recovering a natural number from the residues.

Figure 20C:
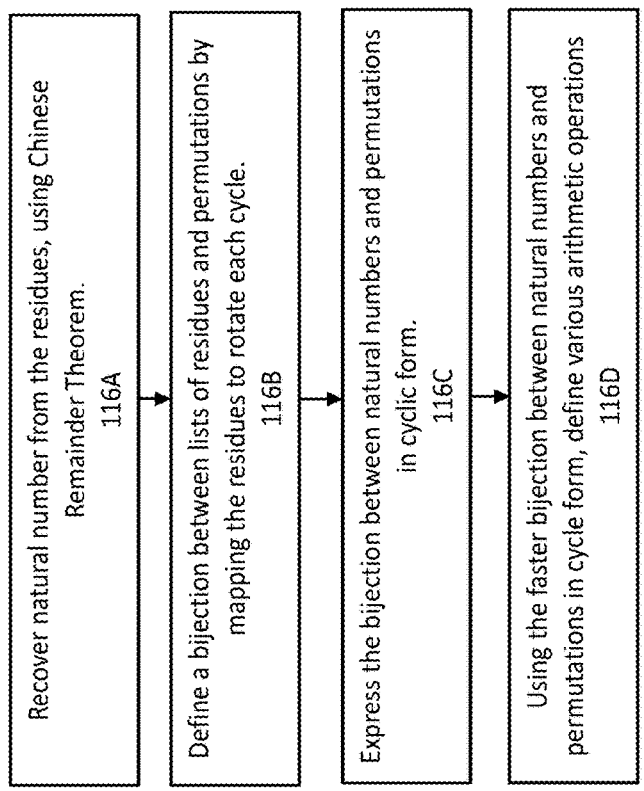
FIG. 20C illustrates another flowchart for the permutational model of computing.

Referring to FIG. 20C, in step 116A, natural numbers are recovered from the residues using the Chinese Reminder Theorem. As shown below, the fast conversion functions can be defined in code. Also shown below are examples of function calls and the output generated by the function calls. Note that, the inverse n2zs' finds a list of residues simply by applying the mod function to each of the elements of the primorial factors (or the Landau-number equivalent).

Example mapM_print (map "number to primorial based permutation" [0 . . . 7])
[0, 0, 0]
[1, 1, 1]
[2, 2, 2]
[0, 3, 3]
[1, 4, 4]
[2, 0, 5]
[0, 1, 6]
[1, 2, 7]
map ("primorial based permutation to number". "number to primorial based permutation") [0 . . . 7]
[0, 1, 2, 3, 4, 5, 6, 7]

Additionally, an extended gcd-based algorithm for Chinese Remainder Theorem can be expressed in code.

In step 116B, a bijection is defined between lists of residues and permutations by mapping the residues to rotate each cycle. The bijective mappings of the above functions can be extended to the actual permutations in cyclic form. To achieve this, a bijection is defined between lists of residues and permutations by mapping the residues to rotate each cycle. As shown below, this can be defined in code, wherein the function zs2cp generates the cyclic permutation corresponding to a list of residues, and the inverse function zs2cp generates the list of residues corresponding to a cyclic permutation. Note that an assumption is made that the permutations are in a canonical form with cycles, each represented as a rotation of a slice [from . . . to] . . . . Also shown below are examples of function calls and the output generated by the function calls.

Example map ("primorial based permutation to number". "number to primorial based permutation") [0 . . . 7]
[0, 1, 2, 3, 4, 5, 6, 7]
zs2cp [0, 0, 0]
[[0, 1, 2], [3, 4, 5, 6, 7], [8, 9, 10, 11, 12, 13, 14, 15]]
s it
[[1, 2, 0], [4, 5, 6, 7, 3], [9, 10, 11, 12, 13, 14, 15, 8]]
cp2zs it
[1, 1, 1]
z it
[2, 2, 2]
zs2cp it
[[2, 0, 1], [5, 6, 7, 3, 4], [10, 11, 12, 13, 14, 15, 8, 9]]

In step 116C, a bijection is defined. Having made the above definitions, one can now express the bijection between natural numbers and permutations in cyclic form. As shown below, the bijection between natural numbers and permutations in cycle form can be defined in code. Also shown below are examples of function calls and the output generated by the function calls.

Example

"number to permutation in cycle form" 0
[[0, 1, 2], [3, 4, 5, 6, 7], [8, 9, 10, 11, 12, 13, 14, 15]]
"permutation in cycle form to number" it
0
"number to permutation in cycle form" 42
[[0, 1, 2], [5, 6, 7, 3, 4], [10, 11, 12, 13, 14, 15, 8, 9]]

"permutation in cycle form to number" it
42

In step 116D, the faster bijection described above is applied to defining various arithmetic operations. Using the faster bijection between natural numbers and permutations in cycle form, various arithmetic operations can be defined and performed efficiently on permutations in cycle form. These arithmetic operations can include, for example, the addition and multiplication operations. As shown below, these arithmetic operations can be defined in code. Also shown below are examples of function calls and the output generated by the function calls. First, a higher order function zsOp can be defined. The higher order function can then be specialized for each arithmetic operation. For example, addition and multiplication operations can be defined in Haskell code.

Example

"number to permutation based primorials" 42
[0, 2, 2]
"number to permutation based primorials" 8
[2, 3, 0]
zsAdd [0, 2, 2] [2, 3, 0]
[2, 0, 2]
"permutation based primorials to number" it
50

Then these operations can be applied from the isomorphic residue list, to work on permutations in cycle form as shown in Haskell code.

Example

"number to permutation in cycle form" 11
[[2, 0, 1], [4, 5, 6, 7, 3], [11, 12, 13, 14, 15, 8, 9, 10]]
n2cp 7
[[1, 2, 0], [5, 6, 7, 3, 4], [15, 8, 9, 10, 11, 12, 13, 14]]
cpMul [[2, 0, 1], [4, 5, 6, 7, 3], [11, 12, 13, 14, 15, 8, 9, 10]]
[[1, 2, 0], [5, 6, 7, 3, 4], [15, 8, 9, 10, 11, 12, 13, 14]]
[[2, 0, 1], [5, 6, 7, 3, 4], [13, 14, 15, 8, 9, 10, 11, 12]]
"permutation in cycle form to number" it
77

Figure 20D:
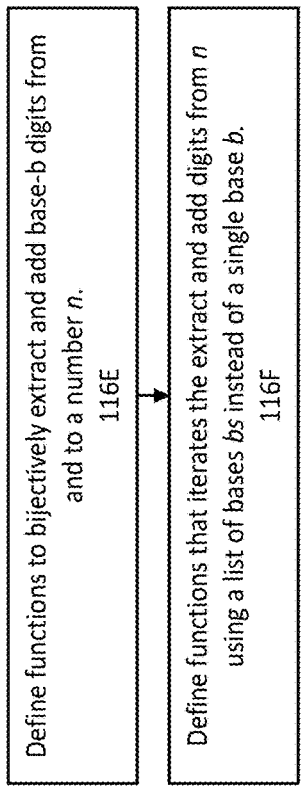
FIG. 20D illustrates another flowchart for the permutational model of computing.

As an alternative to the above method for bijective mapping between natural numbers and permutations in cycle form, another method can be used that generates lexicographically ordered representation. For example, a converter to a lexicographically ordered representation can be defined, such that the converter enumerates residues in reverse lexicographic order, as shown in method of FIG. 20D.

In step 116E, to achieve the result of method, a function is defined that extracts one bijective base-b digit form a number n. Thus, the "get base number digit" function achieves the effective result of reducing the information stored in n by the information consumed for making a choice of a digit between 0 and b−1. Relatedly, step 116E also defines a function "put base number digit" that achieves the result of adding to m the information stored in a digit b from 0 to b−1. As shown below, the functions of step 1410 can be defined in code.

In step 116F, a function to Base List is defined that iterates the extraction of digits from n using a list of bases bs instead of a single base b. The function to Base List also increments n with the number skip of the lists of digits shorter than the very last one, to ensure that exactly the "vectors" of length matching the length of bs are extracted. Additionally in step 116F a complementary function to to Base List is defined.

This function can be referred to as from Base List, and the function from Base List reverses the above described process by converting the list of digits "number list" all assumed bounded by the bases in bs into a single natural number n.

For a given base list, the two functions of step 116F define a bijection to tuples of the same length as the list and with elements between 0 and $b_i-1$ for each element b, of the base list. Further, these functions enumerate the element tuples in lexicographic order (with rightmost digit most significant) and that this if different from the order induced by applying the successor repeatedly, which, on the other hand, matches the fast conversion provided by the Chinese Reminder Theorem.

As shown below, the functions of step 116F can be defined in code. Also shown below are examples of function calls and the output generated by the function calls.

Example mapM_print (map (to Base List (snd "cyclal permutation Template")) [0 . . . 7])
[0, 0, 0]
[1, 0, 0]
[2, 0, 0]
[0, 1, 0]
[1, 1, 0]
[2, 1, 0]
[0, 2, 0]
[1, 2, 0]

Procedure for Embedding Permutations into Quantons as Minimal Orbitopes

The permutation orbitope of transition relationships between permutation as per TABLE 6 (see earlier) requires, for data of size n a number of data points factorial in the size of n. In order to improve the efficiency of memory requirements, the Birkhoff polytope is can be used which reduces the number of data points to $n^2$ variables and constraints, but this is still significantly more than the n variables one could use to represent a permutation as a vector or in the cycle forms shown in the present disclosure.

However, by combing the recent teachings of Michel X. Goemans, "Smallest compact formulation for the permutahedron", Mathematical Programming, October 2015, Volume 153, Issue 1, pp 5-11, Springer Publishing, we combine our use of the Fibonacci lattice and the teachings based on Goemans in C. H. Lim and S. Wright, Beyond the Birkhoff polytope: "Convex relaxations for vector permutation problems", in Advances in Neural Information Processing Systems, Vol. 27, MIT Press, Cambridge, Mass., 2014, pp. 2168-2176, in order to produce a reduced representation. The representation of the present disclosure is further reduced and compressed by utilizing the mapping between the Fibonacci lattice, and its indices to the Lehmer code representing permutations so that that where only n·log(n) permutation vectors represent the permutahedron in the work of Goemans and Lim et al, with the embedding, on n points are required. Accordingly, this forms the minimal representation of the embedding of permutations as a Quanton. This is a significantly more efficient and reduced memory representation for representing permutations as indices in the Fibonacci lattice and their equivalence to the permutahedron as the preferred embodiment. However, given the Fibonacci mapping, a few points of review are in order based on the sorting networks because their connection to permutations may not be immediately obvious and hence their use in representations of data and reversible circuit emulation.

FIG. 21: Bitonic Sorting Network Polynomial Constraints and Implementation Any sorting network, item 117, given n inputs with m comparators as per Goeman's and represent the permutahedron with complexity of O(m) variables and constraints based on, item 118, using the set of constraints for each comparator k=1, 2, 3 . . . m to indicate the relationships between the two inputs and the two outputs of each comparator, where the operation is illustrated in item 119.

Figure 22:
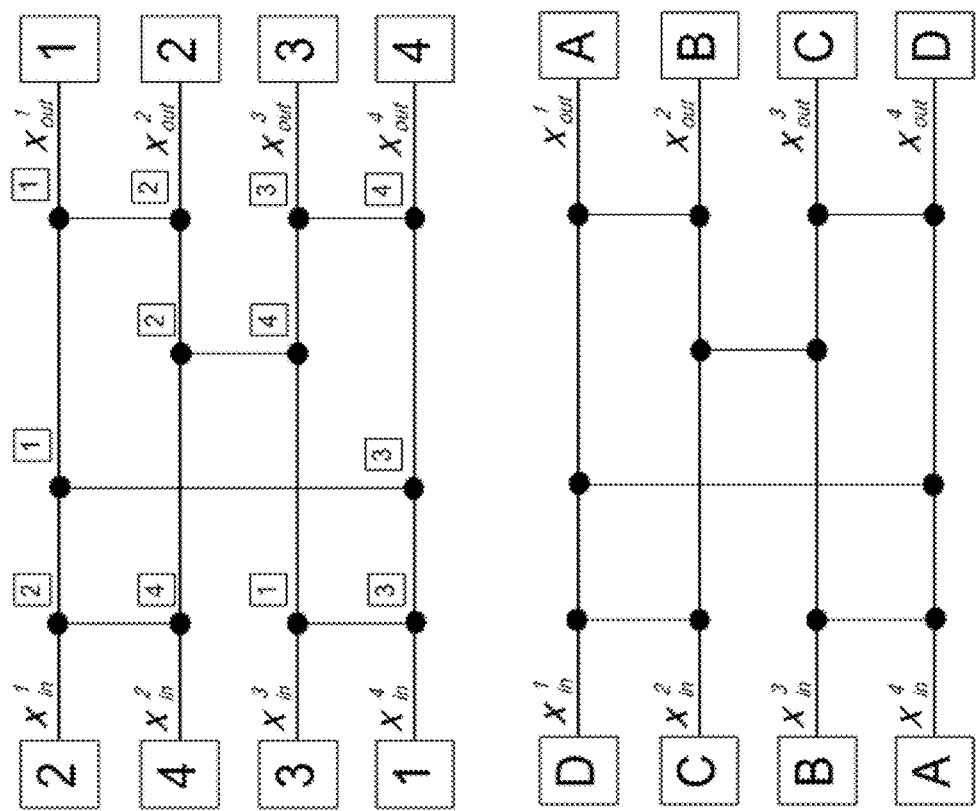
FIG. 22 illustrates an example of a Bitonic sorting network operation and design.

FIG. 22: Bitonic Sorting Network Operation and Design The general relationship can be seen as a permutation between the inputs and outputs as shown in item 120, and in the general case, when the comparator directions can themselves be permuted, these can represent the straightforward sorting network or any general permutation between inputs and outputs, shown in item 121.

Figure 23:
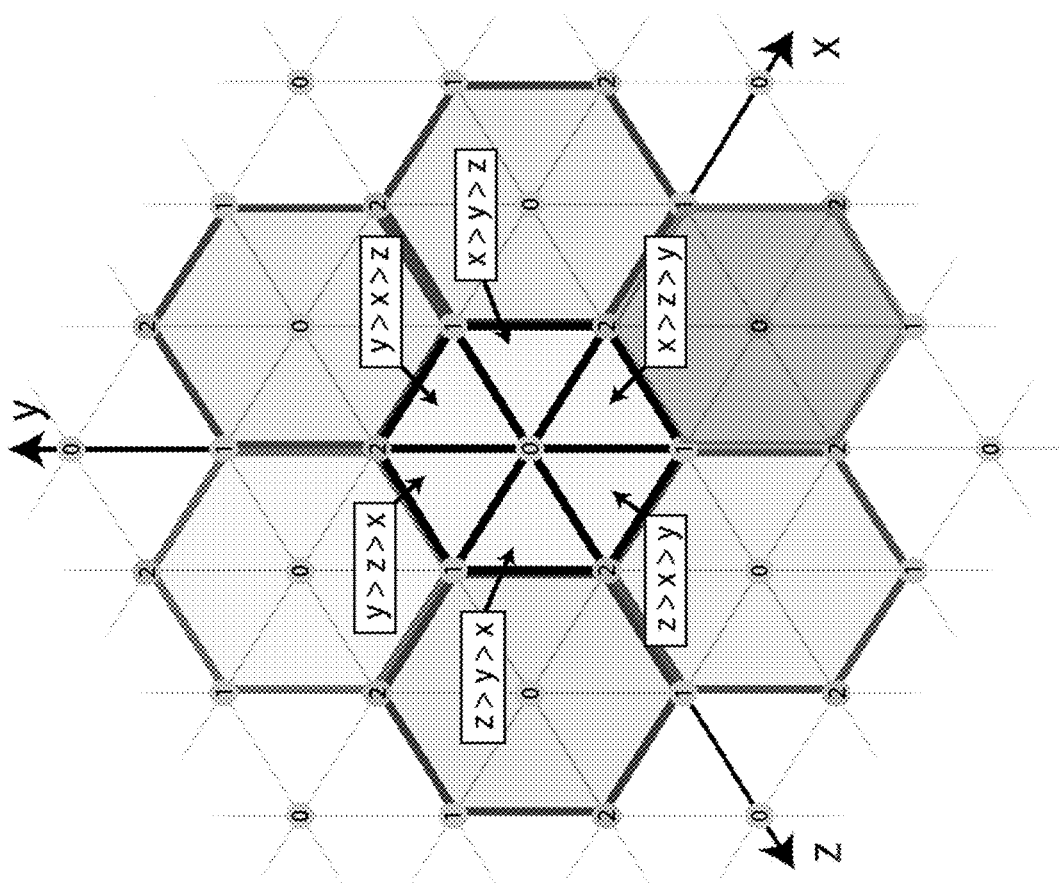
FIG. 23 illustrates a Bitonic sorting network operation as a polytope design.

FIG. 23: Bitonic Sorting Network Operation as a Polytope Design

By further generalizing from a comparator viewpoint and taking the viewpoint of arbitrary dimension, the concept is extended to the sorting orbitope in $S^N$ shown in item 122. Such comparator operators can be reversibly implemented as indicated in the teachings of P. S. Phaneendra, C. Vudadha, V. Sreehari and M. B. Srinivas, "An Optimized Design of Reversible Quantum Comparator," 2014, 27th International Conference on VLSI Design and 2014, 13th International Conference on Embedded Systems, Mumbai, 2014, pp. 557-562.

Figure 24:
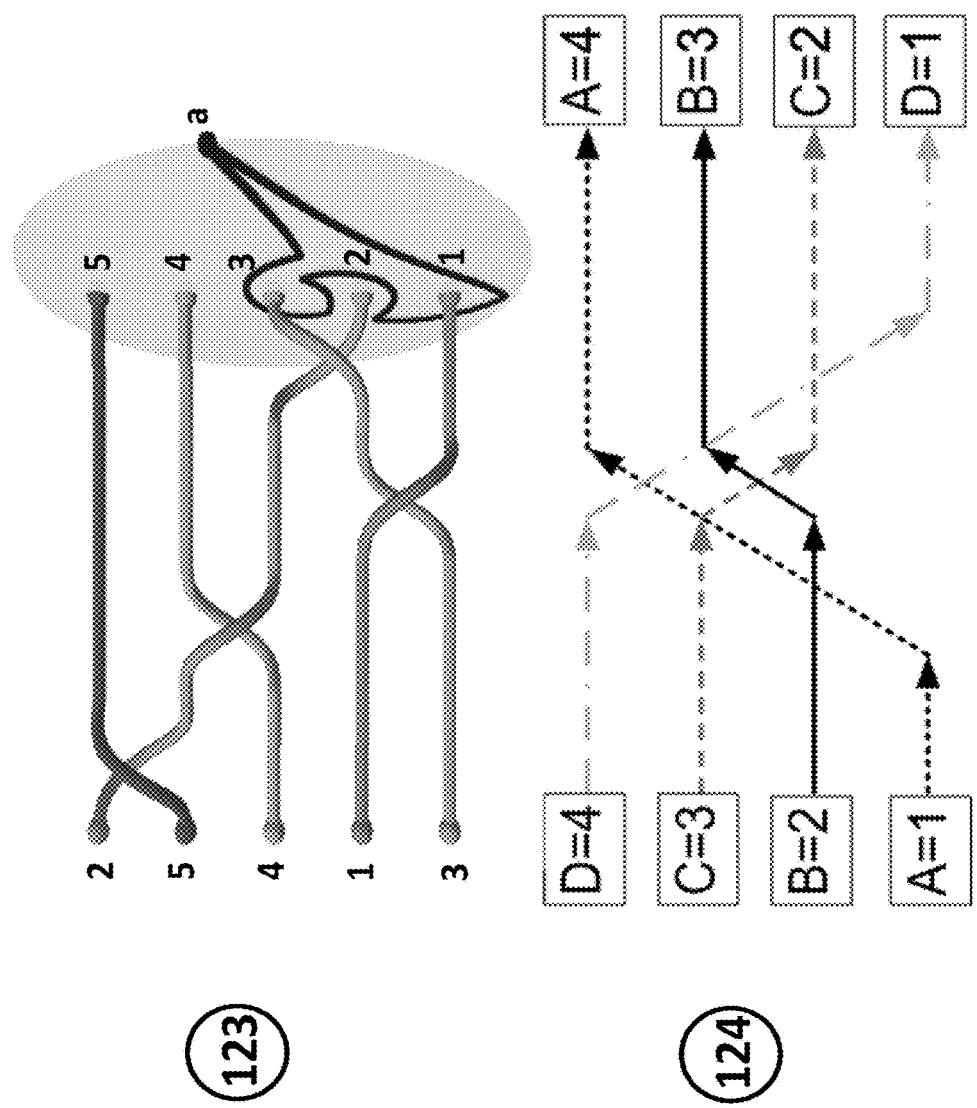
FIG. 24 illustrates an example of Braidings acting as a sorting network.

FIG. 24 illustrates Braidings seen via Bitonic Sorting Network. According to one embodiment, the relationship between permutational quantum computing, as indicated by the teaching of Stephen Jordan referred to earlier in the present disclosure, is shown in terms of the operation of braiding, item 123, which is equivalent the permutation operation, item 124. These are, therefore, directly equivalent to the sorting orbitope design of FIG. 22 item 122 for which reversible computation has been already presented herein.

Figure 25:
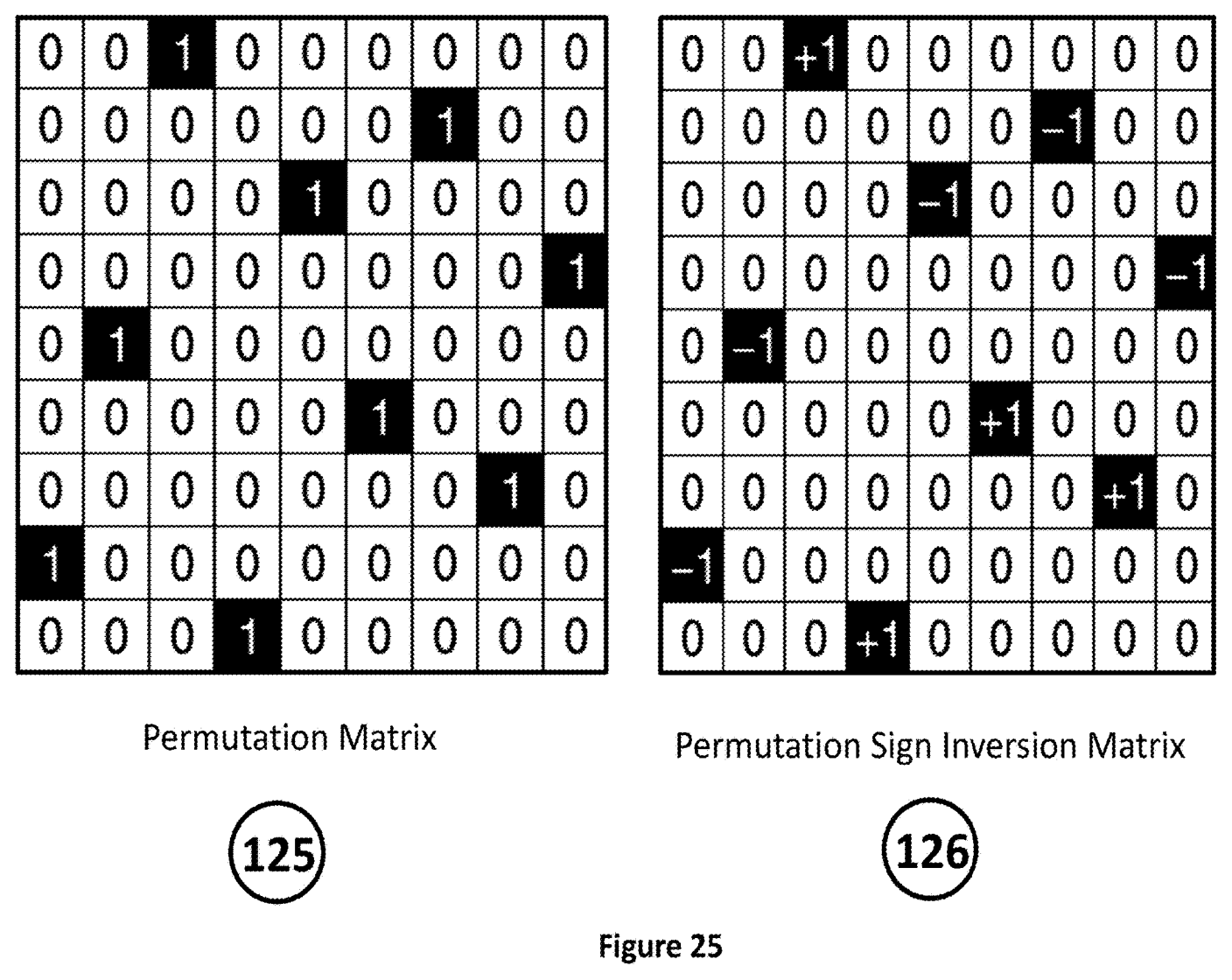

FIG. 25: Permutation Matrix and Permutation Sign Inversion Matrix

The additional properties of the Quanton are that values can range from negative to positive and that the permutation cycle representation can be viewed in terms of its representation as a permutation matrix, item 125, and that permutations on the Quanton have the additional property that they can change the signs of the inputs, illustrate in item 126, that they operate on.

Figure 26:
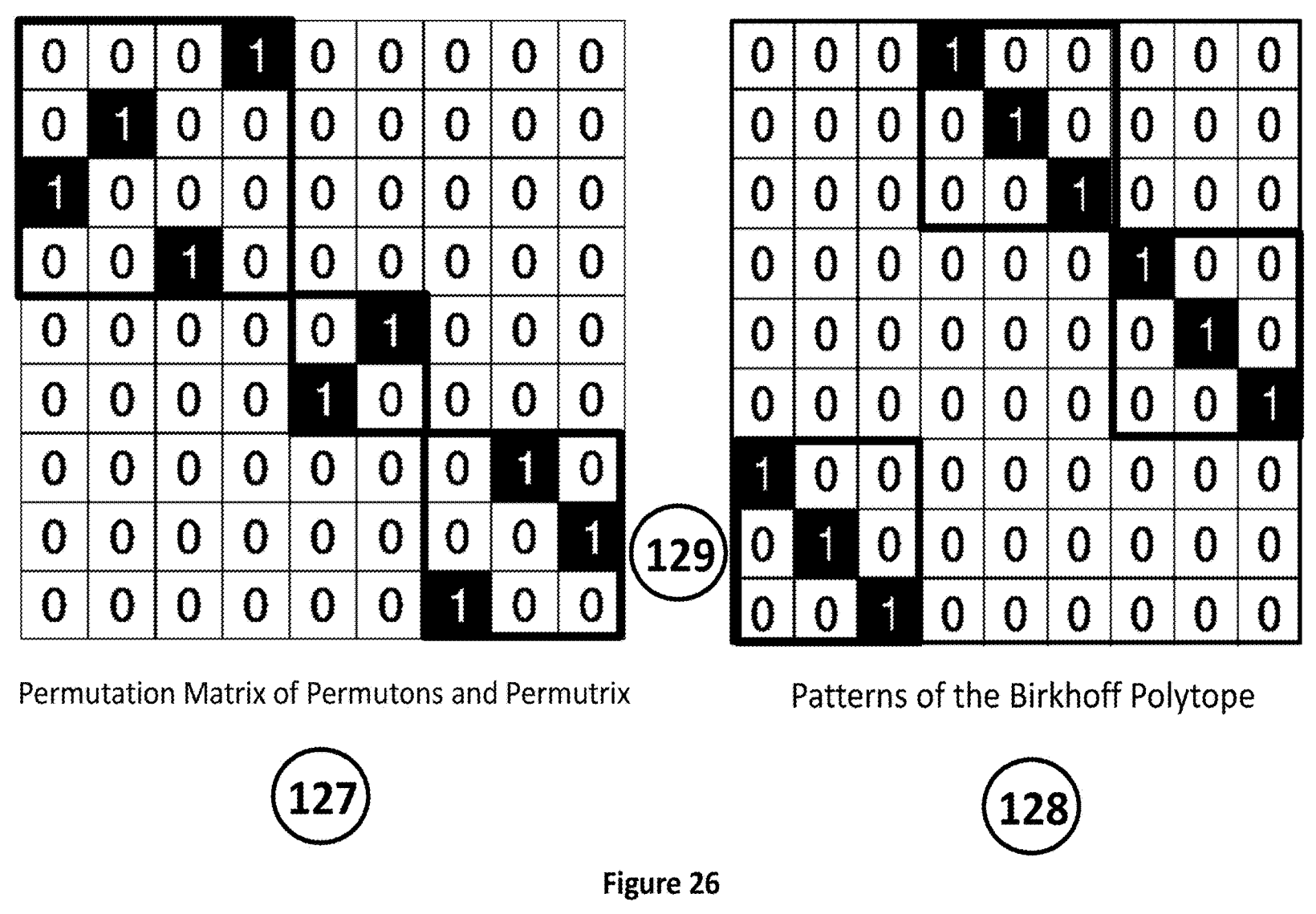

FIG. 26: Permutations Matrix and Permutation Pattern Matrix

As stated previously, the concept of the permuton and permutrix was introduced and the purpose of items 127 and 128 is to illustrate the concept where the two different patterns in the matrices are composites of the permuton and permutrix so that pattern avoiding or pattern conserving. The blocks indicated by item 130 show how arbitrary pattern permutation operations can also be represented.

FIG. 27: Relationship Between Point and Tangent at a Point to Angular Parameters This figure shows an exemplary geometry and topology of the Quanton data structure 130 and 131. Element 134 is a tangent plane to one of the vertices 133. Element 132 illustrates a probability distribution about the point on the tangent space.

FIG. 28: Geometries of Classes of Probability Density Distributions
Regular patterns that represent reversible quantum circuits as permutation circuits are shown in item 135 whereas, for an arbitrary pattern of moves, the path shown in 136 is learned from incoming data by an iterative process using an Estimation of Distribution Algorithm (EDA). In the case of the Quanton, recording the learned path is performed using a set of curves in n-dimensions (example, splines or Bezier curves) whose control points are stored where they correspond to the point of the Fibonacci lattice.

Figure 29:
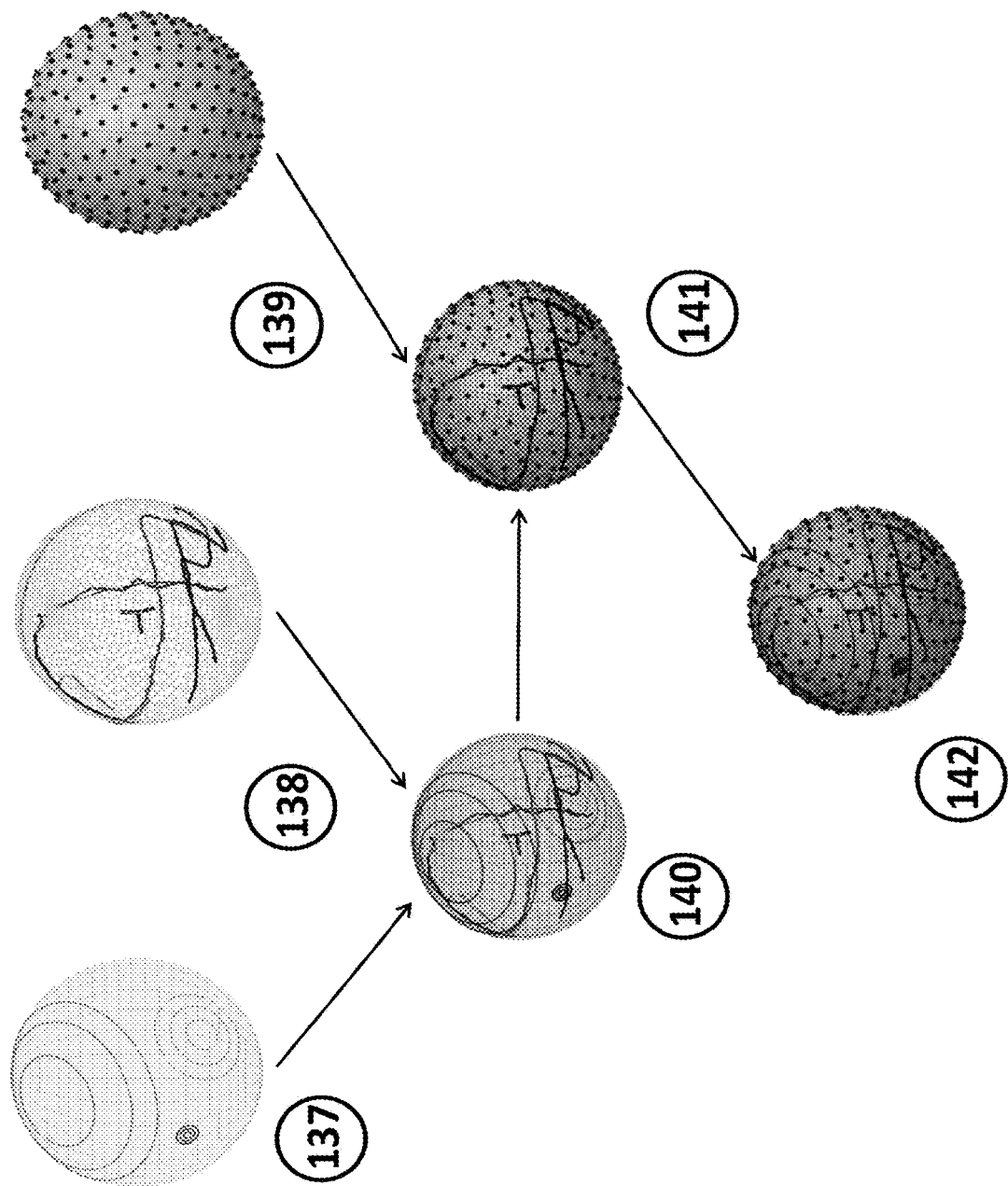
FIG. 29 illustrates example of embedding permutations onto an Orbitope with a probability density.

Now referring to FIG. 29: Embedding Permutations onto an Orbitope with Probability Density, a combination of both defined circuits, item 137 or learned paths 138, can be combined as a mixture of probabilistic density paths, 140. By embedding the Fibonacci lattice, 139, then the probabilities can be quantized and correspond to the permutations (i.e. state space at the lattice point), 141 to produce the final Quanton structure, 142.

Figure 30:
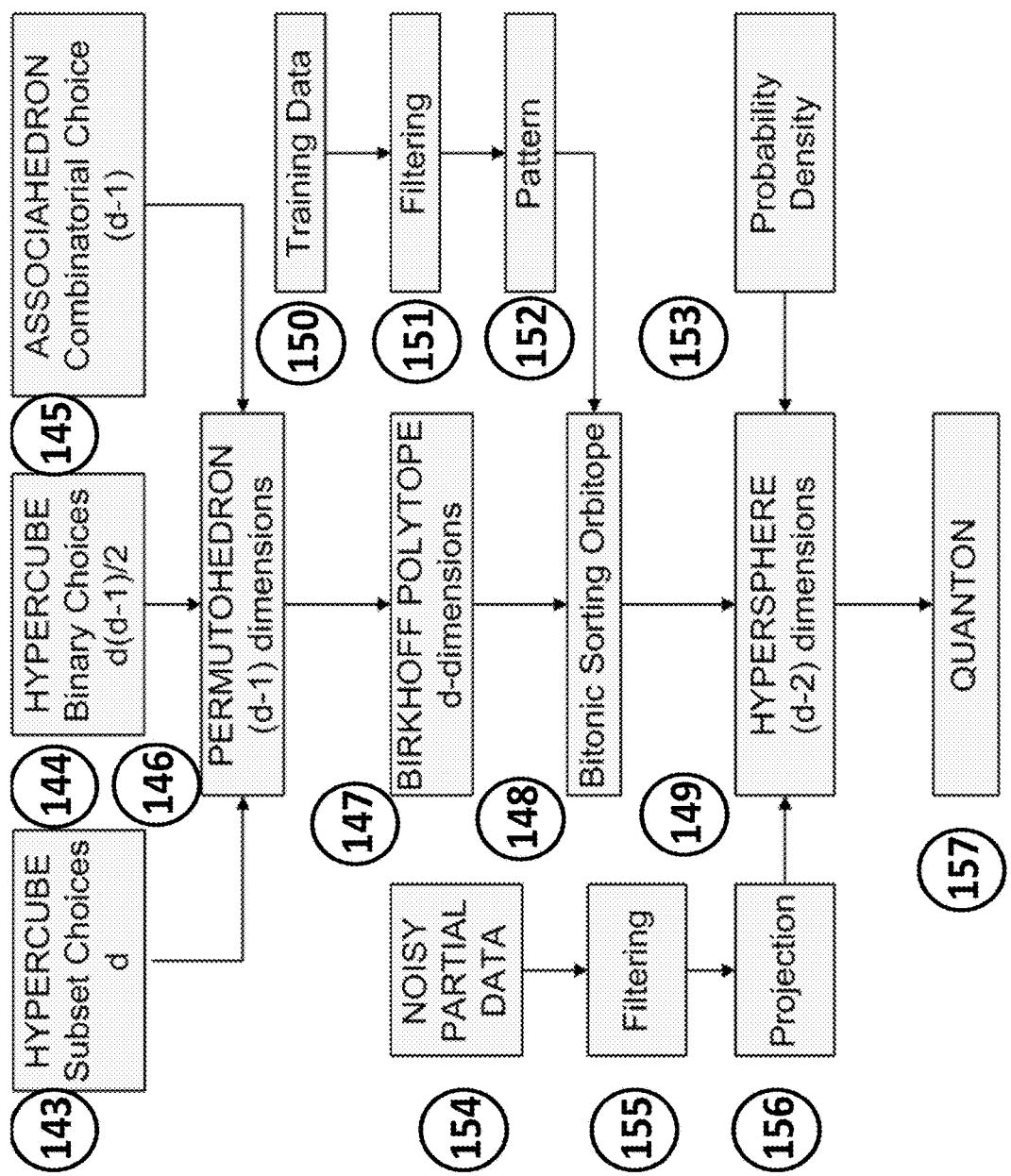
FIG. 30 illustrates a flowchart for a Quanton data structure construction for a hypersphere.

In building the Quanton structure of FIG. 29, item 142, the flowchart of FIG. 30: Flowchart for Quanton Data Structure Construction is used. In general, and following TABLE 6 as indicated earlier, hypercubes and general associahedra are represented in the reduced representation of the permutohedron in the preferred embodiment using the procedure detailed earlier herein. Therefore, choosing one of items 143 or 144 or 145, the representation of the permutohedron in item 146 is reduced to the polytope of 147 from which the sorting orbitope is generated using the method of Goemans in item 148. Finally, the embedding into the hypersphere using the Fibonacci lattice is performed in item 149 to produce the resultant Quanton structure 157. As has been detailed earlier, training data is presented in item 150 and this data is filtered, as per item 151 and quantized into patterns as per item 152 following from the detail to be presented later, in FIGS. 32, 36 and 37. A probability density function 153 is selected per TABLE 5 as defined earlier, and this is mapped to the Quanton by the process shown in FIG. 14 earlier. At this point, the Quanton has learned the distributions and can perform either deductive reasoning with the noisy data, item 154 using the filter, 155 and a projection algorithm 156 that can, if needed, adduce the missing data (if partial noisy data is presented).

Figure 31:
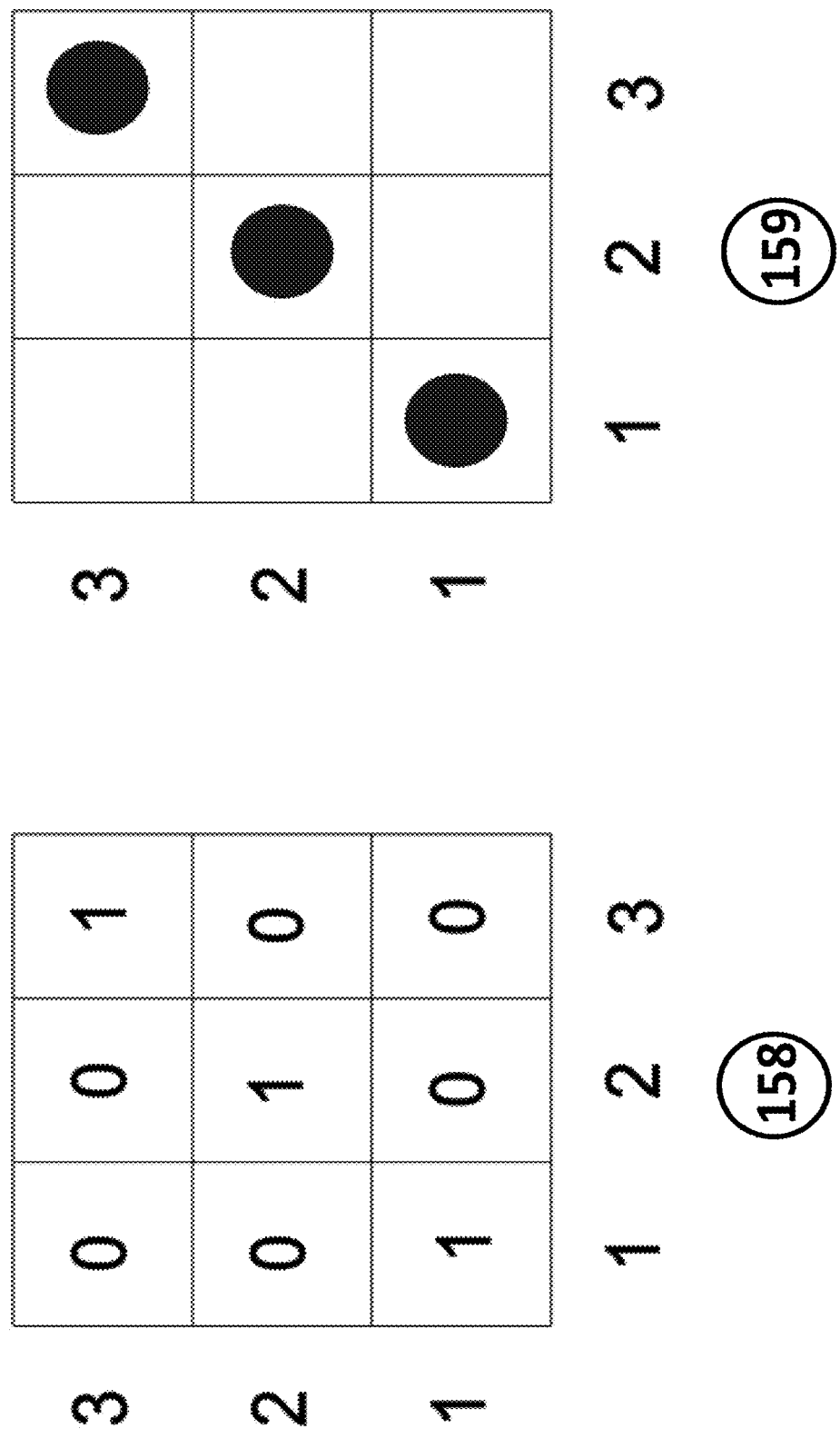
FIG. 31 illustrates a re-Interpretation of vertices of a permutation matrix Zonotope as combinatorial patterns.

In order to make clear the specification of the patterns as permutations, FIG. 31: Re-Interpretation of Vertices of Permutation Matrix Zonotope as Combinatorial Patterns illustrates how, in the case of a binary matrix, a pattern can be digitized. The equivalent for higher dimensions is a tensor instead of a matrix. For the present purposes, however, the matrix will illustrate the essential method of the present disclosure. For example, the pattern of the matrix, item 158, corresponds to a binary pattern, item 159 which could be, for example, a 3×3 set of black-and-white pixels of an image plane.

Figure 32:
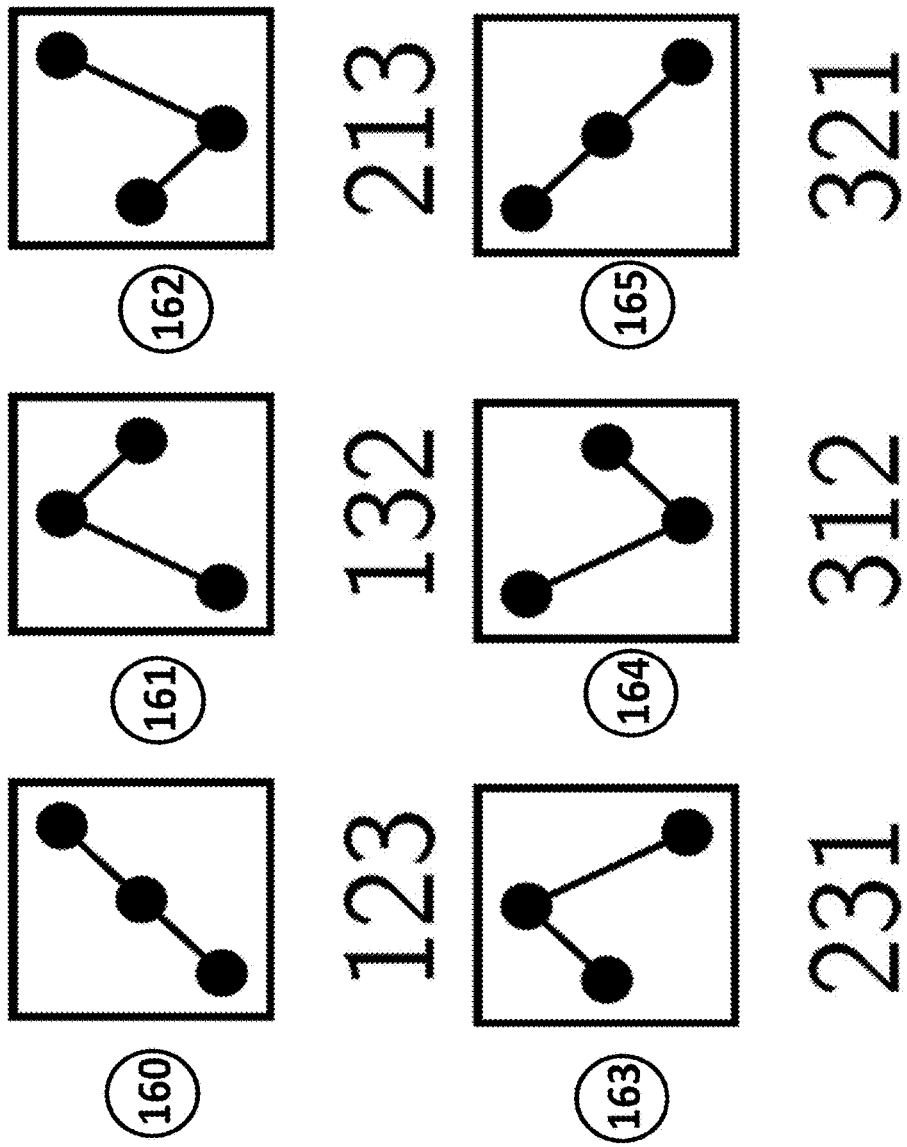
FIG. 32 illustrates an exemplary enumeration for the 3-Permutation Orbitope patterns.

The complete set of all patterns is shown in FIG. 32: Enumeration for the 3-Permutation Orbitope Patterns. To this set of patterns, each pattern is associated to the permutation vector, simply shown as integers. So for example, 164 illustrates the matrix for the permutation with corresponding integer 312 that represents permutation P=(3, 1, 2). Elements 160, 161, 162, 163 and 165 illustrate other examples.

Figure 33:
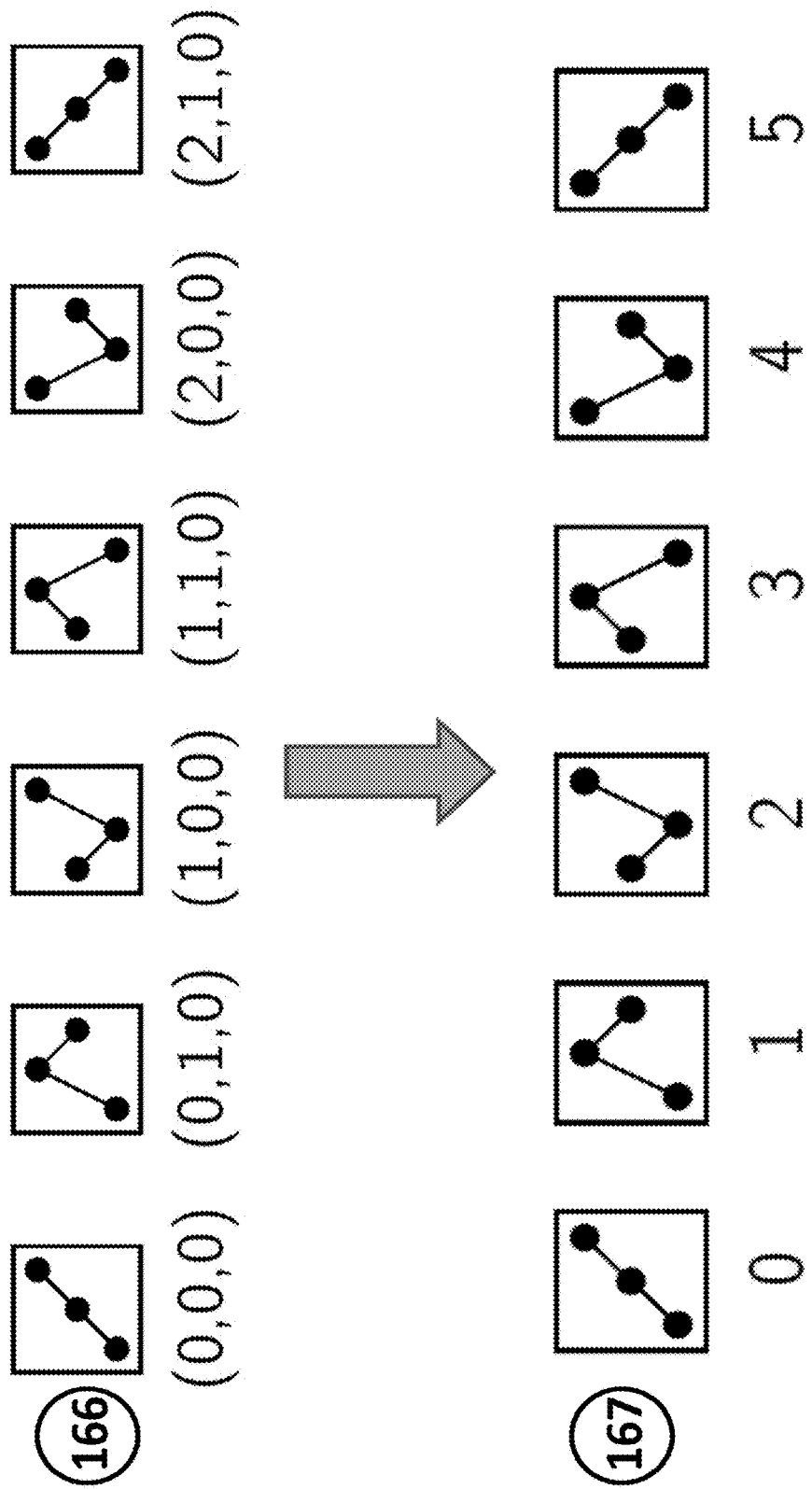
FIG. 33 illustrates encoding the 3-permutation Orbitope patterns in rank ordered indices using the Lehmer index.

Each pattern, item 166 of FIG. 33: Encoding the 3-Permutation Orbitope Patterns in Rank Ordered Indices using the Lehmer Index, is converted to the Lehmer code 167 that uses the Factoradic numbering system. Those skilled in the art are well familiar that this results in an ordering of the patterns by the Lehmer code as an index.

Figure 34:
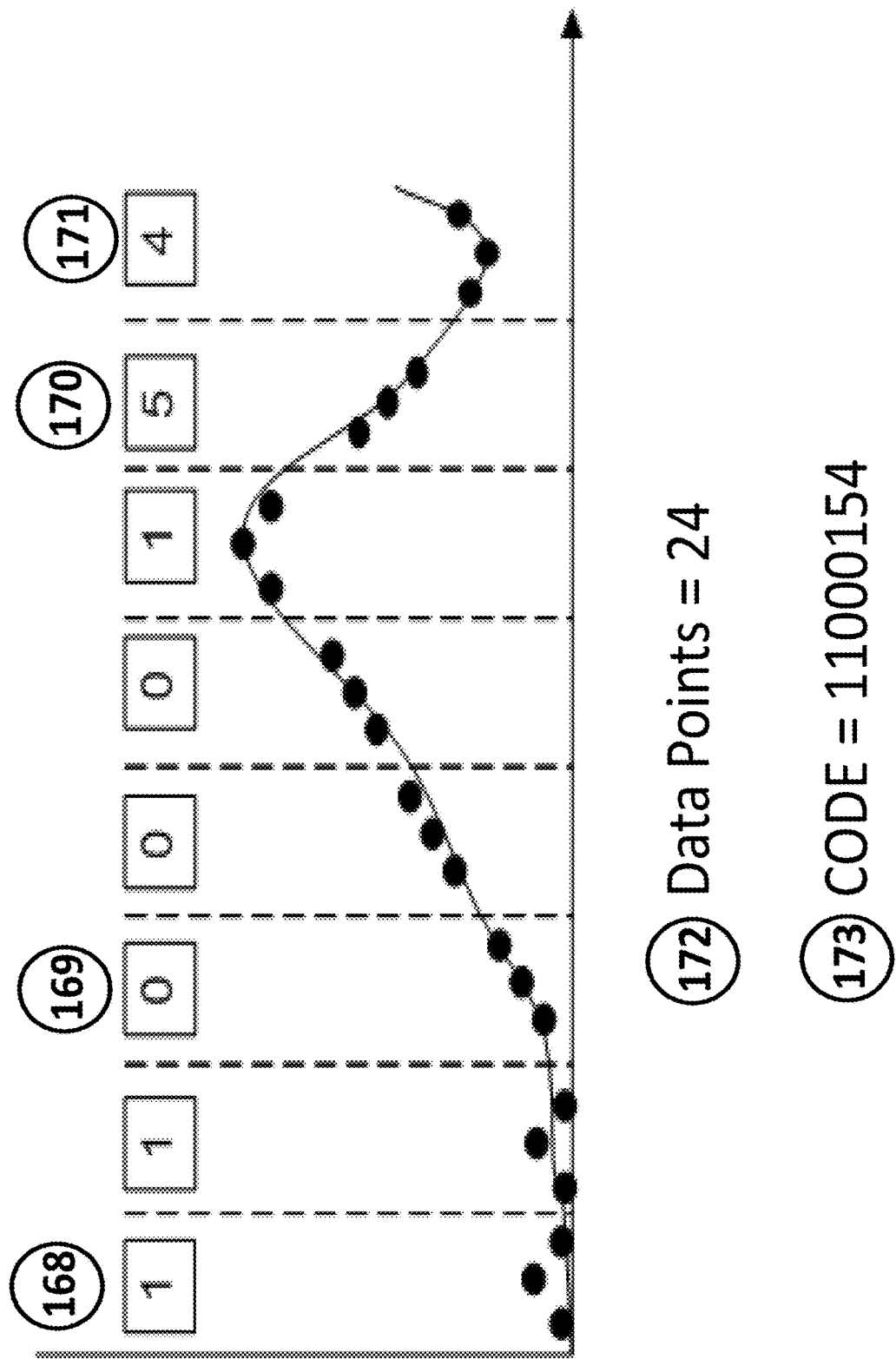
FIG. 34 illustrates digitizing a signal by pattern based sampling and showing the numerical encoding.

When sampling any input, therefore, at the resolution of the permutation chosen (i.e. in this case a 3-element permutation matrix of 6 patterns) any signal can be sampled with respect to some clock, or a logical Lamport clock to produce a sequence of ordered pattern indices as shown in FIG. 34: Digitizing a signal by Pattern Based Sampling and Showing the Numerical Encoding. The important part of FIG. 34 is to note that when patterns come in, as in items 168, 169, 170 and 171 as shown in the signal stream, that these represent the indices to the matrix patterns 172 and hence a code 173 for each pattern that best approximates the input is written. Therefore, the compression of the input signal by the number of patterns is proportionally compressed according to the size of the permutation and the sampling rate. Note the sequence of patterns could represent the sequence of transitions of binary computer registers as in a CPU instead of as pixels in a black and white screen that change over time, as in a video.

Figure 35:
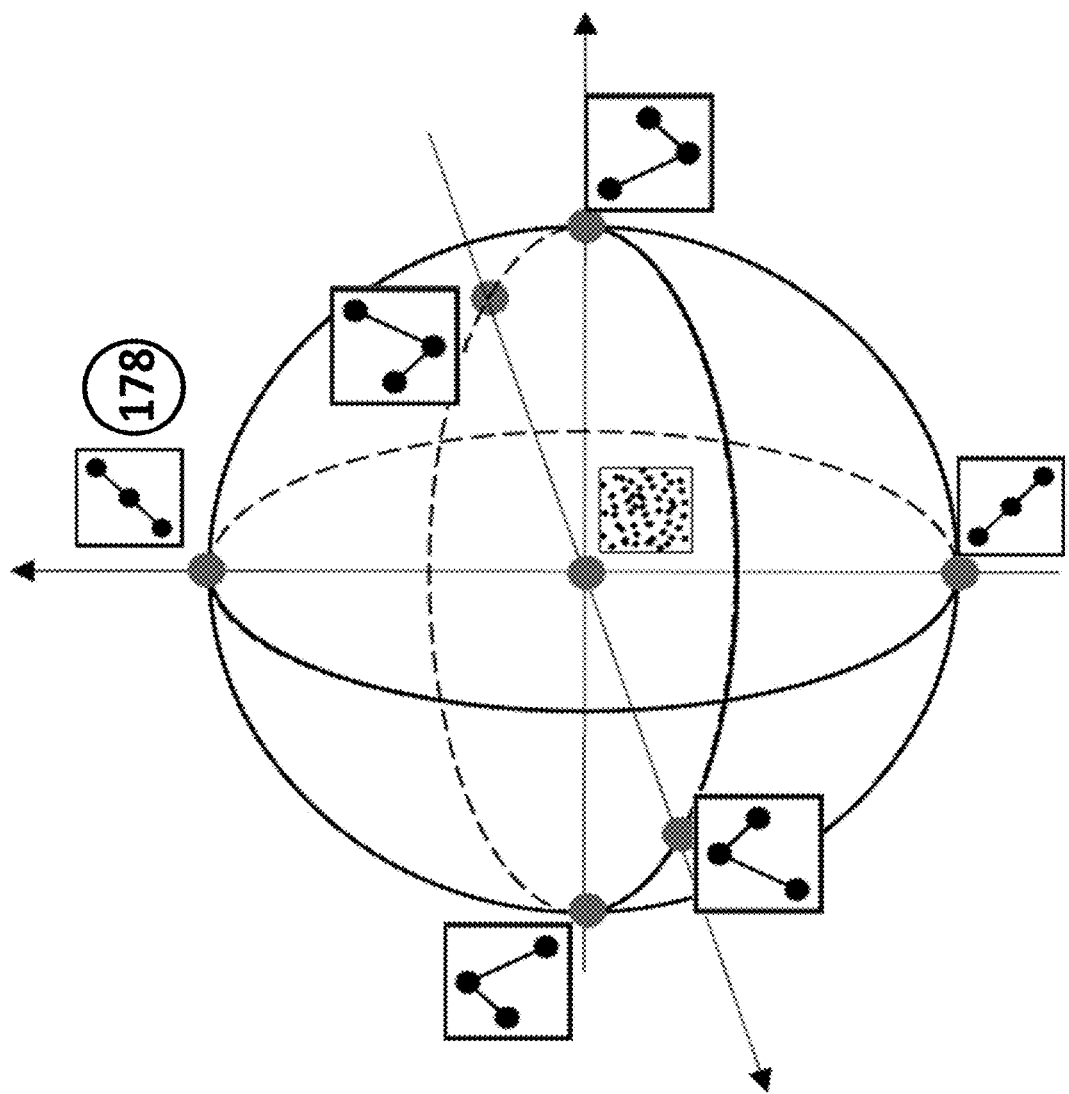
FIG. 35 illustrates patterns that are mapped to the sphere.

Aspects of the present disclosure provide for a noise function that, on the surface of the manifold, in the example a sphere in FIG. 35: Patterns Mapped to the Sphere, is zero noise at the surface but is non-zero and pure noise at the centroid of the Quanton 178. This means that measurements whose values do not exactly fall on the surface of the Quanton can be extrapolated within the threshold of noise to the nearest candidate points on the surface. In this case, the Quanton is working in a noisy data environment to produce the best nearest hypotheses to the true solution. Various noise functions can be used and are best left as user-defined choices where a simple Shepard interpolation function that varies the weighting of noise from zero at the surface to 1 at the center is used. In this way, noisy images with noisy similarities or patterns of noisy circuits can be emulated and fast candidates can be generated to produce an answer: by statistically, iterating the answer, weak signal biases are expected to select the best candidate by simply observing the frequency of success in k-trials. Finally, the noise can be accounted for by using the Estimation of Distribution Algorithm as shown later in the present disclosure is an integral part of the Quanton machine learning process.

Figure 36:
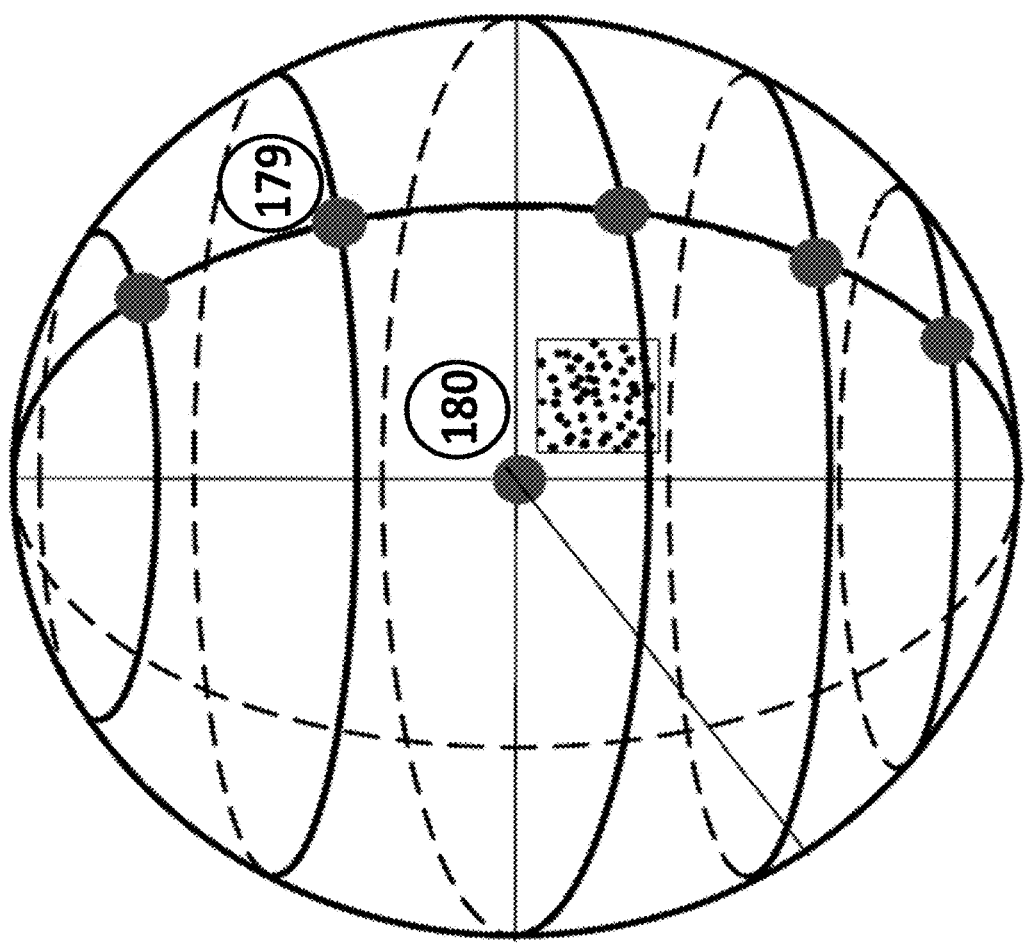
FIG. 36 illustrates that a pattern at the center of the sphere is a mixed state while the surface is pure.

FIG. 36: Pattern at the center of the Sphere is a Mixed State while the Surface is Pure is intended, for a quantum circuit, to relate the noise at the surface 179 being zero as a pure state while closer to the center 180, the state is a fully mixed state that resembles noise: in this case, the noise function is permutationally generated with some Gaussian noise injected from uncertainty measurements on the data. The procedure for choosing noise is that a statistical moment (such as variance) is chosen and added to, for example, scrambled Sobol sequences generated via permutation as per teachings of Michael Mascagni and Haohai Yu, "Scrambled Sobol Sequences via Permutation", Monte Carlo Methods and Applications. Volume 15, Issue 4, Pages 311-332, ISSN (Online) 1569-3961, ISSN (Print) 0929-9629, DOI: 10.1515/MCMA.2009.017, January 2010.

Figure 37:
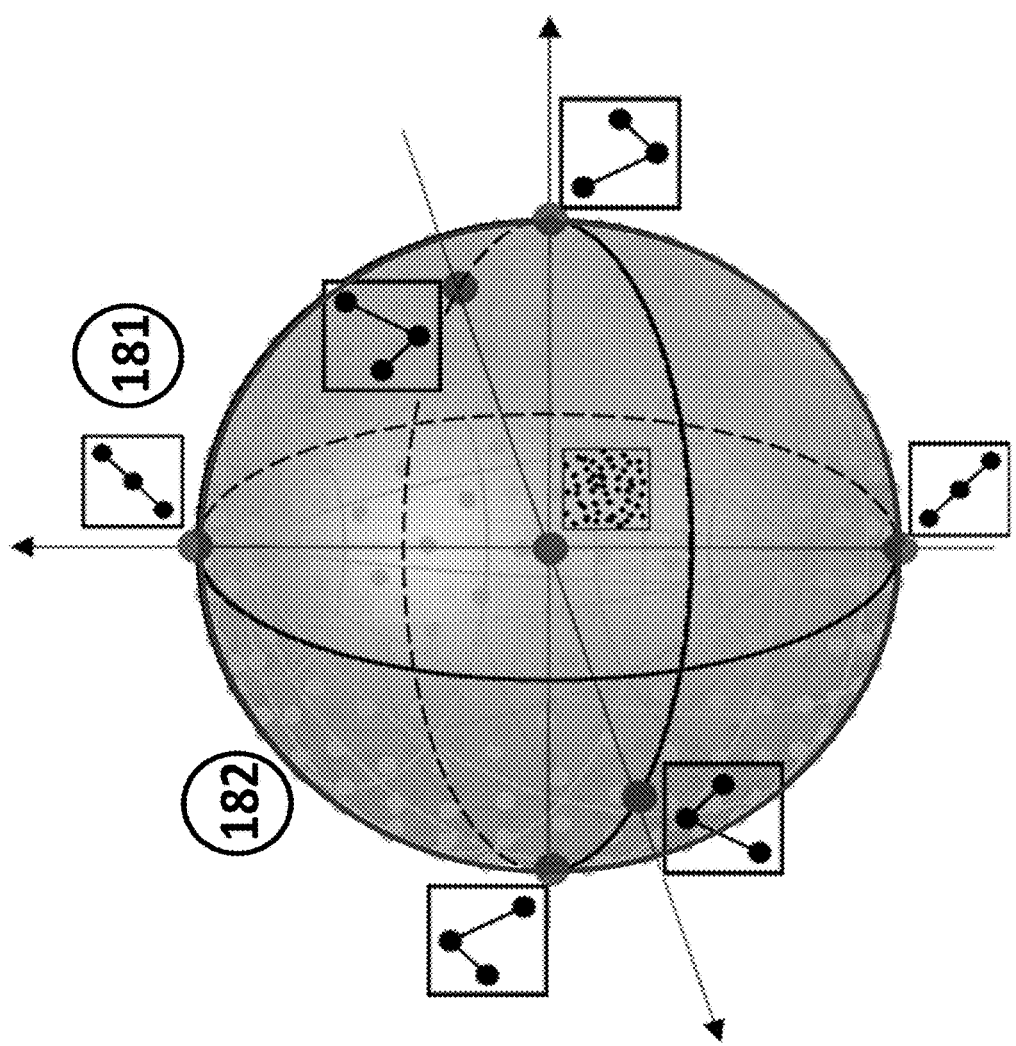
FIG. 37 illustrates an example of patterns mapped to the Quanton.

The overall situation is shown in FIG. 37: Patterns Mapped to the Quanton where the element 181 represents the pattern mapped to the surface along with the probability distribution and noise, 182, that is a Quanton.

Figure 38:
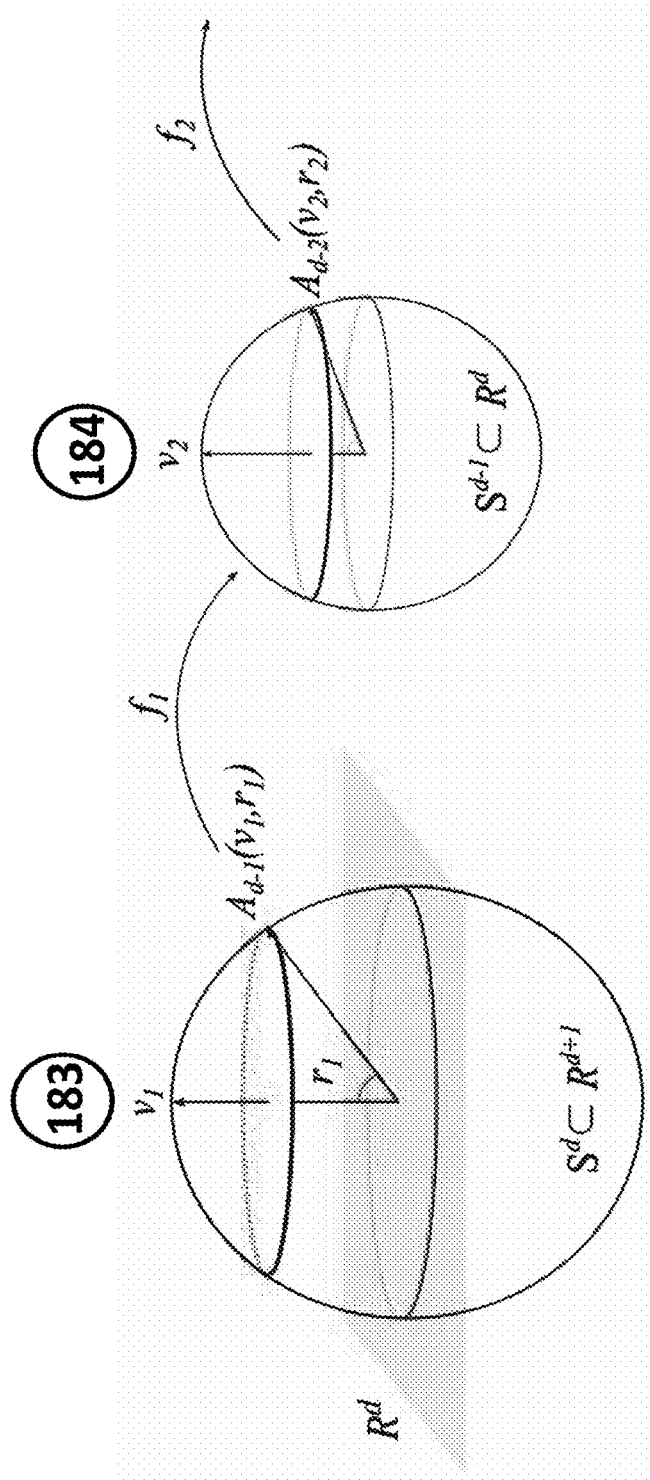
FIG. 38 illustrates a hierarchical structure of the Quanton with nested Quantons.

It is to be noted that larger permutations contain the patterns of smaller permutations and that the patterns are better associated when they separated into nested structures to provide variability in the choice of probability measures at each level of nesting. The nesting is illustrated in FIG. 38: Hierarchical Structure of the Quanton with Nested Quantons where although hyperspheres have been used for illustration, the situation also applies to any of the other choices of regular manifold (such as hypertorii). The insight and the reason for creating a hierarchy or a population of Quantons 183 and 184 is to use estimation of distribution to evolve the best solution generating Quanton. The lowest level Quanton corresponds to Quantons that are coupled to state transition functions and hence the probability density functions may be different compared to those at higher levels. A Quanton Q at generation t is noted Qn(t) and corresponds to an orbitope with a directional probability density over λ permuted states, representing Qbits (respectively Rebits). Each Quanton can therefore be viewed as a distribution of bit strings of length λ, expressed as a permutation with a probability density function distribution. In this model, which is a genetic evolutionary type of model, the Quanton is the genotype which expresses a dominant phenotype, a permutation, according to the probability density. Each Quanton, therefore, ultimately produces a binary string that represents a solution to a given input data problem.

Figure 39:
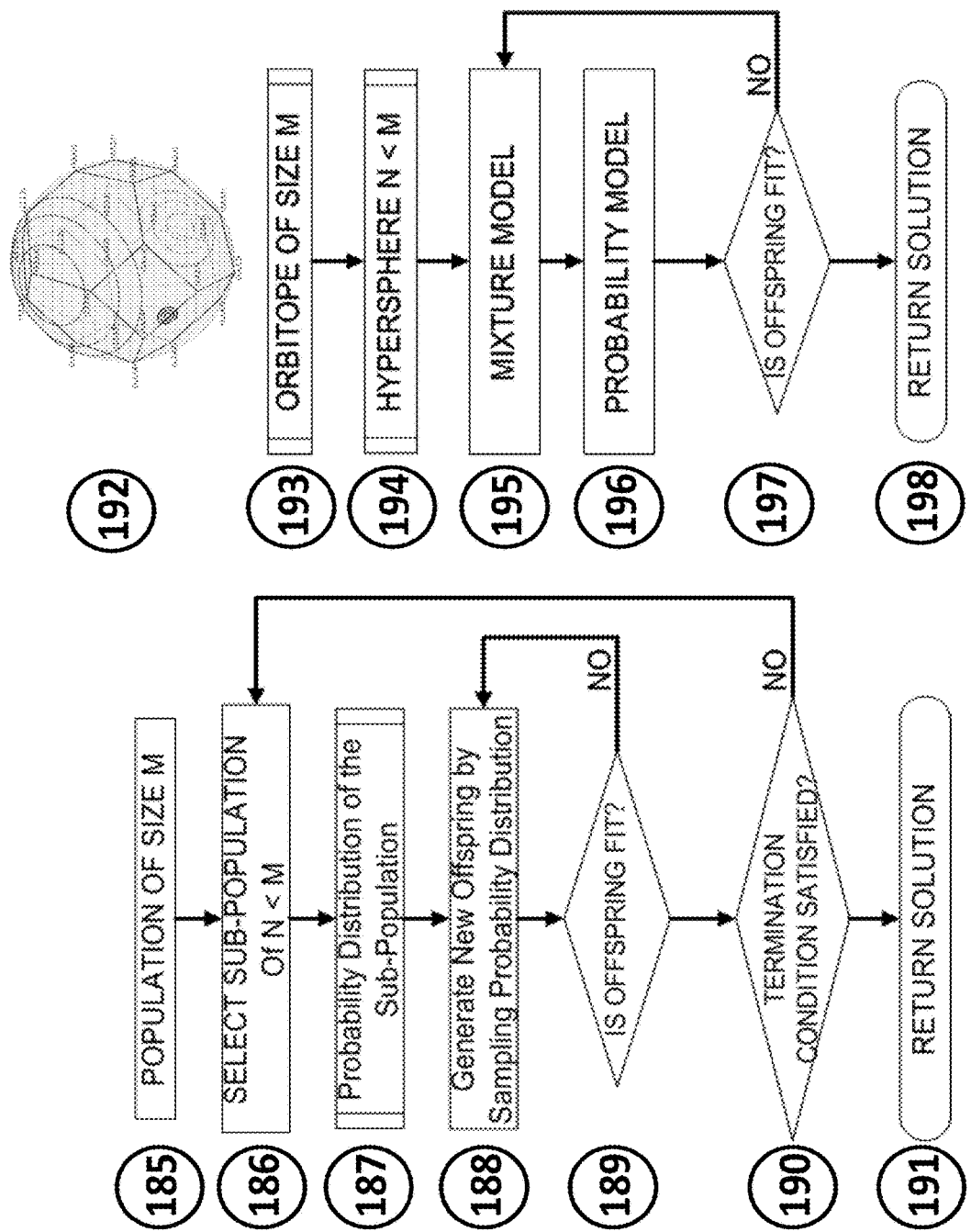
FIG. 39 illustrates an exemplary flowchart schemata for Quantons in the estimation of distribution algorithm.

FIG. 39: Estimation Distribution Algorithms Based on Quantons for Quantum-Like Computing. Given the preceding model of the Quanton, then the estimation of probability density distribution, which is a variant of the Estimation of Distribution Algorithm, is applied to adjust the Quanton in a machine learning process given input data.

Quanton populations and hierarchies correspond to quantum multisets. The Quanton populations are divided into m subsets, item 185, each containing n Quantons, item 186, per group and having the ability of synchronizing their state transition functions (i.e. by just using the exact same function and parameters). In steps 187 and 188, the Quanton estimate of distribution evolves in the following twin-coupled ways which is given first, in population evolution steps listed in items 185 through 191, called PART-A, and secondarily, at the level of the individual Quanton in steps from item 192 through 198 called PART-B: the unique aspect of this coupled evolution is that the state of the local Quanton can become entangled or correlated with the global state. The EDA algorithm proceeds as follows where PART-A and PART-B evolve in tandem.

Referring to items 185 through 191, as PART-A:
(1) A first initializing generation, is iterated to a second generation; where,
(2) Every Quanton Qn is associated to data input string, An, using the method of permutation representation presented earlier; and,
(3) This data set is used to build the initial probability distributions, item 187; then,
(4) The probability distribution is sampled, item 188; and,
(5) The values of bit strings between An and Qn are compared for fitness 189;
(6) If An is better than the previous generation, and if their bit values differ, a quantum gate operator is applied on the corresponding Qubits of Qn using the previously described permutational methods;
(7) Therefore, after the gate operation the distribution Qn is slightly moved toward a given solution An of the total solution space, item 190; and,
(8) Steps from item 186 are repeated until termination when a threshold either in number of iterations or fitness is reached, item 191.

The initial set up of the Quanton is that X=(X1, . . . , Xn) denotes a vector of discrete random variables in which X=(X1, . . . , Xn) represents a permutation (respectively a braid) of length n. We use (lowercase) x=(x1, . . . , xn) to denote an assignment of values to the variables. Finally, we define K that denotes a set of indices in {1, . . . , n}, as a permutation and Xk (respectively xk) a subset of the variables of X (respectively x) determined by the indices in K. For each X, it therefore takes values in {0, 1, . . . , 2g−1} where g is the number of generators for values (and that these can originate from training data).

The Boltzmann probability distribution is used in statistical physics to associate a probability with a system state according to its energy: this process can be used to drive computation or as a surrogate for estimation of distribution for the Quanton. In driving computation, energy carries away information and the design is such that the permutons serve the role of information sinks while the permutants become the information sources. The Quanton structure, therefore, uses the boltzman distribution, pB(x), in its computing evolutionary mode which models the braiding (respectively permutation gate) operator and assigns a higher probability to braids that gives a more accurate approximation to the target gate, thus modeling the quantum gate itself.

The Boltzmann distribution $p_B(x)$ is defined for the Quanton as:

$$p_B(x) = \frac{e^{\frac{g(x)}{T}}}{\sum_{x'} e^{\frac{g(x')}{T}}}$$

Here g(x) is the objective function and T is the system temperature to smooth the probabilities.

Quantons with the highest probability, from the Estimation of Distribution Algorithm, correspond to the braids that maximize the objective function. The Quanton is solving the problem of finding a product of generator matrices for braids that represent a target gate and uses an object function of braid length as the following:

$$\text{fitness}(x) = \frac{1-\lambda}{1+\varepsilon} + \frac{\lambda}{l};$$

$l$ is braid length; $\lambda$ is a control parameter

Referring now to items 192 through 198, as PART-B:
(1) A random population of Quantons is built, item 192, with varying sized permutations using the methods previously described in the present disclosure; and,
(2) An orbitope representing the permutations is instantiated, item 193, to represent an individual Quanton as part of a Quanton population; and,
(3) The permutation vector is embedded into a manifold, item 194 (for example, a hypersphere or any of the geometries in TABLE 1) using a chosen dimension usually less than the size of the permutation space. For example, the permutation vector for 3-elements, {1, 2, 3} produces points in the usual Euclidean 3-space. But permutations of 4-elements, {1, 2, 3, 4} produces higher dimensional points of the permutohedron. Therefore, if for example, a circle is chosen as the embedding space, the for 3-elements there will be six divisions, or for 4-elements, 24 divisions of the circle and the adjacency relationship can be, for example, transpositions of adjacent elements in the permutation. Hence, the space of embedding need not be the same size as the permutation space itself; and,
(4) The mixture model 195 can be evolved and adjusted by the methods described previously; and,
(5) The probability model adjusted by the action of a Quantum Gate operator, changing the probability transitions between permutations (as gate operations) in item 196. In classical evolutionary algorithms, operators such as bit-string crossover or mutation are used to explore a search space while the Quanton quantum-like analog to these operators is the quantum gate; then, (6) The fitness is assessed 197. The effect is that local Quantons will evolve such they become synchronized from local to global states and move collectively closer toward the solution; until, (7) The solution threshold in either fitness or number of iterations is achieved, item 198.

The best most fit state transition function is stored at every generation and is distributed to the group functions at intermittent intervals which represents a local synchronization. From the set of all populations of groups of Quantons, that is to say, n×m Quantons in total, then the best most fit transition function among all Quanton multisets is stored every generation and also periodically distributed to the group functions. This is effectively a phase of global synchronization. All Quantons start in an initial population such that their probability distribution corresponds to $|\alpha|^2=|\beta|^2=\frac{1}{2}$ so that the two states "0" and "1" are equiprobable in the case of a binary valued observation logic.

The Quanton model generalizes the two-qubit state model to any finite number of states. The smallest unit of information is now a Quanton which is defined by a tuple of size n, being n! the total numbers of different possible S states, defined with respect to the ordering of a set of probabilistic bits whose values are analogs to the quantum bits (qubits).

$$\begin{bmatrix} \alpha_1 \\ \vdots \\ \alpha_n \end{bmatrix}; 0 \le \alpha_i \le 1;$$

$$\sum_{i=1}^{n} \alpha_i = 1$$

Let the state, $s=\{s_1, s_2, s_3, s_4\}$, so that if $s_k \in \{0, 1\}$ there are $2^4$ patterns but that there are $(4)^3=64$ combinatorial solution sets represented if S is a Quanton where paths between permutations can return to their various origins (i.e. that a permutation can have path back to itself). This mixed state probability distribution has individual states a, labeled as pure states.

The Quanton obeys the total probability conservation equation for each probability of each state as follows:

$$P=\Sigma p_i |\alpha_i\rangle = 1$$

Quanton populations represent the concept of a linear superposition of states probabilistically both in terms of the paths on an individual Quanton as well as in terms of a population of Quantons. Therefore, in learning distributions of states, the algorithm in the preferred embodiment is the Estimation of Distribution Algorithm (EDA) which is also known variously in the literature as Probabilistic Model Building Genetic Algorithm (PMBGA). Both terms are used interchangeably in the present disclosure without distinction.

The Quantons are represented by distributions over permutations and by probabilistic transition paths between permutations. These correspond to a string of Qubits, or Rebits as noted earlier, such that any Qubit (respectively Rebit) can also represent a linear superposition of solutions since all the permutations (i.e. states) are all available in a single Quanton. If the truth values for the observables are binary, then the solutions are superpositions of binary sets, else, if another logic is used, the superpositions are solutions in the order of the logic (e.g. 3-valued logics).

Traditional genetic algorithms based on bit-strings, where bits have only one of two possible states (0 or 1) have significant and serious disadvantages at very high scale, such as massive increases of dimensionality, long convergence times, weak signal confusion, numerical imprecision and complex codes. In contrast, Quantons as individuals and as populations represent a superposition of all combinatorial solutions: this provides a substantial efficiency and enhancement in performance in combinatorial optimization by genetic algorithms using Quantons while being a natural part of the Quanton/quantum representation model.

Now, referring to FIG. 39: Flowchart Schemata for Quantons in Estimation of Distribution Algorithm, a few clarifying notes of specific importance to the present disclosure are in order. First, it is commonly known to those skilled in the art that Estimation of distribution algorithms (EDAs) are a type of evolutionary model based on estimating a probability distribution of better candidate solutions to a problem space. As shown earlier, the Quanton uses a tandem model of local (at the level of Quanton) and global (at the level of the population of Quantons) evolution: the main steps of the Quanton based PMBGA, therefore, diverge significantly from the canonical PMBGA (respectively EDA) as follows:

(i) An initial population of Quantons is randomly generated, where each Quanton can itself have its own local probability density function, different to, and with a global probability density function or a mixture;

(ii) Starting with a population generated by a uniform distribution over all admissible solutions locally entangled subpopulation of individuals can be created by setting permutation pattern avoiding constraints and other hard correlation relationships to ensure synchronization with diversity;

(iii) The Quantons individually as well as their populations are scored using a model with a method based on the fitness function that gives a numerical ranking for each individual in the population, with the higher the number the better. From this ranked population, a subset of the most promising solutions are selected by the selection operator.

(iv) The algorithm then constructs a probabilistic model which attempts to estimate the probability distribution of the selected solutions. New solutions (offspring) are generated by sampling the distribution encoded by this model. These new solutions are then incorporated back into the old population, possibly replacing it entirely. Finally, iteration of these steps are repeated in continuous cycle until an expected or pre-determined criterion is reached: this model departs from the usual evolutionary models to model quantum-like computation becase a random selection of individuals is tested against the incoming data using quantum gate operations and that the individuals may be produced from a machine-learning process as opposed to a random process.

(v) Finally, most implementations are based on a probability vector that provides a fast and efficient model mainly due the assumption that all problem variables are independent: The Quanton can handle this case as well as the case that variables are not independent (i.e. entangled in some way) and in the classical case are related by some unforeseen hidden variables (i.e. the permuton and permutrix correlation).

An estimated probabilistic model is built from selecting the current best solutions and this is used in producing samples to guide the search process and update the induced model. The main process that the Quantons are solving for is to capture the joint probabilities between variables in a highly complicated data space. The main bottleneck is, therefore, in estimating the joint probability distribution associated with the data.

The Quanton model uses the following sets of heuristic rules to alleviate the bottleneck:
(a) Independent Distribution Heuristic: Assume that there is no dependency between the variables of the problem. The joint probability distribution is factorized as n independent univariate probability distributions and the Univariate Marginal Distribution Algorithm (UMDA) is used using the teachings of H. Muhlenbein, "The equation for response to selection and its use for prediction", Evolutionary Computation, 1997. Other choices with the same heuristic include Population Based Incremental Learning (PBIL) and compact genetic algorithm (cGA) as referred in the literature to those skilled in the art, for example, M. Pelikan and H. Mühlenbein, "Marginal distributions in evolutionary algorithms", in Proceedings of the International Conference on Genetic Algorithms Mendel, 1998.
(b) Pair Dependency Heuristic: Assume dependency between pairs of variables. Therefore, the joint probability distribution of the variables is factorized as the product of a univariate density function and (n−1) pair wise conditional density functions given a permutation between variables. For example, the Bivariate Marginal Distribution Algorithm (BMDA) as cited in M. Pelikan and H. Mühlenbein, "The Bivariate Marginal Distribution Algorithm", in Advances in Soft Computing: Engineering Design and Manufacturing, pages 521-535, Springer, 1999 and also the Mutual Information Maximization for Input Clustering (MIMIC) as referenced in Romero, Leoncio A. et al. "A Comparison between Metaheuristics as Strategies for Minimizing Cyclic Instability in Ambient Intelligence." Sensors (Basel, Switzerland) 12.8 (2012): 10990-11012. PMC. Web. 5 May 2016 or also Combining Optimizers with Mutual Information Trees (COMIT) algorithms as per the teachings in S. Baluja and S. Davies. Combining multiple optimization runs with optimal dependency trees. Technical Report CMU-CS-97-157.
(c) Multiple Dependency: Assume dependencies (strong correlations or entanglement) between multiple variables. In this case, the local and global Quanton evolution and population evolution as per the present disclosure is one of the preferred embodiments.

In the case of multiple dependencies, the Quanton has special advantage and polynomial efficiency over other methods. At the foundation of the Quanton is the idea of the quantum system which is usually composed of a query register, $|q\rangle$, and an answer register, $|a\rangle$, acting on Hilbert space:

$$\mathcal{H} = \mathcal{H}_q \otimes \mathcal{H}_a$$

In the Quanton, the query register and answer register are both n-qubit registers where possible values for the variables of a specific problem instance exist in the space of permutations of the assignments of values to variables. For example, the SAT problem, known to be NP-complete usually has multiple dependencies. The Quanton quantum efficiency over straightforward classical computation is that, $|q\rangle$, is placed in a uniform superposition of the computation basis by applying the Hadamard transform $\mathcal{H}$ a total of n times to the initializing n-qubit state, $|0\rangle$, i.e.

$$\mathcal{H}^{\otimes n}|0\rangle^{\otimes n} = \frac{1}{\sqrt{2^n}} \sum_{x=0}^{2^n-1} |x\rangle$$

This creates a superposition of an exponential number of states, each of representing a possible path in the Quanton, but, due to the Quanton permutational representation, only employing a polynomial number of gates. A single qubit, is initialized to state $|0\rangle$ and this is the answer register. The state of the system is:

$$\mathcal{H} = \mathcal{H}_q \otimes \mathcal{H}_a$$

$$\mathcal{H}^{\otimes n}|0\rangle^{\otimes n} = \frac{1}{\sqrt{2^n}} \sum_{x=0}^{2^n-1} |x\rangle$$

$$|q\rangle|a\rangle$$

From which we can derive a query and answer expression as follows:

$$|q\rangle|a\rangle = \frac{1}{\sqrt{2^n}} \sum_{x=0}^{2^n-1} |x\rangle|0\rangle$$

And where we represent entanglement as:

$$|\psi'\rangle = \frac{1}{\sqrt{2^n}} \sum_{x=0}^{2^n-1} O|x\rangle|0\rangle = \begin{cases} |00\ldots 0\rangle|0\rangle \\ |00\ldots 1\rangle|0\rangle \\ \vdots \\ |11\ldots 0\rangle|1\rangle \\ |11\ldots 1\rangle|0\rangle \end{cases}$$

Given a density matrix defined as $\wp$ where $\rho_s$ is the fraction of the ensemble in each pure state $|\psi_s\rangle$:

$$\wp = \Sigma_s \rho_s |\psi_s\rangle\langle\psi_s|$$

simply written as:

$$\wp = |\psi\rangle\langle\psi|$$

And the answer $\wp^\alpha$: $\wp^\alpha = Tr_q(\wp)$

Accordingly, let k denote the overall number of solutions, then $p^\alpha$ takes the form shown in Expression below:

$$\wp^\alpha = \frac{1}{2^n}[(2^n - k)|0\rangle\langle 0| + k|1\rangle\langle 1|]$$

The overall state is separable only when k=0, i.e. no solution exists, or when k=2n, each value belonging to [0, $2^n$−1] is a solution. Otherwise, the system is entangled. Thus, the problem of determining whether a solution to a problem exists that can be reduced to the problem of determining whether the state is separable or entangled. In order to determine if the state is entangled, the following decision equation is used:

$$O_{[a,b]}|q\rangle|\alpha\rangle = |q\rangle|a \oplus f_{[a,b]}(q)\rangle$$

which employs an auxiliary function for $\wp = |\psi\rangle \times \langle\psi|$ $$f_{[a,b]}(q) = \begin{cases} 1 & \text{if } (q) \text{ is a solution and } q \in [a, b] \\ 0 & \text{if } f(q) \text{ is not a solution and } q \in [a, b] \end{cases}$$

This process entangles the quantum registers and using the auxiliary function, entanglement can be checked for in the presence of a solution state for a given range. In contrast, the absence of a solution means that a specific range is pruned from the search procedure.

Figure 40:
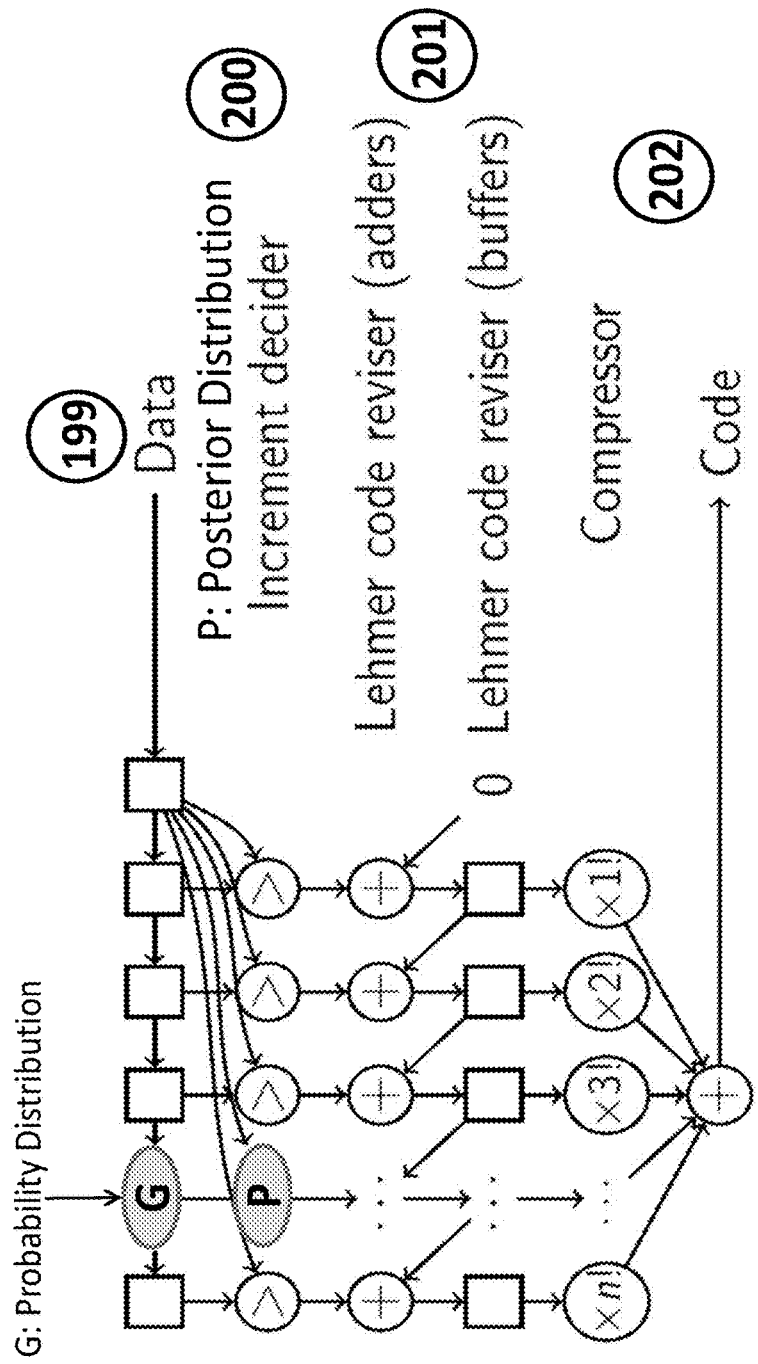
FIG. 40 illustrates an exemplary hardware design for Quantons in a System on a Chip (SOC)

FIG. 40: Hardware Design for Quantons for A System On A Chip (SOC) Given the preceding information, the Quanton is also suited for implementation in both classical or quantum hardware, whenever quantum hardware becomes available. In an embodiment in classical hardware, a data sampler, item 199, feeds into a processor using a probability distribution, item G. The processor computes the posterior distribution using either a GPU (graphics processing unit coprocessor) or DSP (digital signal processing) unit, item 200. This is combined with the permutation representation of quantum gates in the form of Lehmer code "revisers", item 201, that operate as adders and buffers to produce the final output code, item 202, using the compressed encoding described previously for signal encoding.

Figure 41:
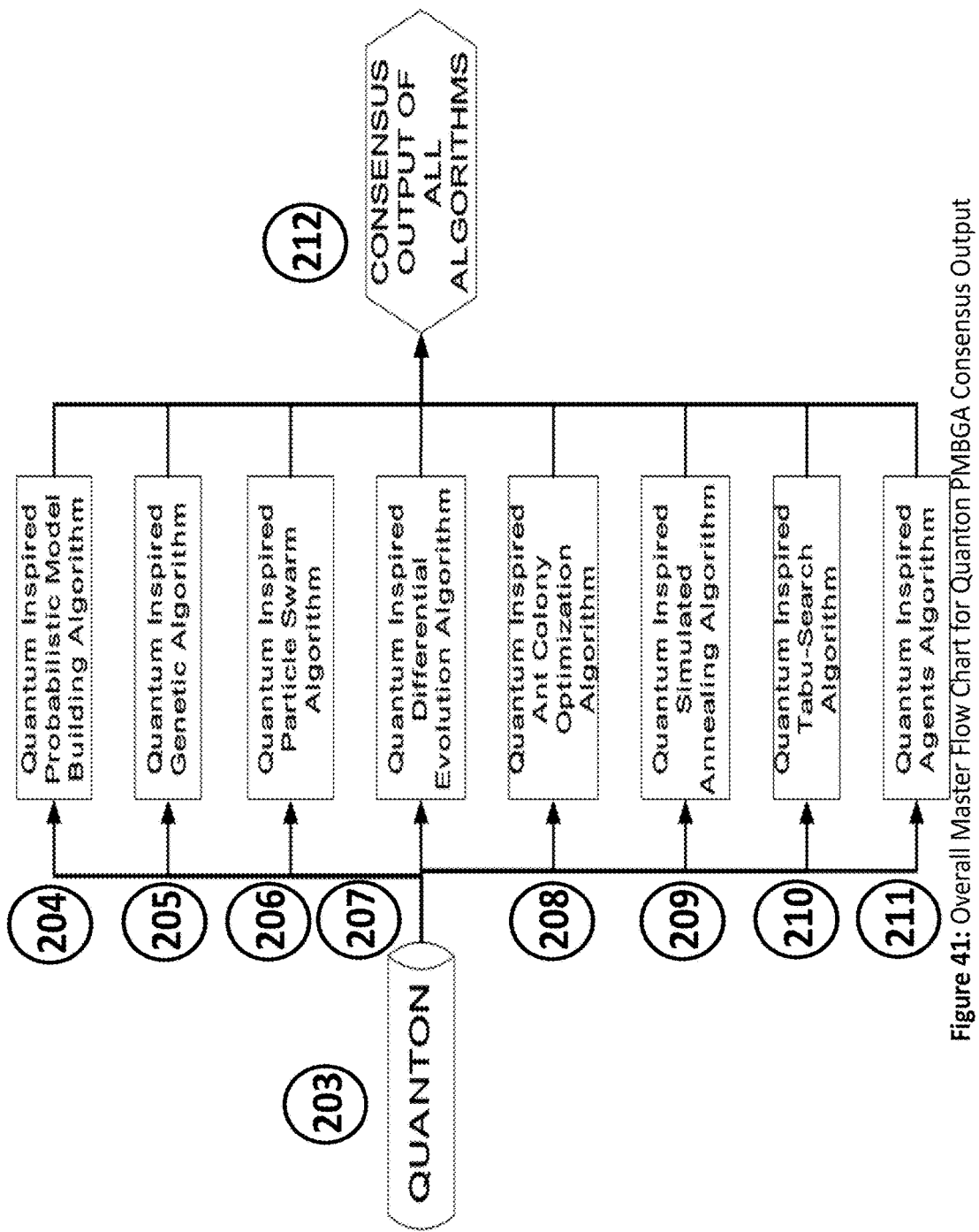
FIG. 41 illustrates an overall master flow chart for Quanton PMBGA consensus output.

FIG. 41: Overall Master Flow Chart for Quanton PMBGA Consensus Output A population of Quantons, items 204 to 211 can evolve according to different evolutionary regimes and these can serve as the metaheuristic estimators of distribution for learning the probability density distribution of a parent Quanton, item 203: in this way, very complex patterns, or temporal events, can be learned and stored in a single master Quanton ready for recall and use in problem solving in a given domain, or, as an analog to solutions in other domains, as a consensus of the probabilities (i.e. a mixture model), item 212.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Features of the disclosure can be implemented using some form of computer processor. As stated previously, each of the functions of the above-described embodiments may be implemented by one or more processing circuits. A processing circuit includes a programmed processor (for example, processor 1004 in FIG. 42), as a processor includes circuitry. A processing circuit also includes devices such as an application-specific integrated circuit (ASIC) and conventional circuit components arranged to perform the recited functions. The circuitry may be particularly designed or programmed to implement the above described functions and features which improve the processing of the circuitry and allow data to be processed in ways not possible by a human or even a general purpose computer lacking the features of the present embodiments.

The present embodiments can emulate quantum computing on a digital computing device having circuitry or can be implemented on a quantum computer or the like.

As one of ordinary skill in the art would recognize, the computer processor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art. Even on a ONE CPU machine it acts in "parallel" due to the permutation encoding.

Figure 42:
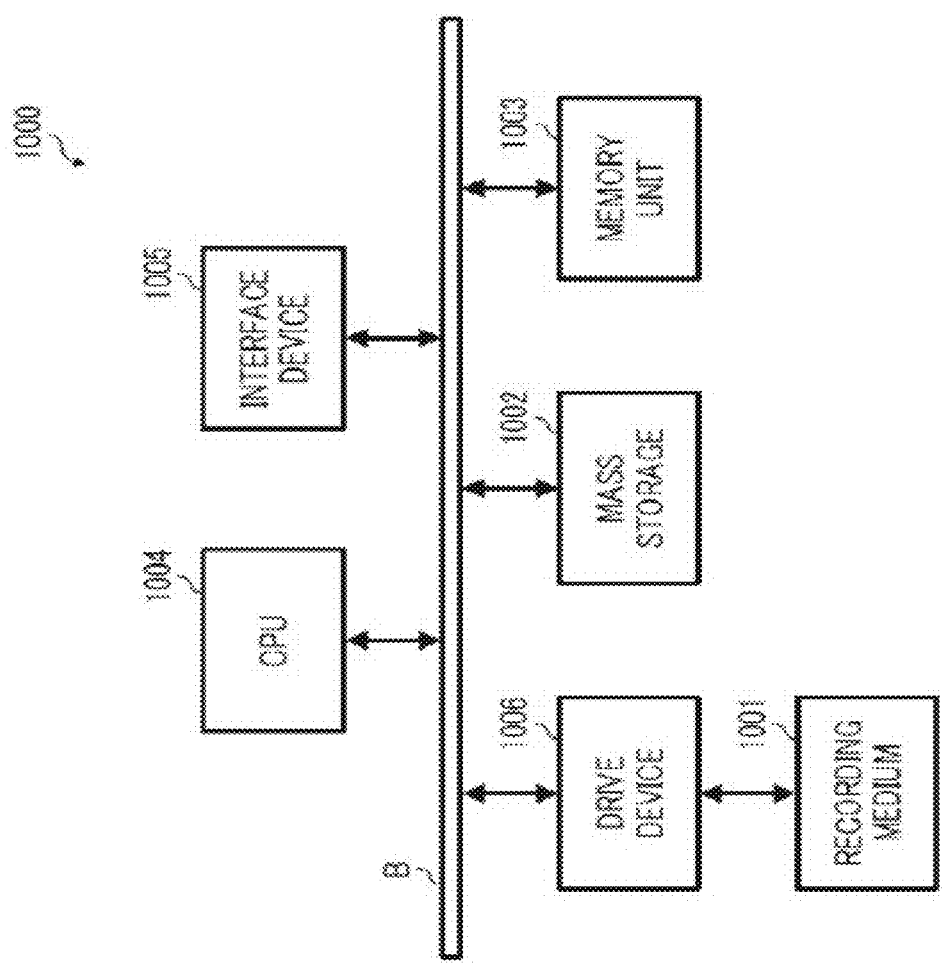
FIG. 42 illustrates an exemplary illustration of a computer according to one embodiment.

In addition, the invention can be implemented using a computer based system 1000 shown in FIG. 42. The computer 1000 includes a bus B or other communication mechanism for communicating information, and a processor/CPU 1004 coupled with the bus B for processing the information. The computer 1000 also includes a main memory/memory unit 1003, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 1004. In addition, the memory unit 1003 may be used for storing temporary variables or other intermediate information during the execution of instructions by the CPU 1004. The computer 1000 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 1004.

The computer 1000 may also include a disk controller coupled to the bus B to control one or more storage devices for storing information and instructions, such as mass storage 1002, and drive device 1006 (e.g., floppy disk drive, read-only compact disc drive, read/write compact disc drive, compact disc jukebox, tape drive, and removable magneto-optical drive). The storage devices may be added to the computer 1000 using an appropriate device interface (e.g., small computer system interface (SCSI), integrated device electronics (IDE), enhanced-IDE (E-IDE), direct memory access (DMA), or ultra-DMA).

The computer 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 1000 may also include a display controller coupled to the bus B to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer 1000 performs at least a portion of the processing steps of the invention in response to the CPU 1004 executing one or more sequences of one or more instructions contained in a memory, such as the memory unit 1003. Such instructions may be read into the memory unit from another computer readable medium, such as the mass storage 1002 or a removable media 1001. One or more processors in a multi-processing arrangement may also be employed to execute the sequences of instructions contained in memory unit 1003. In alternative embodiments, hard-wired circuitry may be used in place of or in combination with software instructions. Thus, embodiments are not limited to any specific combination of hardware circuitry and software.

As stated above, the computer 1000 includes at least one computer readable medium 1001 or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the main processing unit, for driving a device or devices for implementing the invention, and for enabling the main processing unit to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code elements on the medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 1004 for execution. A computer readable medium may take many forms, including but not limited to, non-volatile media, and volatile media. Non-volatile media includes, for example, optical, magnetic disks, and magneto-optical disks, such as the mass storage 1002 or the removable media 1001. Volatile media includes dynamic memory, such as the memory unit 1003.

Various forms of computer readable media may be involved in carrying out one or more sequences of one or more instructions to the CPU 1004 for execution. For example, the instructions may initially be carried on a magnetic disk of a remote computer. An input coupled to the bus B can receive the data and place the data on the bus B. The bus B carries the data to the memory unit 1003, from which the CPU 1004 retrieves and executes the instructions. The instructions received by the memory unit 1003 may optionally be stored on mass storage 1002 either before or after execution by the CPU 1004.

The computer 1000 also includes a communication interface 1005 coupled to the bus B. The communication interface 1004 provides a two-way data communication coupling to a network that is connected to, for example, a local area network (LAN), or to another communications network such as the Internet. For example, the communication interface 1005 may be a network interface card to attach to any packet switched LAN. As another example, the communication interface 1005 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1005 sends and receives electrical, electromagnetic or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to, and the computer 1000 may be, a mobile device such as a personal digital assistant (PDA) laptop computer, or cellular telephone.

In summary, the Quantum method and apparatus use a quantum-inspired computational data representation and algorithm called a Quanton. The Quanton is a surrogate for a mixed state representation and algorithms for operating on the Quanton to perform learning or inference to produce results. The Quanton can be used as an encoding for a fictitious, virtual (e.g. phonon) or real (e.g. atomic) physical particle with properties that can be graded between classical-like and quantum-like analogous behaviors by choosing the probability density function, the lattice that quantize the continuous space and the permutation encoding that represents a state space at each lattice index.

The Quanton can be defined by any set of self-similar permutation operators, acting on the digits and places of any number, such as, for example, the permutation model proposed by Palmer noted above for representing the quantum complex space by a real binary expansion of a Borel normal real number.

For the purposes of explaining the embodiment, we will use a Fibonacci lattice and a simple transposition permutation operator to generate the permutations. A simple probability density function, the Von Mises Bingham distribution will be used and is allocated to the Fibonacci lattice. The points of the Fibonacci lattice, which are associated to the permutation, together represent a permutation polytope. We will embed this polytope into a hypersphere, therefore, which plays the role of a Riemann sphere, quantized by the lattice and its embedded permutations.

As a result of its granularity (i.e. quantization), the value of the probability density distribution is defined to be only uniquely definable on a countable set of the vertices of the polytope embedded in the hypersphere or sphere (in the case of low dimensional permutations). The permutation operator describes permutation-operator representations from which transformations of a probability density value under rotations of the sphere can be defined, or, conversely, that operations in the vector space representing probability densities produce permutation results noting that permutations can encode arbitrary data structures and models as described further in this disclosure. Using the permutation operator representation and the representation of arbitrary data by permutation encodings as natural numbers, a constructive quantum-like probabilistic virtual machine is defined.

In analogy to standard quantum theory, the Quanton permutation operator can also serve to encode the stochasticity of a complex phase function in the standard quantum theoretic wave function: for example, in S2, quaternionic permutations can encode the spatial entanglement relationships in the wave function as noted in Palmer. In higher dimensions, the general geometric algebra of rotors extends this formalism. The Quanton provides finite samples of values of the probability density on the vertices, and the vertex sets can also be used to define a probability measure consistent with quantum-theoretic probability and correlation if the model of Palmer is used (ref[ ]).

The quantization of the Quanton in terms of its vertex based probability density accounts for the Quanton virtual machine not requiring fulfillment of the Bell inequalities, and hence rendering the Quanton a "quantum-inspired" approximate probabilistic virtual machine in contrast to a true quantum-virtual machine. However, standard quantum phenomena are emulated by the Quanton. In this respect, the two key properties of the Quanton are that quantum-like state preparation corresponds to choice of probability density (or mixture model) and that the permutation operator serves to define the granularity of the observation state space (i.e. the model state space) from which measurement probabilities and correlations can be derived by frequentism or Bayesianism (as have been encoded via the machine learning EDA or by direct preparation).

Temporal and spatial domains can be combined via the use of time domain density functional theory (TDDFT) which is used as the quantum inspired approach for encoding dynamics when the data set requires time as a parameter. TDDFT can be used to approximately simulate quantum algorithms on a classical computer and with the Quanton model, this can also be used for clustering or inference over time. There will be systems that will be very hard to simulate using approximate functionals, such as those that are in the complexity class QMA (Quantum Merlin Arthur) protocols and may require exponentially scaling resources even on a real quantum computer [http://arxiv.org/abs/0712.0483].

Finding functionals that carry out complex quantum computational tasks is extremely difficult and the present disclosure provides a classical approximation to approximate quantum-like computing by combining a number of distinct elements in a very unique way, based on estimation of distribution algorithms (EDA), so as to result in functionals that are computationally useful within a specified scope of problems. By scope of problem we mean their scale, or size, or complexity and constrained to within a domain of application (i.e. instead of general purpose computing, we mean special purpose computing).

The specified scale is determined by the size of the permutations or depth of a structure as represented by the Quanton. Within the scale, therefore, the Quanton will compute at high speed, but, if the permutation scale is too small, then the computations degenerate back into the exponential or factorial sizes. Therefore, estimating the size of the Quanton needed amounts to estimating the quantization limit of the Quanton itself as function of the distance between adjacent lattice points of the spherical Fibonacci lattice which serves as the foundation for the spherical distribution of the vertices of the permutation polytope.

Effective data structure encoding is the main reason in enabling algorithmic speedups for example, in both classical and quantum estimation of distribution and particle swarm algorithms as well as many other fundamentally hard optimization problems. Poor data structures imply that solutions will need hacks and work-arounds to implement.

The Quanton makes use of a succession of embeddings. In other words it partially evaluates and therefore compiles out the combinatorial complexity, without trading space for speed (as is usually done) between factorially large data spaces and a n-dimensional manifold that are precompiled into a probabilistic particle which serves as the representation for data.

The Quanton data encoding makes use of the concepts of entanglement and superposition to represent an entire joint probability density over states of superposition, and approximates all inference trajectories simultaneously (e.g. markov chain monte carlo (MCMC))—a feat not possible with any current purely classical data encoding models. A single Quanton data encoding, as single particle, can encode a massive amount of information and a multiplicity of such Quanton encodings forms a quantum particle ensemble for more complex representational data surrogates.

As an example of a more complex data representational surrogate, for example, in case-based reasoning (CBR) the dynamic case memory is the key to the reasoning process in which machine learning is also an inherent part of both the case matching as well as the case adaptation process. In real-world applications, big data arrive as unstructured sets of high dimensional case vectors, requiring memory-based or instance-based reasoning and learning, even though the situation consists of knowledge-poor shallow sets of cases—such as the difficult speech to-speech machine translation problem. In our approach using the Quanton data encoding, the case indexing problem is addressed at a modeling level where matching can be performed efficiently by using the built-in quantum inspired parallelism through the distribution of probability density over the permutations that represent the cases.

The Quanton makes it possible to implement quantum-surrogates of inference procedures capable of performing at very high speed with quadratic, exponential and factorial speedup over the best classical approaches since it provides what has been called a "backdoor". The Quanton backdoor is the connection that is formed between embedding in a continuous manifold and its embedded probability densities between the manifold and the tangent space probabilities to the same manifold: these are a sparse number of points relative to the total problem space. Backdoors are sparse numbers of parameters that can dramatically impact very high dimensional data spaces and bring them down to manageable levels because they act like shortcuts through high combinatorial complexity. Therefore the typical targets for the use of the Quanton data structure is in attacking NP-hard problems because a Quanton enables a generic way to approximate NP by P by providing backdoors between continuos probability density functionals and structure.

One example is the NP-Hard maximum a priori (MAP) inference in (Bayesian) graphical models as well as inference over permutations, computing matrix permanents and seriation problems. The algorithms presented using the data structures can quickly find an approximation-MAP configuration with a quadratic speedup over classical, can find an approximation inference to the inference over permutations, compute approximate near permanents and rapidly approximate the solution to the noisy seriation problem such that classical methods can select the precise solution, out of the approximate candidates, for each of these NP-Hard problems.

Any one of, or, a mixture of, the Complex Normal Distribution, Kent, Gaussian, Bingham, Watson, Dirichlet Process mixture models or von Mises-Fisher distribution, or their multivariate versions, for directional data presents a tractable form and has all the modeling capability required for the Quanton.

The present invention uses a generative model of mixtures of distributions on a hypersphere that provide numerical approximations of the parameters in an Expectation Maximization (EM) setting. This embodiment also allows us to present an explanation for choosing the right embedding dimension for spectral clustering as well as choosing the right embedding dimension from a distribution perspective. In text analytics, however, and in order to represent semantics (content structure) between related documents, for clustering purposes, the topics can be represented as permutations over concepts. To learn the distributions over permutations, the Generalized Mallows Model (GMM) concentrates probability mass on permutations close to canonical permutations and, therefore, permutations from this distribution are likely to be similar, thus clustering similar documents. In the GMM model the number of parameters grows linearly with the number of concepts, thus sidestepping tractability problems typically associated with the large discrete space of permutations.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of emulating an evolution of a quantum system, the method being performed by circuitry, the method comprising:
   storing in memory a Quanton virtual machine data structure (QVM) by configuring in the memory a permutation data structure representing a quantum state, configuring in the memory a second data structure representing an evolution operator of the quantum state as directional displacements on a manifold, and configuring in the memory a relational table relating permutations to lattice points on the manifold;
   receiving training data representing a plurality of input quantum states respectively associated with a plurality of output quantum states of the plurality of input quantum states after having evolved according to the quantum system;
   training, using the received training data, the QVM by initializing a distribution of the QVM, and
      iteratively updating the distribution of the QVM based on results of a fitness function applied to randomly selected QVMs to generate a trained QVM representing a convergence of the distribution of the QVM, wherein
      the results of the fitness function applied to a QVM of the randomly selected QVMs include a distance measure between respective states of the output quantum states and corresponding states of the plurality of input quantum states after having applied the QVM of the randomly selected QVMs; and
   emulating the quantum system by applying the trained QVM to a quantum input representing an initial state of the quantum system and thereby generating, in polynomial time, a quantum output representing an initial state of the quantum system and corresponding to the quantum input evolved according to the quantum system, wherein
   the permutation data structure is an array representing a permutation matrix, and
   each of the randomly selected QVMs are determined using respective random numbers generated by the circuitry according to the distribution of the QVM.

2. The method according to claim 1, further comprising:
   defining a mapping of quantum states to permutations, wherein
   the configuring the QVM in the memory further includes,
      the relational table being configured in the memory to relate the permutations to the lattice points that are a countable number of lattice points on the manifold, the lattice points forming vertices of a Birkhoff polytope,
      the second data structure being configured in the memory as first probability density, which is a directional probability density on the manifold, and
      a second probability density representing a distribution of quantum states, which is a linear probability density in a tangent space, the tangent space being one of a plurality of tangent spaces tangent to the manifold at the lattice points and forming a tessellation the manifold,
   the training the QVM by the iteratively updating of the distribution of the QVM further includes, repeating in an iteratively loop until stopping criteria are reached,
      determining, as the randomly selected QVMs, samples of QVMs randomly selected from the distribution of the QVM using the random numbers generated by the circuitry,
      obtaining the results of the fitness function applied to the randomly selected QVMs by calculating respective fitness values of the samples of QVMs by applying a fitness function to each respective sample of the samples of QVMs,
      selecting a fit subset of the samples of QVMs corresponding to fitness values within a range,
      updating the distribution of the QVM according to statistical properties of the fit subset of the samples of the QVMs, wherein
   the trained QVM is a QVM of the samples of the QVMs that has a greatest fitness value relative to all other of the samples of the QVMs when the stopping criteria are reached.

3. A non-transitory computer readable storage medium including executable instruction, wherein the instructions, when executed by circuitry, cause the circuitry to perform the method according to claim 2.

4. The method according to claim 2, wherein the configuring of the QVM in the memory further includes
the manifold including that the lattice points are arranged as a lattice forming a polytope, wherein each lattice point corresponds to a respective vertex of the polytope, and the lattice points are indexed by respective numbers of a numerical sequence, the respective numbers being associated with the respective permutations.

5. The method according to claim 4, wherein the configuring of the QVM in the memory according to by the polytope formed by the lattice points being one of a Permutohedron, a sorting orbitope, a Birkhoff polytope, or a combinatorial polytope.

6. The method according to claim 4, wherein the configuring of the QVM in the memory according to
the manifold being one of a hypertorus, a hypersphere, a hypercube, a Calabu-Yau manifold, an n-simplex, a 2-polygon, and a zonotope,
a lattice-type determining an arrangement of the lattice points in the lattice being one of a Bravais lattice, a Fibonacci lattice, a Fermat lattice, a binary lattice, a simplicial polytopic number lattice, and a figurate numbers lattice,
a probability distribution type of the first probability density is one of a non-linear probability density function, a von Mises probability density, a von Mises Fisher probability density, a Watson probability density, a Mallows probability density, a Gaussian probability density, a Kent probability density, a Bivariate von Mises probability density, a uniform probability density, a Veterbi probability density, a Bayes probability density, a Markov-chain probability density, a Markov probability density, a mixture model, and a Dirichlet Process mixture model, and
a probability distribution type of the second probability density is one of a linear probability density function, a Gaussian distribution, a Poisson distribution, a Wigner distribution, a Fisher distribution, a hypergeometric distribution, a mixture model probability density, and any combination thereof.

7. The method according to claim 2, wherein the configuring of the QVM in the memory further includes
the manifold being a finite geometric surface, wherein the manifold represents nonlinear characteristics of the-evolution of the quantum system, and
the tangent spaces being a tessellation of the manifold, wherein the tangent spaces represent a local linear approximation of the manifold.

8. The method according to claim 2, further comprising
defining a transition model, which evolves the second probability density according to transitions represented by the first probability density, wherein the first probability density represents transitions along the manifold among the lattice points, and
mapping the second probability to/from a Euclidean space of the tangent space from/to a space of manifold, using a logarithmic map.

9. The method according to claim 2, wherein the configuring of the QVM in the memory according to
identifying lattice points as respectively corresponding to permutations,
identifying lattices points as respectively corresponding to quantum states, and
identifying transitions among lattices points to correspond with quantum gates.

10. The method according to claim 2, wherein
the receiving of the training data further includes mapping the training data to the manifold and tangent spaces to represent input data and output data as permutations corresponding to the lattice points, and
the updating of the QVM includes that the stopping criteria include a measure of how closely permutation transitions represented by the first probability density approximate translations from the permutations of the input data to the permutations of the output data.

11. The method according to claim 2, further comprising
defining operational semantics, wherein respective states of the quantum system correspond to respective permutations of the lattice points and respective gate operations on the states of the quantum system correspond to transitions among the lattice points and/or permutation operations on the permutations of the lattice points.

12. The method according to claim 11, wherein the defining operational semantics further includes
the permutation operations include at least one of a swap operation, an addition operation, or any combination thereof, and
the gate operation is one of a reversible logic gate, a Toffoli gate, a C-NOT gate, a Peres gate, a Fredkin gate, a swap gate, or any combination thereof.

13. The method according to claim 2, wherein the configuring of the QVM in the memory further includes
the permutations being represented as permutrices, each permutrix including a respective permutant and a respective permuton, wherein the respective permutants represent observable states and the respective permutons represent hidden states or imaginary states.

14. The method according to claim 2, wherein the configuring of the QVM in the memory according to
the manifold being a hypersphere,
the countable number of lattice points being a Landau number greater than a dimension of a state space of the quantum system,
the lattice points being arranged in one of a Fibonacci lattice and a Fermat lattice, and
the lattice points being labeled by the respective permutations, which, when the lattice points are arranged in the Fibonacci lattice, are represented by Lehmer codes determined using a Binet Formula.

15. The method according to claim 2, wherein the configuring of the QVM in the memory according to
labelling the lattice points according to a combinatorial arrangement by
determining the respective permutations at the lattice points according to a integer sequence, which relates the respective permutations to successors and predecessors,
determining a permutation transition operator between permutations according to the successors and the predecessors, and
associating the permutation transition operator to an operational semantics, wherein the operational semantics include at least one of a gate operation, a quantum circuit, a permutation operation, a swap operation, and an operation corresponding to a Hamiltonian path of the permutations.

16. The method according to claim 2, wherein the configuring of the QVM in the memory according to labelling the lattice points by the respective permutations according to a sequence pattern that is one of a general quantum permutation circuit, a blockwise pattern, an alternating pattern, a zigzag pattern, and up/down pattern, a Landau Number pattern, and a Baxter permutation pattern.

17. The method according to claim 2, wherein the defining the mapping of the quantum states to permutations includes
a list-permutation bijection between a list and a permutation, the list-permutation bijection being a reversible mapping representing a one-to-one correspondence between a set of the list, which is a sequence of natural numbers, and a set of the permutation, which is a permutation of natural numbers,
a list-natural number bijection between the list and a natural number,
a list-set bijection between the list and a set, and
a list-multiset bijection between the list and a multiset.

18. The method according to claim 2, wherein the receiving the training data includes
representing training data as training-data probability distributions on the tangent spaces, and the training-data probability distributions are discretized to discrete values corresponding to the respective nearest lattice points, and
using a logarithmic map to map distributions between the manifold and the tangent spaces, wherein the distributions correspond to the second probability density.

19. The method according to claim 2, wherein the updating the QVM is further performed by
the determining of the samples of QVMs from the distribution of the QVM is performed by
the determining of the samples of QVMs such that each sample of QVMs has a unique arrangement of the permutations labeling the respective lattice points,
the calculating of the respective fitness values of the samples of QVMs is performed by
obtaining, based on training data, respective input distributions and output distributions of the permutations, the arrangement of the input distributions and the output distributions among the lattice points depending on the unique arrangement of the permutations labeling the lattice points of the sample,
operating on the input distributions using a transition model relating input lattice points to output lattice points to generate transitioned input distributions, and
applying a fitness function to the transitioned input distributions and the output distributions to generate the respective fitness values of the samples, and
the updating of the distribution of the QVM includes adjusting the distribution of the QVM according to a likelihood that, among the unique arrangements of the permutations labeling of the lattice points within the fit subset, a lattice point of the lattice points is labeled by a permutation of the permutations.

20. The method according to claim 19, wherein the updating the QVM is further performed by the calculating of the respective fitness values using the permutational distance function that is one of Levenstein Edit distance, a Hamming distance, and number of permutation operations separating lattice points, and a Kendall tau distance.

21. The method according to claim 2, wherein the updating the QVM is further performed by
the determining of the samples of QVMs from the distribution of the QVM is performed by
the determining the samples of QVMs such that each sample of QVMs has a unique transition model of directional transitions among the lattice points,
the calculating of the respective fitness values for a sample of the samples of QVMs is performed by
obtaining, based on training data, respective input distributions and output distributions of the lattice points,
operating on the input distributions using the corresponding unique transition model of the sample to generate transitioned input distributions, and
applying a fitness function to the transitioned input distributions and the output distributions to generate the respective fitness values-of the samples, and
the updating of the distribution of the QVM includes adjusting the distribution of the QVM according to a likelihood that, among the unique transition models of fit subset, a lattice point of the input distribution transitions to a lattice point of the output distribution.

22. The method according to claim 21, wherein the wherein the training the QVM includes-using the logarithmic map to map the distributions between the manifold and the tangent spaces, wherein the logarithmic map is one of a Riemannian logarithmic map, a Hilbert logarithmic map, and an inverse function between respective a linear space and a non-linear space.

23. The method according to claim 2, wherein
the emulating of the evolution of the quantum system using the QVM by
receiving an input,
mapping the input to an input Quanton state, and
applying the first probability density of the learned QVM to the input Quanton state to generate an output Quanton state.

24. The method according to claim 23, wherein the emulating of the evolution of the quantum system is further performed by
the applying of the first probability density to the learned QVM further includes that the first probability density is learned by the updating of the QVM.

25. The method according to claim 2, wherein the updating the QVM is further performed using a recursive evolution and estimation method by
each permutation of the permutations comprising a permuton and a permutrix, and
the recursive evolution and estimation method including the steps of
defining an observation model and a transition model, wherein the transition model includes a mixed conditional probability distribution based on the first probability density and expressed using at least one of a mean and a variance of a von Mises-Fisher distribution, a mean and a variance of a Gaussian distribution, a mixture model of probability distributions, or any combination thereof,
generating a posterior to predict an evolution of the second probability density using a Forward algorithm by performing a prediction/roll up step and a conditioning step,
the determining samples of QVMs further include generating observations of the second probability density by projecting the posterior onto the manifold to generate a mean vector, and
the selecting a fit subset of the samples of QVMs and the updating of the distribution of the QVM include generating random draws using the mean vector, and modifying the second probability density from a partial observation based on the random draws.

26. The method according to claim 2, wherein the configuring of the QVM in the memory according to labeling the lattice points by the respective permutations according to a sequence pattern using Landau numbering to design the permutations, wherein an operation between the permutations representing transitions between the lattice points corresponds to at least one of an addition, subtraction, multiplication, and division of a Turing computational model.

27. The method according to claim 2, wherein the wherein the emulating the quantum system includes mapping the quantum input to a second probability density of the trained QVM using one of a Bayesian model, a Kalman model, a model applying time dependent density functionals, a model applying direction dependent density functionals, a quantum model, or any combination thereof.

28. The method according to claim 2, wherein the quantum system is a topological quantum computing system and the evolution of the quantum system is a braiding operation of-topological quantum computing.

29. A non-transitory computer readable storage medium including executable instruction, wherein the instructions, when executed by circuitry, cause the circuitry to perform the method according to claim 1.

30. An apparatus comprising:
a memory storing a Quanton virtual machine data structure (QVM), the QVM including
a permutation data structure representing a quantum state,
a second data structure representing an evolution operator of the quantum state as directional displacements on a manifold, and
a relational table relating the permutation data structure to lattice points embedded in the manifold corresponding to the second data structure; and
circuitry configured to
generate random number according a predefined distribution,
receive training data representing a plurality of input quantum states respectively associated with a plurality of output quantum states of the plurality of input quantum states after having evolved according to the quantum system, and
train, using the received training data, the QVM by initializing a distribution of the QVM, and
iteratively updating the distribution of the QVM based on results of a fitness function applied to randomly selected QVMs to generate a trained QVM representing a convergence of the distribution of the QVM, wherein
the results of the fitness function applied to a QVM of the randomly selected QVMs include a distance measure between respective states of the output quantum states and corresponding states of the plurality of input quantum states after having applied the QVM of the randomly selected QVMs, and
emulate the quantum system by applying the trained QVM to a quantum input and thereby generating, in polynomial time, a quantum output corresponding to the quantum input evolved according to the quantum system, wherein
the permutation data structure is an array representing a permutation matrix, and each of the randomly selected QVMs are determined using respective random numbers generated by the circuitry according to the distribution of the QVM.

31. The apparatus according to claim 30, wherein the memory is further configured according to
the relational table relates the permutations to the lattice points that are a countable number of lattice points on the manifold, the lattice points forming vertices of a polytope,
the second data structure is first probability density, which is a directional probability density on the manifold, and
a second probability density, which represents a distribution of quantum states, is a linear probability density in a tangent space, the tangent space being one of a plurality of tangent spaces tangent to the manifold at the lattice points and forming a tessellation the manifold,
the circuitry is further configured to
define a mapping of quantum states to permutations, and
perform the training the QVM by iteratively updating of the distribution of the QVM further by repeating, in an iteratively loop until stopping criteria are reached, the steps of
determining, as the randomly selected QVMs, samples of QVMs randomly selected from the distribution of the QVM using the random numbers generated by the circuitry,
obtaining the results of the fitness function applied to the randomly selected QVMs by calculating respective fitness values of the samples of QVMs by applying a fitness function to each respective sample of the samples of QVMs,
selecting a fit subset of the samples of QVMs corresponding to fitness values within a range,
updating the distribution of the QVM according to statistical properties of the fit subset of the samples of the QVMs, wherein
the trained QVM is a QVM of the samples of the QVMs that has a greatest fitness value relative to all other of the samples of the QVMs when the stopping criteria are reached.

32. The apparatus according to claim 30, wherein the memory circuitry is further configured according to
the manifold is a finite geometric surface, wherein the manifold represents nonlinear characteristics of the evolution of the quantum system, and
the tangent spaces is a tessellation of the manifold, wherein the tangent spaces represent a local linear approximation of the manifold.

33. The apparatus according to claim 30, wherein the circuitry is further configured to train the QVM by
defining a transition model, which evolves the second probability density according to transitions represented by the first probability density, wherein the first probability density represents transitions along the manifold among the lattice points, and
mapping the second probability to/from a Euclidean space of the tangent space from/to a space of manifold, using a logarithmic map.

34. The apparatus according to claim 30, wherein the memory circuitry is further configured according to
the lattice points respectively corresponding to permutations,
the lattices points as respectively corresponding to quantum states, and transitions among lattices points corresponding with quantum gates.

35. The apparatus according to claim 30, wherein the circuitry is further configured to train the QVM by
mapping the training data to the manifold and tangent spaces to represent input data and output data as permutations corresponding to the lattice points, and
update the QVM using the stopping criteria that further includes a measure of how closely permutation transitions represented by the first probability density approximate translations from the permutations of the input data to the permutations of the output data.

36. The apparatus according to claim 30, wherein the circuitry is further configured to
define operational semantics, wherein respective states of the quantum system correspond to respective permutations of the lattice points and respective gate operations on the states of the quantum system correspond to transitions among the lattice points and/or permutation operations on the permutations of the lattice points.

37. The apparatus according to claim 36, wherein the circuitry is further configured to defining the operational semantics by
the permutation operations include at least one of a swap operation, an addition operation, or a combination thereof, and
the gate operation is one of a reversible logic gate, a Toffoli gate, a C-NOT gate, a Peres gate, a Fredkin gate, a swap gate, or any combination thereof.

38. The apparatus according to claim 30, wherein the memory circuitry is further configured according to
representing the permutations as respective permutrices, each permutrix including a respective permutant and a respective permuton, wherein the respective permutants represent observable states and the respective permutons represent hidden states or imaginary states.

39. The apparatus according to claim 30, wherein the memory circuitry is further configured according to-the manifold is a hypersphere,
the countable number of lattice points is a Landau number greater than a dimension of a state space of the quantum system,
the lattice points are arranged in one of a Fibonacci lattice and a Fermat lattice, and
the lattice points are labeled by the respective permutations, which, when the lattice points are arranged in the Fibonacci lattice, are represented by Lehmer codes determined using a Binet Formula.

40. The apparatus according to claim 30, wherein the memory circuitry is further configured according to-the manifold including that the lattice points are arranged as a lattice forming a polytope, wherein each lattice point corresponds to a respective vertex of the polytope, and the lattice points are indexed by respective numbers of a numerical sequence, the respective numbers being associated with the respective permutations.

41. The apparatus according to claim 40, wherein the memory circuitry is further configured according to
the polytope formed by the lattice points is one of a Permutohedron, a sorting orbitope, a Birkhoff polytope, or a combinatorial polytope.

42. The apparatus according to claim 40, wherein the memory circuitry is further configured according to
the manifold being one of a hypertorus, a hypersphere, a hypercube, a Calabu-Yau manifold, an n-simplex, a 2-polygon, and a zonotope,
a lattice-type determining an arrangement of the lattice points in the lattice is one of a Bravais lattice, a Fibonacci lattice, a Fermat lattice, a binary lattice, a simplicial polytopic number lattice, and a figurate numbers lattice,
a probability distribution type of the first probability density is one of a non-linear probability density function, a von Mises probability density, a von Mises Fisher probability density, a Watson probability density, a Mallows probability density, a Gaussian probability density, a Kent probability density, a Bivariate von Mises probability density, a uniform probability density, a Veterbi probability density, a Bayes probability density, a Markov-chain probability density, a Markov probability density, a mixture model, and a Dirichlet Process mixture model, and
a probability distribution type of the second probability density is one of a linear probability density function, a Gaussian distribution, a Poisson distribution, a Wigner distribution, a Fisher distribution, a hypergeometric distribution, a mixture model probability density, and any combination thereof.

43. The apparatus according to claim 30, wherein the memory circuitry is further configured according to-the lattice points being labeled according to a combinatorial arrangement by
determining the respective permutations at the lattice points according to a integer sequence, which relates the respective permutations to successors and predecessors,
determining a permutation transition operator between permutations according to the successors and the predecessors, and
associating the permutation transition operator to an operational semantics, wherein the operational semantics include at least one of a gate operation, a quantum circuit, a permutation operation, a swap operation, and an operation corresponding to a Hamiltonian path of the permutations.

44. The apparatus according to claim 30, wherein the memory circuitry is further configured according to
the lattice points being labeled by the respective permutations according to a sequence pattern that is one of a general quantum permutation circuit, a blockwise pattern, an alternating pattern, a zigzag pattern, and up/down pattern, a Landau Number pattern, and a Baxter permutation pattern.

45. The apparatus according to claim 30, wherein the defining the mapping of the quantum states to permutations includes
a list-permutation bijection between a list and a permutation, the list-permutation bijection being a reversible mapping representing a one-to-one correspondence between a set of the list, which is a sequence of natural numbers, and a set of the permutation, which is a permutation of natural numbers,
a list-natural number bijection between the list and a natural number,
a list-set bijection between the list and a set, and
a list-multiset bijection between the list and a multiset.

46. The apparatus according to claim 30, wherein the circuitry is further configured to train the QVM by
representing training data as training-data probability distributions on the tangent spaces, and the training-data probability distributions are discretized to discrete values corresponding to the respective nearest lattice points, and using a logarithmic map to map distributions between the manifold and the tangent spaces, wherein the distributions correspond to the second probability density.

47. The apparatus according to claim 46, wherein the circuitry is further configured to train the QVM by
using the logarithmic map to map the distributions between the manifold and the tangent spaces, wherein the logarithmic map is one of a Riemannian logarithmic map, a Hilbert logarithmic map, and an inverse function between respective a linear space and a non-linear space.

48. The apparatus according to claim 30, wherein the circuitry is further configured to update the QVM by
the determining of the samples of QVMs from the distribution of the QVM further includes that each sample of the samples of QVMs has a unique arrangement of the permutations labeling the respective lattice points,
the calculating of the respective fitness values-further includes
obtaining, based on training data, respective input distributions and output distributions of the permutations, wherein the arrangement of the input distributions and the output distributions among the lattice points depend on the unique arrangement of the permutations labeling the lattice points of the sample,
operating on the input distributions using a transition model relating input lattice points to output lattice points to generate transitioned input distributions, and
applying a fitness function to the transitioned input distributions and the output distributions to generate the respective fitness values-of the samples, and
the updating of the distribution of the QVM further includes adjusting the distribution of the QVM according to a likelihood that, among the unique arrangements of the permutations labeling of the lattice points within the fit subset, a lattice point of the lattice points is labeled by a permutation of the permutations.

49. The apparatus according to claim 48, wherein the circuitry is further configured to update the QVM by calculating the respective fitness values using a distance function that is one of Levenstein Edit distance, a Hamming distance, and number of permutation operations separating lattice points, and a Kendall tau distance.

50. The apparatus according to claim 30, wherein the circuitry is further configured to update the QVM by
the determining of the samples of QVMs from the distribution of the QVM further includes that each sample of the samples of QVMs has a unique transition model of directional transitions among the lattice points,
the calculating of the respective fitness values-further includes
obtaining, based on training data, respective input distributions and output distributions of the lattice points,
operating on the input distributions using the corresponding unique transition model of the sample to generate transitioned input distributions, and
applying a fitness function to the transitioned input distributions and the output distributions to generate the respective fitness values-of the samples, and
the updating of the distribution of the QVM further includes adjusting the distribution of the QVM according to a likelihood that, among the unique transition models of fit subset, a lattice point of the input distribution transitions to a lattice point of the output distribution.

51. The apparatus according to claim 30, wherein the circuitry is further configured to
emulate the evolution of the quantum system using the QVM by
receiving an input,
mapping the input to an input Quanton state, and
applying the first probability density of the learned QVM to the input Quanton state to generate an output Quanton state.

52. The apparatus according to claim 51, wherein the circuitry is further configured to emulate the evolution of the quantum system using the QVM by
applying the first probability density to the learned QVM, wherein the first probability density is learned by the updating of the QVM.

53. The apparatus according to claim 30, wherein the circuitry is further configured to update the QVM using a recursive evolution and estimation method by
each permutation of the permutations comprising a permuton and a permutrix, and
the recursive evolution and estimation method including the steps of
defining an observation model and a transition model, wherein the transition model includes a mixed conditional probability distribution based on the first probability density and expressed using at least one of a mean and a variance of a von Mises-Fisher distribution, a mean and a variance of a Gaussian distribution, a mixture model of probability distributions, or any combination thereof,
generating a posterior to predict an evolution of the second probability density using a Forward algorithm by performing a prediction/roll up step and a conditioning step,
the determining samples of QVMs further include generating observations of the second probability density by projecting the posterior onto the manifold to generate a mean vector, and
the selecting a fit subset of the samples of QVMs and the updating of the distribution of the QVM include generating random draws using the mean vector, and modifying the second probability density from a partial observation based on the random draws.

54. The apparatus according to claim 30, wherein the memory circuitry is further configured according to
labeling the lattice points by the respective permutations according to a sequence pattern using Landau numbering to design the permutations, wherein an operation between the permutations representing transitions between the lattice points corresponds to at least one of an addition, subtraction, multiplication, and division of a Turing computational model.

55. The apparatus according to claim 30, wherein the circuitry is further configured to emulating the quantum system by
the second probability density is generated from training data using one of a Bayesian model, a Kalman model, a model applying time dependent density functionals, a model applying direction dependent density functionals, a quantum model, or any combination thereof.

56. The apparatus according to claim 30, wherein the quantum system is topological quantum computing system and the evolution of the quantum system is a braiding operation of-topological quantum computing.

* * * * *